Oct. 4, 1955    H. F. SHOFFSTALL    2,719,886
INTERTOLL TRUNK TESTING SYSTEM
Filed Jan. 28, 1953    23 Sheets-Sheet 1

INVENTOR
H. F. SHOFFSTALL
BY
C. Mattice
ATTORNEY

Oct. 4, 1955 H. F. SHOFFSTALL 2,719,886
INTERTOLL TRUNK TESTING SYSTEM
Filed Jan. 28, 1953 23 Sheets-Sheet 4

INVENTOR
H. F. SHOFFSTALL
BY C. Mattice
ATTORNEY

Oct. 4, 1955

H. F. SHOFFSTALL 2,719,886

INTERTOLL TRUNK TESTING SYSTEM

Filed Jan. 28, 1953

INVENTOR
H. F. SHOFFSTALL
BY C. Mattice
ATTORNEY

INVENTOR
H. F. SHOFFSTALL
BY C. Mathieu
ATTORNEY

Oct. 4, 1955    H. F. SHOFFSTALL    2,719,886
INTERTOLL TRUNK TESTING SYSTEM
Filed Jan. 28, 1953    23 Sheets-Sheet 14

INVENTOR
H. F. SHOFFSTALL
BY
C. Mattice
ATTORNEY

INVENTOR
H. F. SHOFFSTALL
BY
C. Mathie
ATTORNEY

INVENTOR
H. F. SHOFFSTALL
BY
C. Mattice
ATTORNEY

United States Patent Office 2,719,886
Patented Oct. 4, 1955

2,719,886

INTERTOLL TRUNK TESTING SYSTEM

Hugh F. Shoffstall, Maplewood, N. J., assignor to Bell Telephone Laboratories, Incorporated, New York, N. Y., a corporation of New York Application January 28, 1953, Serial No. 333,760

9 Claims. (Cl. 179—175.2)

This invention relates to toll telephone systems and has for its object to facilitate the maintenance of such systems by providing improved routine testing equipment for testing the outgoing trunks employed in such systems.

More specifically, the present invention is directed to the testing of outgoing toll trunks in a toll system employing cross bar switches and particularly in such a system as that disclosed in the application of Gooderham-Jacobitti-Myers-Shipley-Strickler 29–2–37–6–18, Serial No. 286,267, filed May 6, 1952, although it is also capable of use in testing similar trunks in such a system as that disclosed in Patent 2,564,441 to McKim and Strickler, April 14, 1951.

In such toll systems, connections are set up between incoming and outgoing trunks by means of two sets of cross bar switches which are operated under the control of a marker. The trunks are distributed throughout the trunk switch frames and the marker obtains access to them for testing purposes by means of a trunk block connector and trunk block relays which are operated by the marker in accordance with a registered designation. The trunk block connector and trunk block relays establish two circuits between each of a plurality of associated trunks and the marker, one circuit being a busy test circuit and the other being a select magnet operating circuit. The busy test conductor of each trunk is marked with battery when the trunk is idle and with ground when the trunk is busy. The select magnet operating circuit is marked with a combination of tones which identify the trunk switch frame on which the associated trunk is located.

For this type of system a convenient method of connecting testing equipment with the talking conductors of trunks to be tested is by means of the same switches used for service connections. Multiple connections are made to the busy test conductor and select magnet circuit of each trunk and these multiple connections are terminated in the contacts of test connectors forming part of the test circuit. The test connectors are operated progressively to connect the test circuit with these multiple connections and the test circuit uses the multiple connection of the busy test conductor to determine when the associated trunk is idle.

The test circuit also has two connections with terminals of a trunk block relay and, having found an idle trunk, calls in a marker and transmits to it a designation which will cause the marker to select this trunk block connector and these two terminals. To one of these terminals the test circuit simulates an idle trunk and to the other terminal connects the multiple connection of the select magnet circuit associated with the trunk to be tested, so that the marker may set up a connection between the test circuit and the trunk to be tested.

In accordance with one feature of the invention, the test circuit first tests the busy test conductor of a trunk for absence of busy ground and then for the presence of battery so that if the absence of ground is caused by a break in the connection with the busy test conductor the test circuit will not attempt to test that trunk.

Since, particularly in toll systems, a false busy condition on a trunk is undesirable, means is provided for causing the test circuit to pass over idle trunks and stop on busy trunks. If this test is made during times of light traffic it provides a means for rapidly locating trunks which are busy so that it may be determined whether such trunks are busy in service, have been plugged busy intentionally, have been plugged busy unintentionally, or are otherwise falsely busy. The means for controlling this test is such that only idle trunks may be passed or both idle trunks and spare terminals which are intentionally marked busy may be passed.

Another feature of the present invention relates to means for testing the ability of a selected trunk to satisfactorily respond to incoming ringing signals and return supervisory signals. In accordance with this feature, means is provided for transmitting a plurality of timed ringing signals to the trunk under test. A test line is provided at the distant office with which the trunk under test is connected and which responds to the ringing signals as sent out by the trunk circuit and returns supervisory signals to the trunk circuit. Means is provided in the test circuit to respond to the supervisory signals returned by the trunk circuit, together with means for timing individual supervisory signals.

These and other features of the invention will be more clearly understood from a consideration of the following description read in connection with the attached drawing in which:

Fig. 24 is a diagrammatic showing of the manner in which Figs. 1 to 23 are to be arranged.

Figure 1:
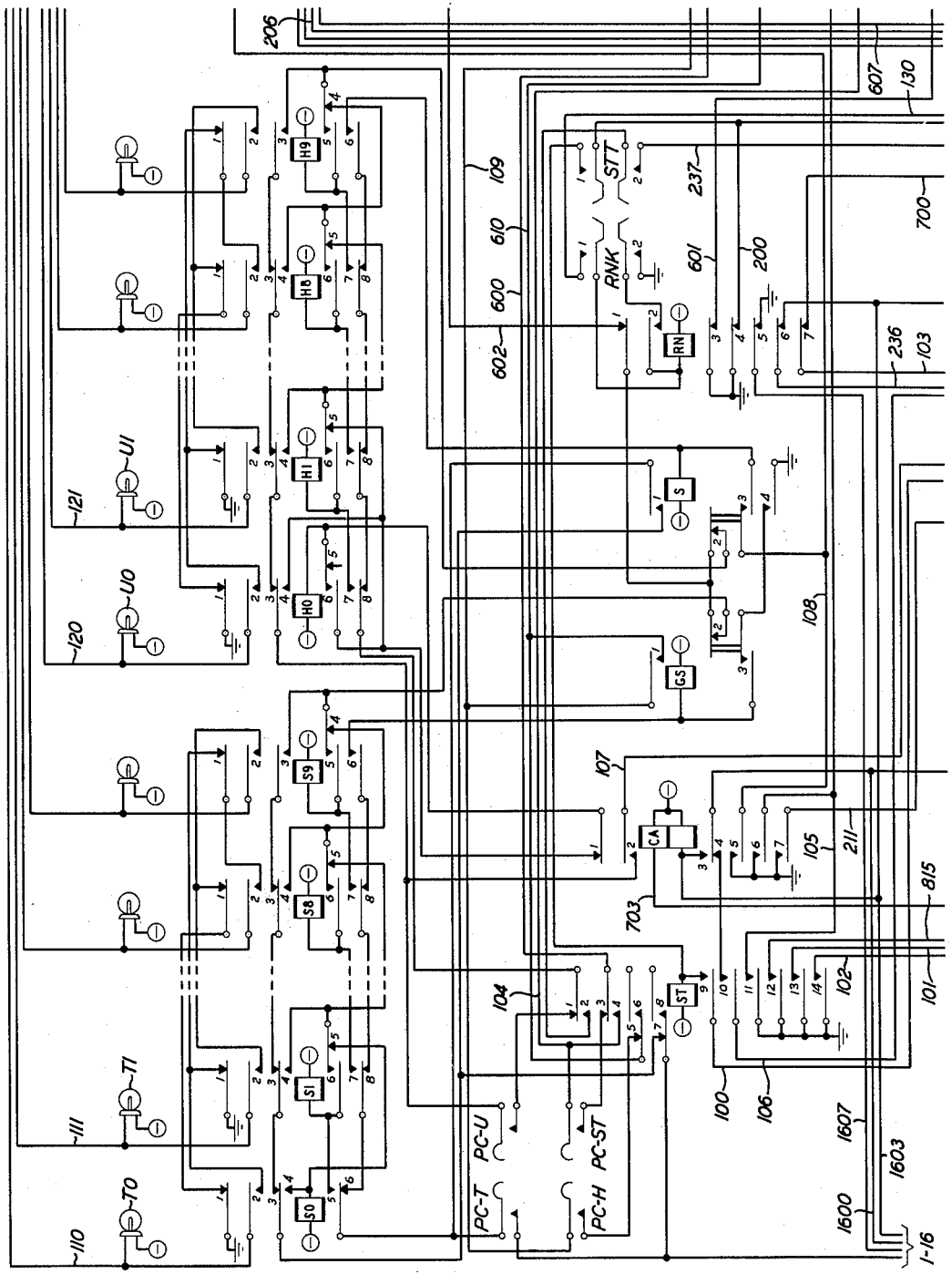
Fig. 1 shows the circuits for controlling the selection of a particular cross-point in the test connector.
Figure 2:
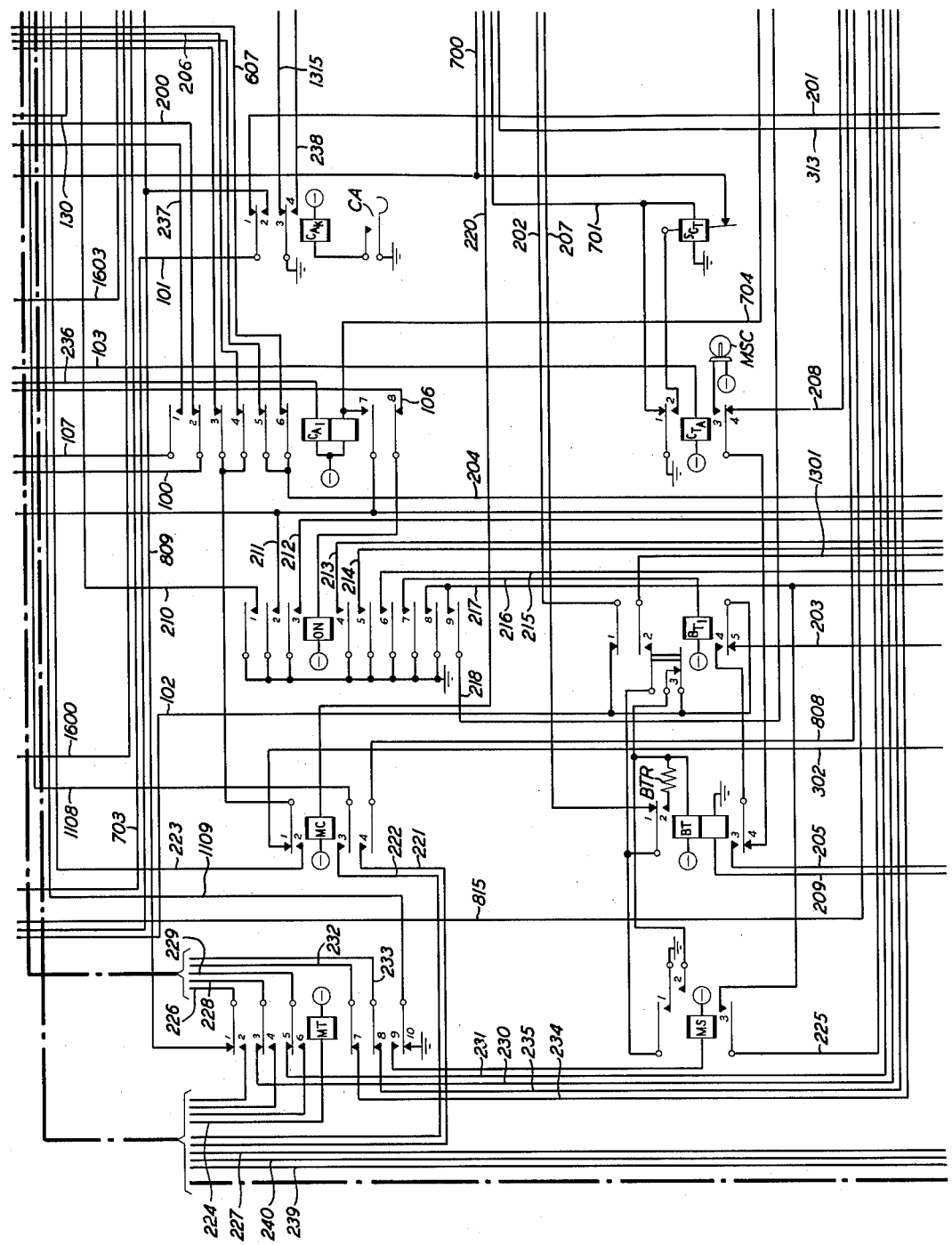
Fig. 2 shows the circuits for testing the busy test conductor of the trunk under test.

In the drawing, functional letter designations have been applied to the various elements of the circuit and, in the specification, these designations are followed by a numerical designation enclosed in parentheses indicating the sheet of the drawing in which the element may be found. For a complete description of the toll switching circuits with which the present test circuit is designed to function, reference may be made to the above-identified Gooderham et al. application and McKim et al. patent.

*General description*

As previously mentioned the test circuit is connected with the talking conductors of trunks to be tested through the incoming and outgoing link switches used in service connections having the appearance of an incoming trunk on the incoming link frame. In order to employ the services of a marker in establishing these connections with the trunks it has the appearance of a sender in the decoder connector (or marker connector), it obtains access to multiples of the busy test conductors and select magnet circuits of the trunks through a test connector and has a corresponding busy test and select magnet appearance in a trunk block relay.

The test connector comprises a plurality of cross bar switches each cross-point of which gives access to the busy test conductor and select magnet circuit of two trunks. The cross-points of one switch are successively operated while one trunk is tested for each cross-point and are then successively reoperated to test the other trunk appearing in each cross-point. The other switches are similarly operated until all of the trunks have been tested.

With a cross-point operated, the test circuit first tests the busy test conductor for the absence of busy ground and then for the presence of battery, after which it marks the trunk busy. The decoder connector is then operated and a designation transmitted to the decoder which identifies the trunk block connector terminals of the test circuit. The test circuit simulates an idle trunk to its trunk block appearance and extends the select magnet circuit of the trunk under test to its select magnet appearance after which the marker operates the link switches to connect the talking conductors of the trunk with those of the test circuit.

The test circuit then transmits a designation to the distant office which will cause the incoming end of the trunk at that office to be connected with a toll test line. The toll test line is designed to receive two ringing signals from the outgoing trunk responding to the first signal to return a steady "on-hook" signal and to the second ringing signal to return an interrupted supervisory signal.

The test circuit transmits the two ringing signals to the outgoing trunk, timing both the ringing signal and the interval between signals at the same time testing for the expected supervisory signals. After the interrupted supervisory signal is started the test circuit counts a plurality of the signals, timing the length of individual ones of those signals.

If the supervisory signals are satisfactory, the test circuit then initiates the release of the trunk and times the release. If the release is completed properly the test circuit advances the test connector to the next trunk.

At each stage of operation means is provided to stop the progress of the test in case of failure, with lamps lighted to indicate the trunk under test and the stage at which the failure occurred.

*Detailed description*

Figure 15:
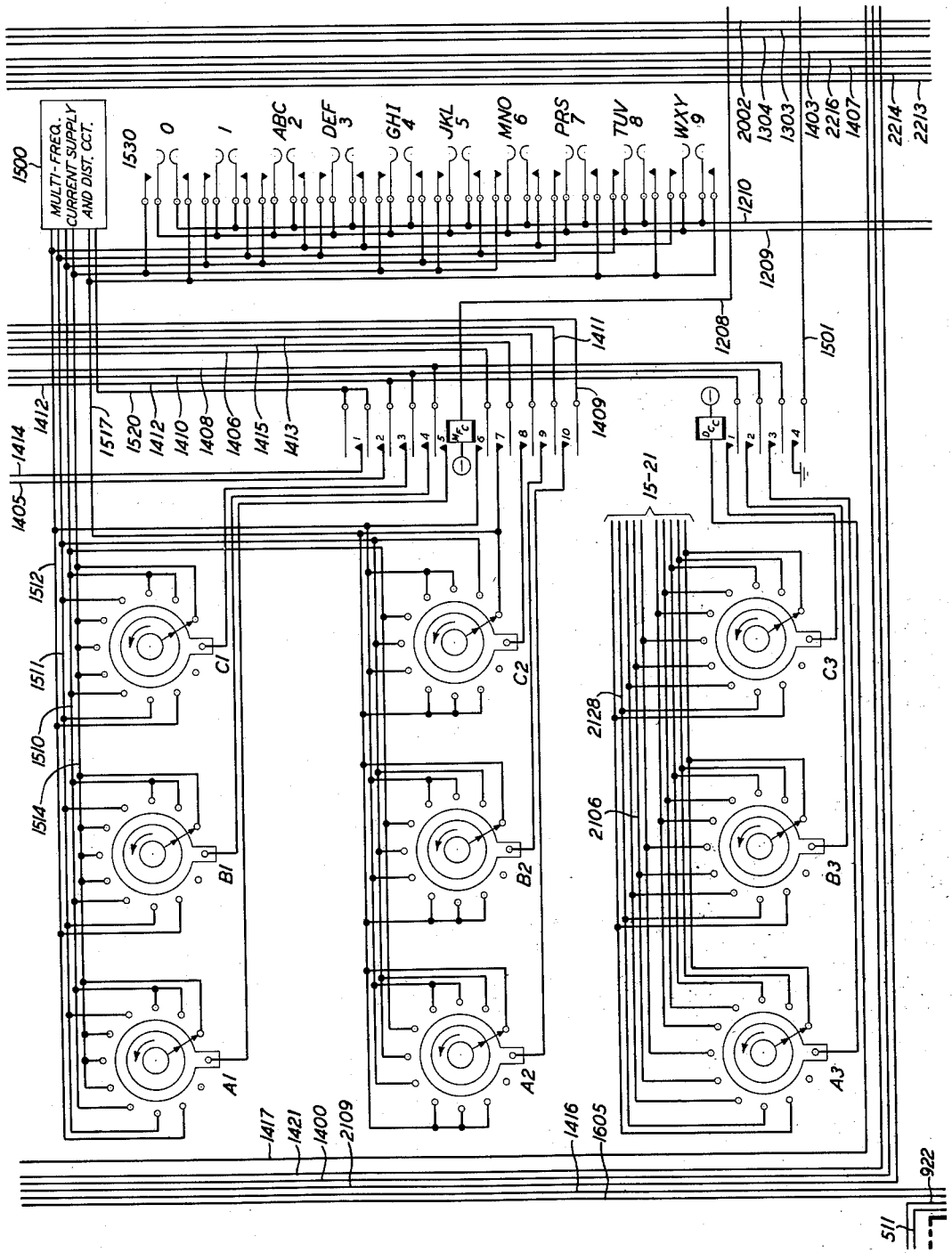
Fig. 15 shows a set of register switches and a manual key-set.

Before a test is to be started the dial switches of Fig. 15 are set in accordance with the code which identifies the test line. To start a test, start test key STT(1) is operated closing a circuit from battery through the winding of relay ST(1), contact 1 of key STT(1) to ground at contact 4 of relay RN(1). Relay ST(1) operates in this circuit and closes a locking circuit for itself over its contact 9, conductor 100, contact 2 of relay CA1(2), conductor 200 to ground at contact 4 of relay RN(1). Relay ST(1) closes a circuit from ground over its contact 13, conductor 101, contact 1 of relay CAK(2), conductor 201, contact 1 of key MAN-A(13), contact 1 of key MAN-M(13), conductor 1300, contact 13 of relay CS(8), conductor 800, contacts 4 of relays TZ(3) and and TW(3), conductor 300, contacts 4 of relays TZ1(8) and TW1(8), contacts 3 of relays TA(8) and TA1(8), conductor 801 to battery through the winding of relay BY(3). Relay BY(3) operates in this circuit and locks over its contact 4 and conductor 800 and the circuit above traced to ground at contact 13 of relay ST(1). Relay BY(3) starts a timing operation as will be described hereinafter. At its contact 14, relay ST(1) connects ground to conductor 102 completing a circuit over contact 1 of relay BT1(2), conductor 202, contact 4 of key PSI(7), contact 5 of key PIO(7), conductor 700, contact 7 of relay RN(1), conductor 103 to battery through the winding of relay CTA(2). Ground on conductor 102 also completes a circuit over contact 3 of relay BT1(2) to battery through the upper winding of busy test relay BT(2) and over contact 5 of relay BT1(2), conductor 203 to battery through the winding of relay PB(8). Relays CTA(2), BT(2) and PB(8) operate in the above-traced circuits. Relay CTA(2) connects ground over its contact 2 and contact of relay SCT(2) to conductor 700 to provide a locking circuit for itself. Relay PB(8) closes an obvious circuit for relay PB1(8) which in turn closes an obvious circuit for relay PB2(8), operating relays PB1(8) and PB2(8).

When relay ST(1) operates, the first trunk subgroup relay G(6) is operated in a circuit from battery through the winding of relay G(6), conductor 600, contact 4 of relay ST(1), conductor 104, contacts 6 of relays G(6), G1(6) and the rest of the subgroup relays including relays GN(6), GN1(6), GZ(6) and GZ1(6), conductor 601 to ground at contact 3 of relay RN(1). Relay G(6) operates and locks over its contact 7 and contacts 6 of the remaining subgroup relays following it in the chain circuit to ground at contact 3 of relay RN(1).

When relay G(6) operates, it closes a circuit from ground over its contact 11, contact 12 of relay G1(6) to battery through the winding of the associated group relay GP(6). Relay GP(6), at its contact 1, closes a circuit for lighting lamp THO(6) and at its contact 6 closes a circuit over contact 13 of relay G(6) for lighting lamp HO(6) to identify the group of one hundred trunks. Relay GP(6) also closes a circuit from ground over its contact 7, conductor 602, contact 1 of relay RN(1), contact 2 of relay S(1), contact 4 of relay H9(1), contacts 5 of relays H8(1) to H1(1), contact 1 of relay CA(1) to battery through the winding of relay HO(1). Relay HO(1) operates in this circuit and locks over its contact 5, contacts 5 of relays H1(1) to H8(1), contact 4 of relay H9(1) to ground as above traced. With relay HO(1) operated, lamp UO(1) is lighted in a circuit over contact 2 of relay HO(1) to ground at conact 1 of relay H1(1). In addition, relay GP(6) closes a circuit from ground over its contact 7, conductor 602, contact 1 of relay RN(1), contact 2 of relay GS(1), contact 4 of relay S9(1), contacts 5 of relays S8(1) to S1(1) to battery through the winding of relay SO(1). Relay SO(1) operates in this circuit closing a circuit from ground over contact 1 of relay S1(1) and contact 2 of relay SO(1) to battery through lamp TO(1).

Relay GP(6) also completes a circuit from ground at contact 11 of relay ST(1), conductor 105, contact 8 of relay GP(6) to battery through the winding of relay GA(6). Relay GA(6) operates, closing an obvious circuit for relay GB(6). The test circuit is now ready to operate the first cross-point of the first cross bar switch of the test connector.

With relay SO(1) operated, a circuit is closed from ground over contact 1 of relay S1(1), contact 2 of relay SO(1), conductor 110, contact 1 of relay GA(6) to battery through select magnet SELO(6). Magnet SELO(6) prepares all of the contact sets in the zero level of the first cross bar switch. At its auxiliary contact, magnet SELO(6) connects ground over contact 12 of relay GA(6) to battery through the winding of relay SC(6). Relay SC(6) operates in this circuit and closes a circuit for operating the first hold magnet, which circuit may be traced from ground over contact 1 of relay H1(1), contact 2 of relay HO(1), conductor 120, contact 1 of relay SC(6), contact 1 of relay GB(6) to battery through the winding of hold magnet HOLDO(6). Magnet HOLDO(6) operates the contacts in the zero vertical but, since only level zero has been prepared, only the contacts of cross-point XPOO(6) will be closed.

Each cross-point has six contacts which are used for testing two trunks, contacts 1, 3 and 5 of cross-point XPOO(6) being associated with the first trunk, while contacts 2, 4 and 6 of the cross-point are associated with the second trunk. Contacts 1 and 2 control a class indication for the associated trunks, contacts 3 and 4 control circuits for testing the busy or idle condition of the trunks, while contacts 5 and 6 control the select magnet and frame indication circuits associated with the individual trunks.

Figure 16:
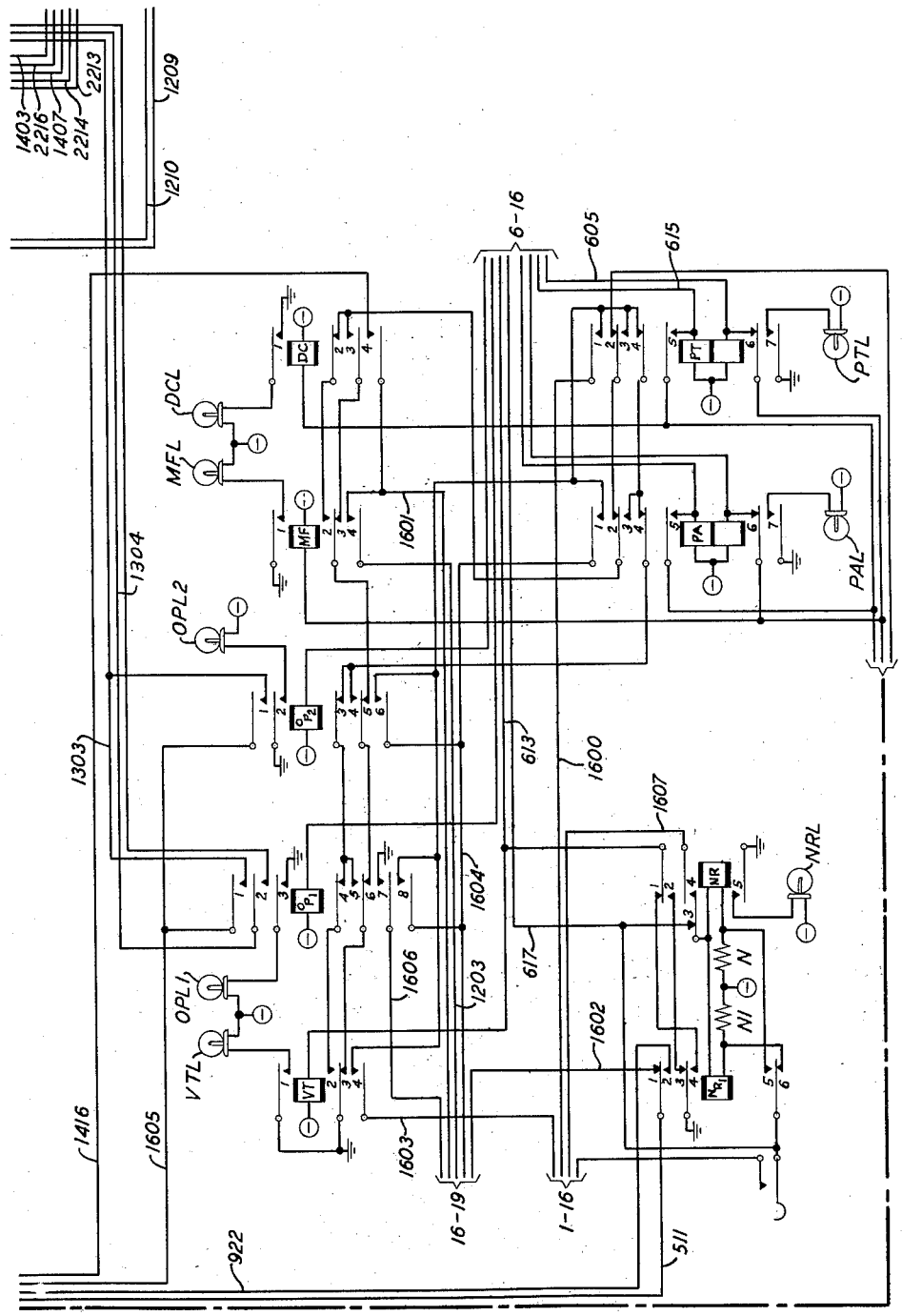
Fig. 16 shows the trunk class relays.

The class contacts of the various cross-points are connected to punchings which are then cross-connected to a second set of punchings which are in turn connected to the windings of the class relays of Fig. 16 so that the class relay corresponding to the associated trunk may be operated. The class relays are used to identify the class of the trunk and to indicate the type of outpulsing required.

Five class relays are provided. Relay VT(16) is used for advancing the test connector past unused cross-points, for example, cross-points which may be reserved for extension of a trunk group. Relays OP1(16) and OP2(16) are associated with trunks extending to operator positions, relay OP1(16) being operated in connection with trunks having no busy guard timing while relay OP2(16) is operated in connection with trunks having such busy guard timing. Relay PT(16) is used for automatically testing trunks having access to a test line. For trunks requiring direct-current code pulsing, relay PT(16) is operated through its upper winding and relay DC(16) is also operated. For trunks requiring multifrequency code pulsing, relay PT(16) is operated through its lower winding and MF(16) is also operated. Relay PA(16) is used in connection with trunks which do not have access to an automatic test line but may be tested under manual control from the test circuit. Relays DC(16) and MF(16) are also operated in parallel with the upper or lower winding of relay PA(16).

Assuming that the trunk associated with contacts 1, 3 and 5 of cross-point XPOO(6) is a trunk requiring multifrequency pulses and has access to a trunk test line at the distant office, punching 603 will be cross-connected to punching 604. With relay G(6) and cross-point XPOO(6) operated, a circuit is closed from ground over contact 1 of relay G(6), contact 1 of cross-point XPOO(6), punchings 603 and 604, conductor 605, lower winding of relay PT(16) to battery. Relay PT(16) operates and extends its operating circuit over its contact 6 to battery through the winding of relay MF(16) causing relay MF(16) to operate. Relay PT(16) at its contact 7 lights lamp PTL(16) and relay MF(16) at its contact 1 lights lamp MFL(16). With only the class relay PT(16) operated, together with its auxiliary relay MF(16), a circuit is closed from ground over contact 3 of relay VT(16), contact 6 of relay OF1(16), contact 5 of relay OP2(16), contact 2 of relay MF(16), contact 2 of relay DC(16), contact 2 of relay PA(16), contacts 3 and 1 of relay PT(16), conductor 1600, contact 4 of relay CA(1), contact 10 of relay ST(1), conductor 106, contact 8 of relay CA1(2) to battery through the winding of off-normal relay ON(2). Relay ON(2) operates in this circuit and connects ground to conductors 210 to 218.

Ground on conductor 216 completes an obvious circuit for relay BT1(2). Relay BT1(2), at its contact 5, opens the operating circuit for relay PB(8) but that relay is slow to release and remains operated for a time interval. At its contact 1, relay BT1(2) opens the operating circuit for relay CTA(2) but that relay is locked. With relay BT1(2) operated, a circuit is prepared from battery through lamp MSC(2), contact 3 of relay CTA(2), contact 4 of relay BT(2), contact 4 of relay BT1(2), conductor 102 to ground at contact 14 of relay ST(1). At its contact 2, relay BT1(2) prepares a holding circuit for relay BT(2) to the busy test conductor of the trunk to be tested as described hereinafter.

Figure 17:
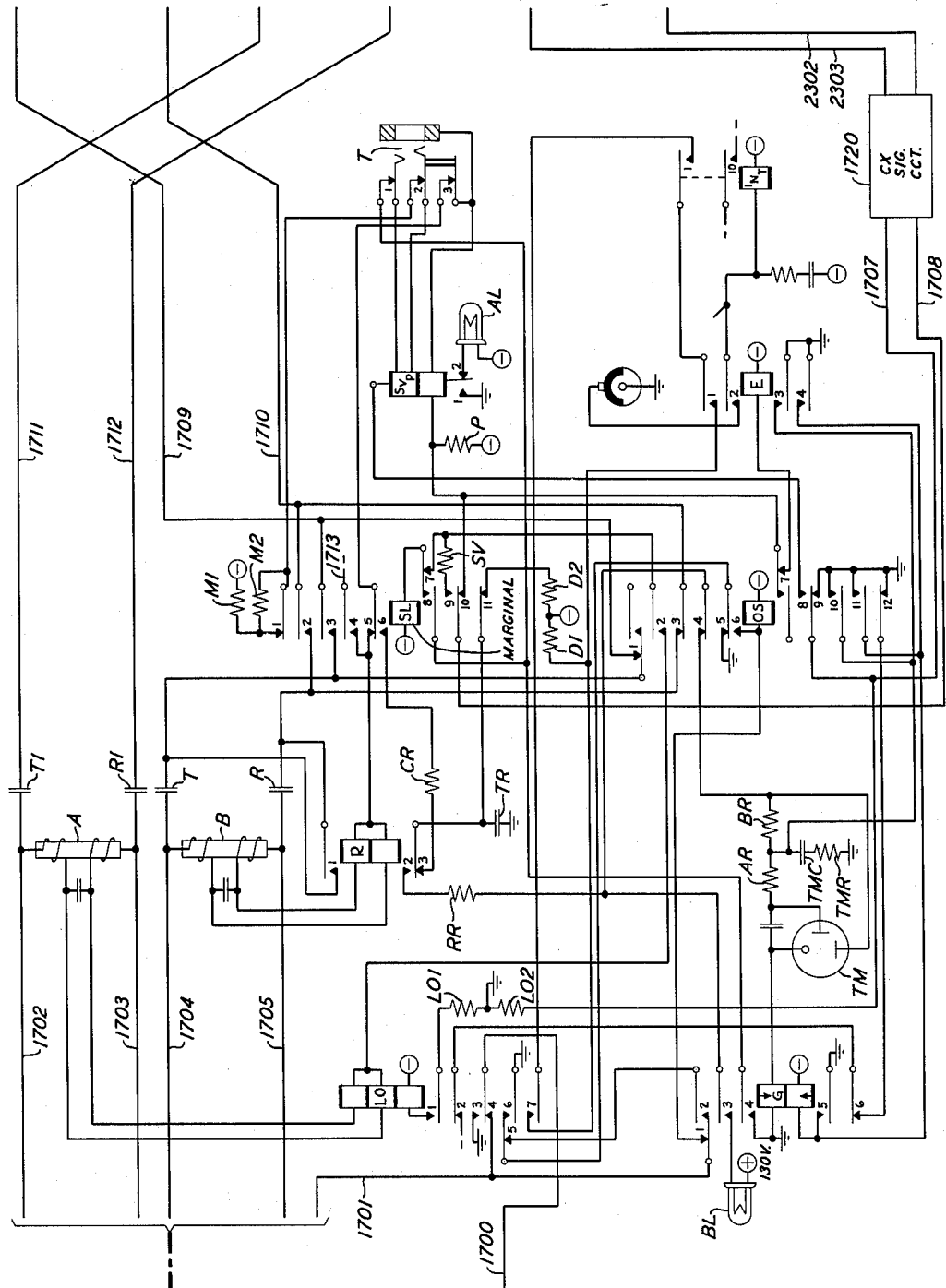
Fig. 17 shows a typical outgoing trunk.
Figure 18:
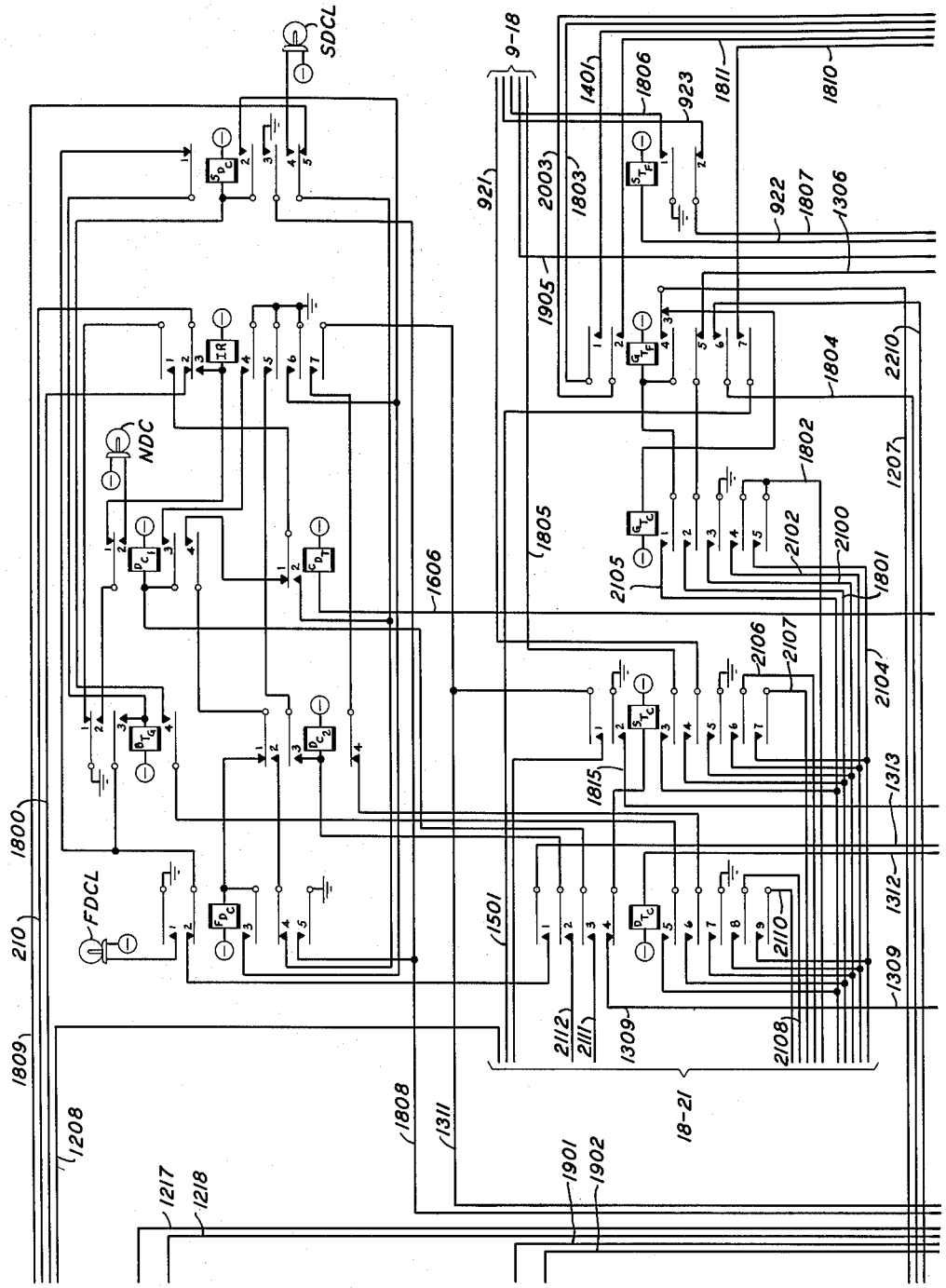
Fig. 18 shows the test progress relays.
Figure 19:
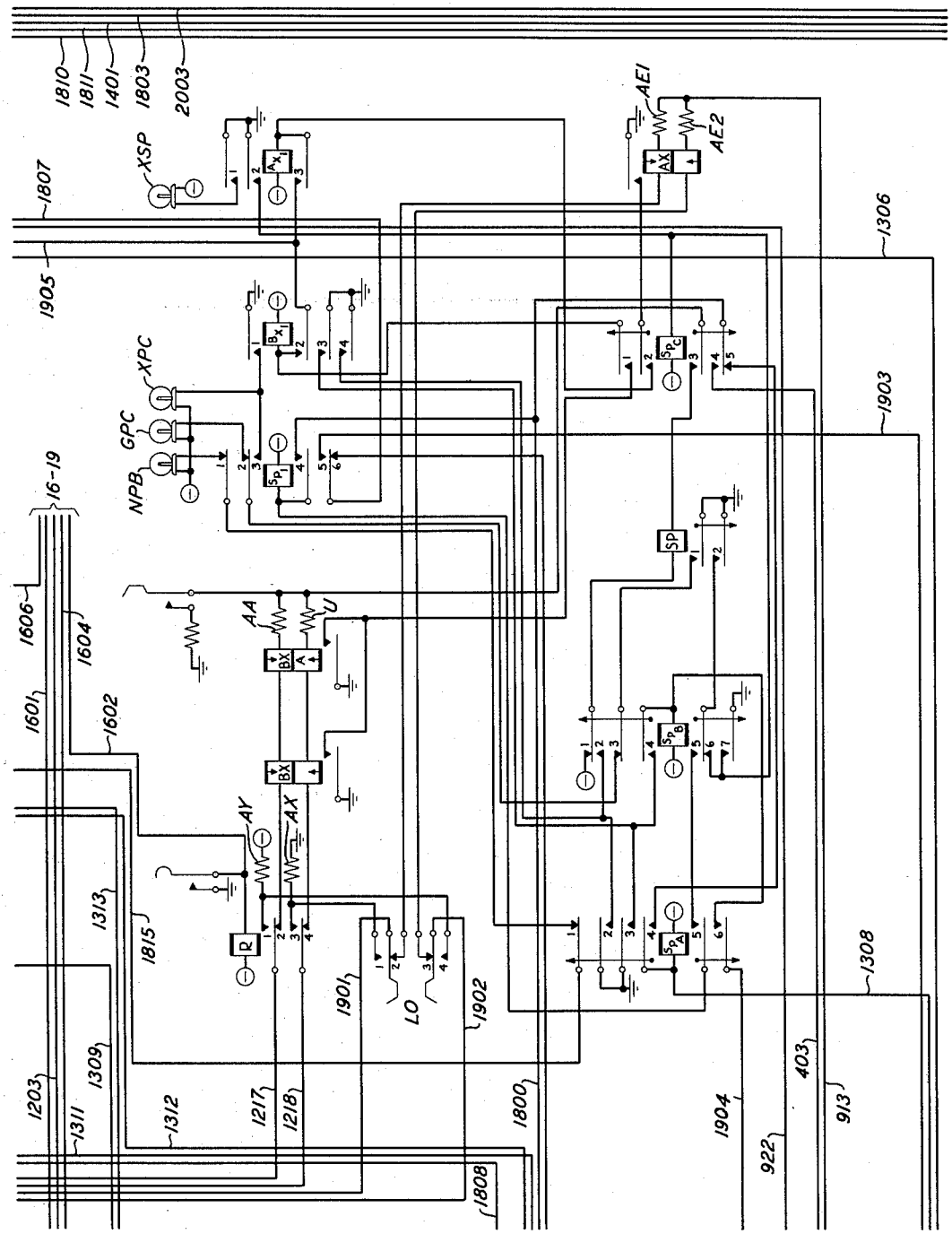
Fig. 19 shows circuits for testing the trunk conductors.

A typical intertoll trunk is shown in Fig. 17. When this trunk is idle, battery through the winding of relay OS(17) is connected over contact 1 of relay G(17) and contact 4 of relay LO(17) to busy test conductor 1700. This conductor is used by the marker in selecting an idle trunk by means of a connection established therewith through the trunk block connector 1100 and trunk block relay 1101. A branch of this conductor is extended to the toll trunk test circuit where it is connected to a contact of a cross-point, in this case to contact 5 of cross-point XPOO(6). When the marker selects the trunk for use it connects a low potential to conductor 1700 to operate relay OCS(17) and, when a service connection has been set up, ground is connected from the incoming trunk through the link switches to conductor 1701 which extends over contact 4 of relay LO(17) to conductor 1700. Therefore if the trunk is busy, ground will be extended over conductor 1700, contact 5 of cross-point XPOO(6), contact 3 of relay G(6), contact 5 of relay GP(6), conductor 607, contact 6 of relay CA1(2), conductor 204, contact 2 of relay SLO(13), contact 2 of relay SLC(13), conductor 1301, contact 2 of relay BT1(2), contact 2 of relay BT(2), resistance BTR(2), upper winding of relay BT(2) to battery.

Immediately after relay BT1(2) closes the above-traced circuit it opens at its contact 3 the original operating circuit of relay BT(2) so that relay BT(2) remains operated or releases according as the trunk to be tested is busy or idle.

Assuming first that the trunk is busy, relay PB(8) whose circuit was opened as above described, releases slowly followed in turn by the slow release of relays PB1(8) and PB2(8). As soon as relay PB(8) releases, relay BT(2) is made slow to release by short-circuiting its lower winding over a circuit from ground through the lower winding of relay BT(2), conductor 209, contact 7 of relay CS(8), contact 3 of relay PB(8), conductor 806 to ground at contact 8 of relay RZ2(13). This short-circuited winding prevents the release of relay BT(2) when testing trunks that momentarily open and close their test conductors during release before the trunks become idle. With relay BT(2) held operated, a circuit is closed from ground over contact 14 of relay ST(1), conductor 102, contact 4 of relay BT1(2), contact 3 of relay BT(2), conductor 205, contact 1 of relay CS(8), conductor 802 to battery through lamp TBL(3). A branch of this circuit extends from conductor 802, over contact 3 of relay COF(3), contact 1 of key APB(3), contact 8 of relay COF(3), conductor 301, contact 2 of relay SMT(8) to battery through lamp SM(8).

When relay PB1(8) has released and prior to the release of relay PB2(8), a circuit is closed from battery through resistance A1(8), upper winding of relay SMT-(8), contact 1 of relay PB1(8), contact 1 of relay PB2(8), conductor 803, contact 6 of relay RL(3), contact 3 of relay TR(3), conductor 302, contact 1 of relay MC(2), contact 4 of relay CA1(2), conductor 206, contact 4 of relay GP(6), contact 2 of relay G(6), contact 3 of cross-point XPOO(6), conductor 606, winding of select magnet 1102, left winding of tone coil 1103 to ground. The resistance of this circuit is sufficient to prevent the operation of select magnet 1102, but relay SMT(8) operates extinguishing lamp SM(8). Relay SMT(8) closes a locking circuit for itself from battery, through resistance A2(8), lower winding and contact 1 of relay SMT(8) and thence to ground over the circuit above traced for lamp SM(8).

The test circuit will remain in this condition during the time-out operation, which will be described hereinafter, at the end of which an alarm will be sounded. If the trunk becomes idle before the timing operation is completed, relay BT(2) will release and the test will proceed as described below.

If the trunk is idle, or becomes idle prior to the time out, a continuity test will next be made on the busy test conductor. When the trunk is idle, relay BT(2) releases, extinguishing lamp TBL(3) and closes a circuit from ground on conductor 102, over contact 4 of relay BT1(2), contact 4 of relay BT(2), contact 3 of relay CTA(2) to battery through lamp MSC(2) lighting that lamp. Conductor 1700 which extends as above traced to conductor 1301 is now further extended over contact 2 of relay BT1(2) and contact 1 of relay BT(2), conductor 207, contact 3 of key PSI(7), contact 4 of key PIO(7), conductor 701 to ground through the winding of relay SCT(2). If the test conductor is open, relay SCT(2) will not operate, but if the conductor is complete and the trunk circuit idle, relay SCT(2) will operate in series with relay OS(17) of the trunk circuit, relay OS(17) also operating. The low resistance of relay SCT(2) causes the trunk to test busy to any marker which attempts to seize it for an outgoing call.

Relay OS(17), in operating, closes a circuit from battery through the lower winding of relay G(17) to ground at contact 11 of relay OS(17). Relay G(17) operates and locks to ground at its contact 5. Relay OS(17) closes a locking circuit for itself over its contact 6, contact 5 of relay LO(17), contact 2 of relay G(17), conductor 1701, contact 4 of relay LO(17) to ground on conductor 1700.

Relay SCT(2) opens the locking circuit for relay CTA(2) causing the latter relay to release. With relay CTA(2) released, a direct ground is connected in parallel with the winding of relay SCT(2) to hold relay OS(17) operated and to apply a more favorable busy test condition to conductor 1700. Relay CTA(2) extinguishes lamp MSC(2) and closes a circuit from ground on conductor 102, contact 4 of relay BT1(2), contact 4 of relay BT(2), contact 4 of relay CTA(2), conductor 208, contact 5 and winding of relay CS(8) to battery. Relay CS(8) operates in this circuit and locks over its contact 6 to ground on conductor 212. The operation of relay CS(8) indicates the satisfactory completion of the busy and continuity tests and causes a marker to be called in for setting up a connection between the test circuit and the talking conductors of the trunk to be tested.

Relay CS(8) at its contacts 8 to 11 connects ground to conductors 810 to 813. Ground on conductor 811 either holds relay PB1(8) operated or reoperates that relay, in turn reoperating relay PB2(8). Ground on conductor 812 completes a voltage divider circuit to battery through resistances ZN(20) and ZM(20) to prepare a reduced potential operating circuit for relays ONH(20) and OFH(20). Ground on conductor 813 also completes a voltage divider circuit to battery through resistances D7(22) and D1(22) and a third voltage divider circuit to battery through resistances K5(22) and K1(22). A circuit is thereby closed from reduced battery potential over conductor 1200, contact 2 of relay KP(12), conductor 2200, contact 2 of jack ADJ(22), windings of relays PCK(22) and P(22), contact 1 of jack ADJ(22), contact 2 of jack PGJ(22), lower winding of relay PG(22), contact 3 of jack PGJ(22), conductor 2205 to battery through resistance PGR(22). However, a circuit is also closed in shunt of battery through resistance PGR(22), over contact 3 of relay TST(22), conductor 2201, normally closed contact of relay CPG(22), conductor 2202, contact 6 of relay W(21), contact 4 of relay DE1(21) to ground on conductor 813. Therefore, relay PG(22) is energized in a circuit from low voltage battery supplied through resistances D1(22) and D7(22) to ground on conductor 813, this energization being in a direction to cause relays PG(22), P(22) and PCK(22) to hold their contacts 1 closed. A circuit is also closed from battery through resistance PGR(22), conductor 2205, contact 3 of jack PGJ(22), upper winding of relay PG(22), contact 1 of jack PGJ(22), condenser PGC(22) to ground on conductor 813 which circuit is ineffective at this time.

Ground on conductor 813 is also connected to the armature of relay PG(22). Ground on conductor 810 extends over contact 1 of relay KP(12), conductor 1201, contact 1 of jack PCKJ(22) to the armature of relay PCK(22). The armature of relay P(22) is grounded over contact 1 of jack PJ(22). Contact 1 of relay PG(22) is left disconnected and therefore no circuit is completed while that relay holds its contact 1 closed. The circuit prepared by relay P(22) with its contact 1 closed is opened elsewhere at this time. Relay PCK(22) closes a circuit over its contact 1, contact 3 of relay PCKJ(22), conductor 2203 to battery through resistance CB(21) in shunt of the winding of relay DE1(21) for a purpose which will appear hereinafter.

In addition, relay CS(8), at its contact 13, opens the operating and holding circuits for relay BY(3) causing that relay to release and end the busy timing operation. At its contact 12, relay CS(8) closes a circuit from ground, connected to conductor 1300 as previously traced, over contact 12 of relay CS(8), conductor 804, contacts 1 of relays TA1(8), TA(8), TW1(8) and TZ1(8), conductor 805, contacts 1 of relays TW(3) and TZ(3) to battery through the winding of relay TB(3). Relay TB(3) operates and locks over its contact 4 to ground on conductor 804. Relay TB(3) starts a trouble timing operation.

In addition, relay CS(8) closes a circuit from battery through the winding of relay MC(2), conductor 220, contact 6 of key PIO(7), contact 5 of key PSI(7), conductor 702, contact 4 of relay CS(8), conductor 807, contact 4 of relay RL(3), contact 1 of relay TR(3) to ground over conductor 215. Relay MC(2) operates in this circuit and closes a circuit from battery over contact 2 of relay AL(8), conductor 808, contact 4 of relay MC(2) to conductor 221 leading to the decoder connector 1104. In a manner completely described in the above-identified application of Gooderham et al., the decoder connector selects a decoder such as decoder 1105. In addition, relay MC(2) prepares a circuit from ground through the left winding of tone coil 1106, through the winding of primary select magnet 1107 individual to the trunk test circuit, conductor 1108, contact 3 of relay MC(2) to conductor 222 leading to the decoder connector 1104. The marker will use this circuit in identifying the incoming link frame on which the test circuit appears and to operate select magnet 1107. A circuit is also prepared from ground through the left winding of tone coil 1103, winding of select magnet 1102 individual to the trunk to be tested, conductor 606, contact 3 of cross-point XPOO(6), contact 2 of relay G(6), contact 4 of relay GP(6), conductor 206, contact 4 of relay CA1(2), contact 2 of relay MC(2), conductor 223 to contact 1 of trunk block relay 1101. This circuit permits the marker to identify the outgoing link circuit on which the trunk to be tested appears and to operate the select magnet 1102. As soon as the decoder has been connected with the test circuit, ground is connected to conductor 224 operating relay MT(2).

Markers have access to outgoing trunks through trunk block connectors such as connector 1100 and trunk block relays such as relay 1101. The trunk block connector and trunk block relay extend two circuits to the marker, one of which is the busy test circuit and the other of which is the circuit for the select magnet as indicated for the trunk of Fig. 17 on trunk block relay 1101 and trunk block connector 1100. The trunk test circuit has a similar pair of circuits, the select magnet circuit having been previously traced. The busy test circuit extends from contact 2 of relay 1101 over conductor 1109 to the lowermost armature of relay MT(2). Normally, conductor 1109 is grounded over contact 10 of relay MT(2) to mark the test circuit busy, but when relay MT(2) operates, following the connection of the test circuit with the decoder, conductor 1109 is connected over contact 9 of relay MT(2) to battery through the winding of relay MS(2) simulating an idle trunk condition.

Figure 3:
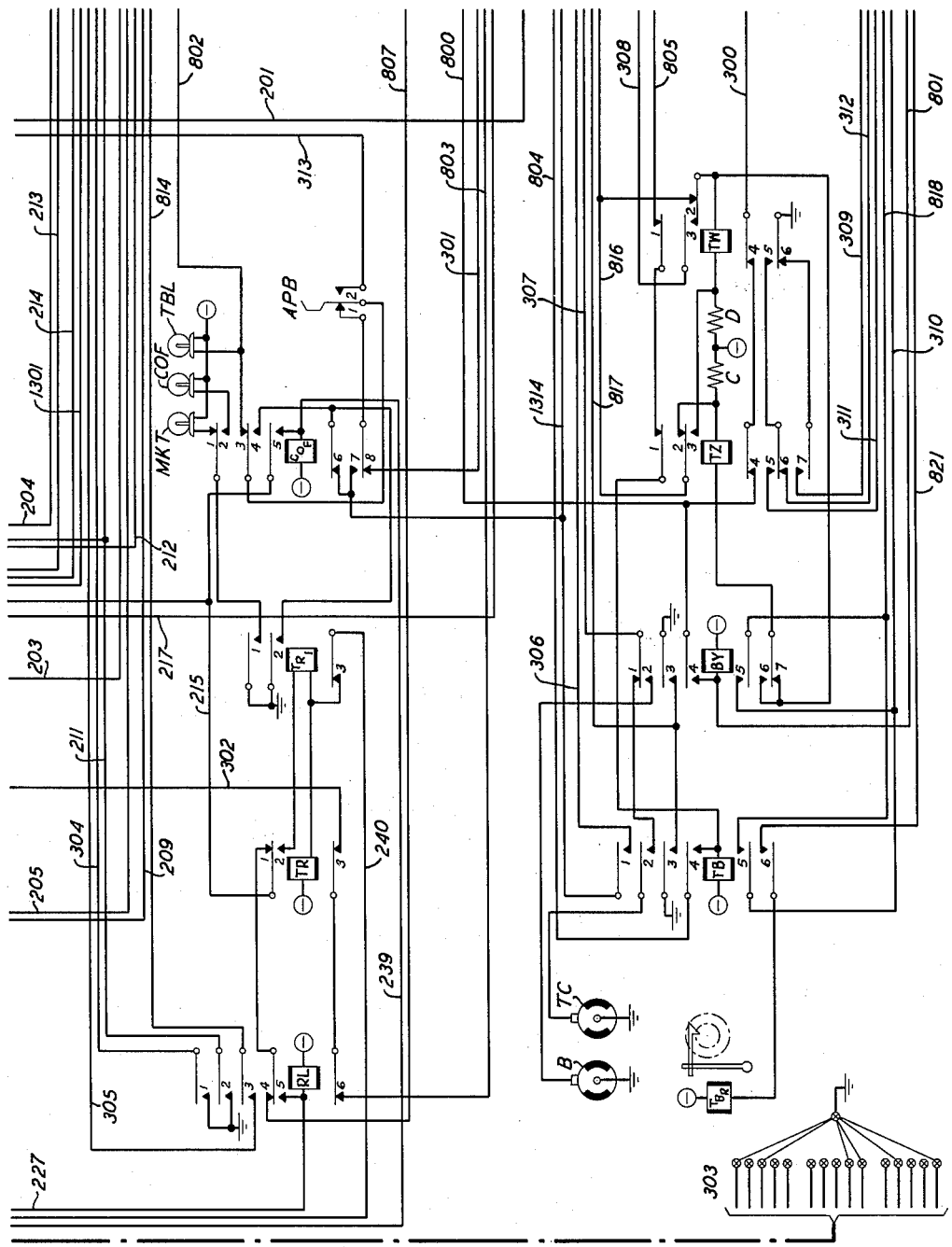
Fig. 3 shows a part of the busy and trouble timing circuit.
Figure 4:
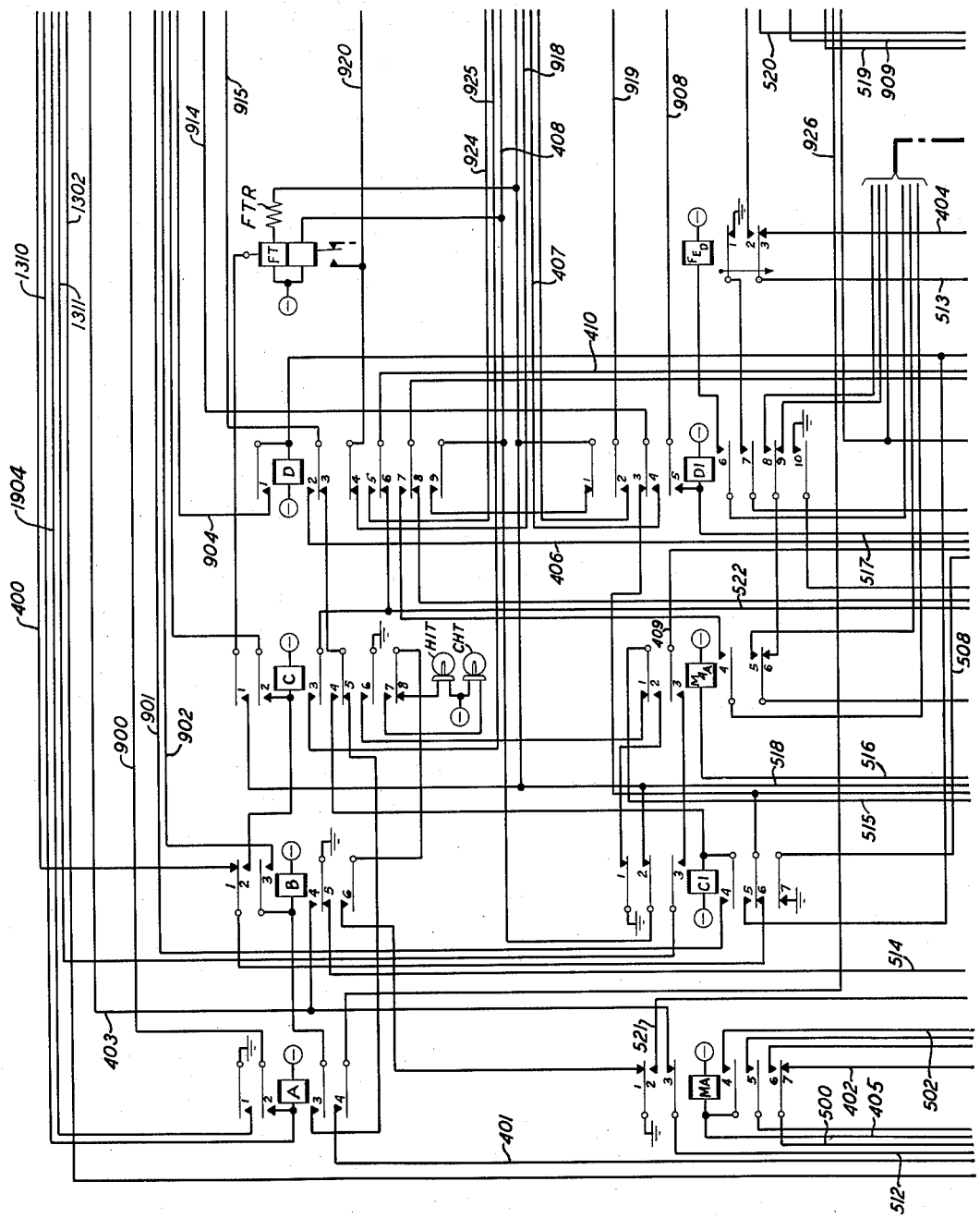
Fig. 4 shows the circuits for counting the supervisory signals.
Figure 5:
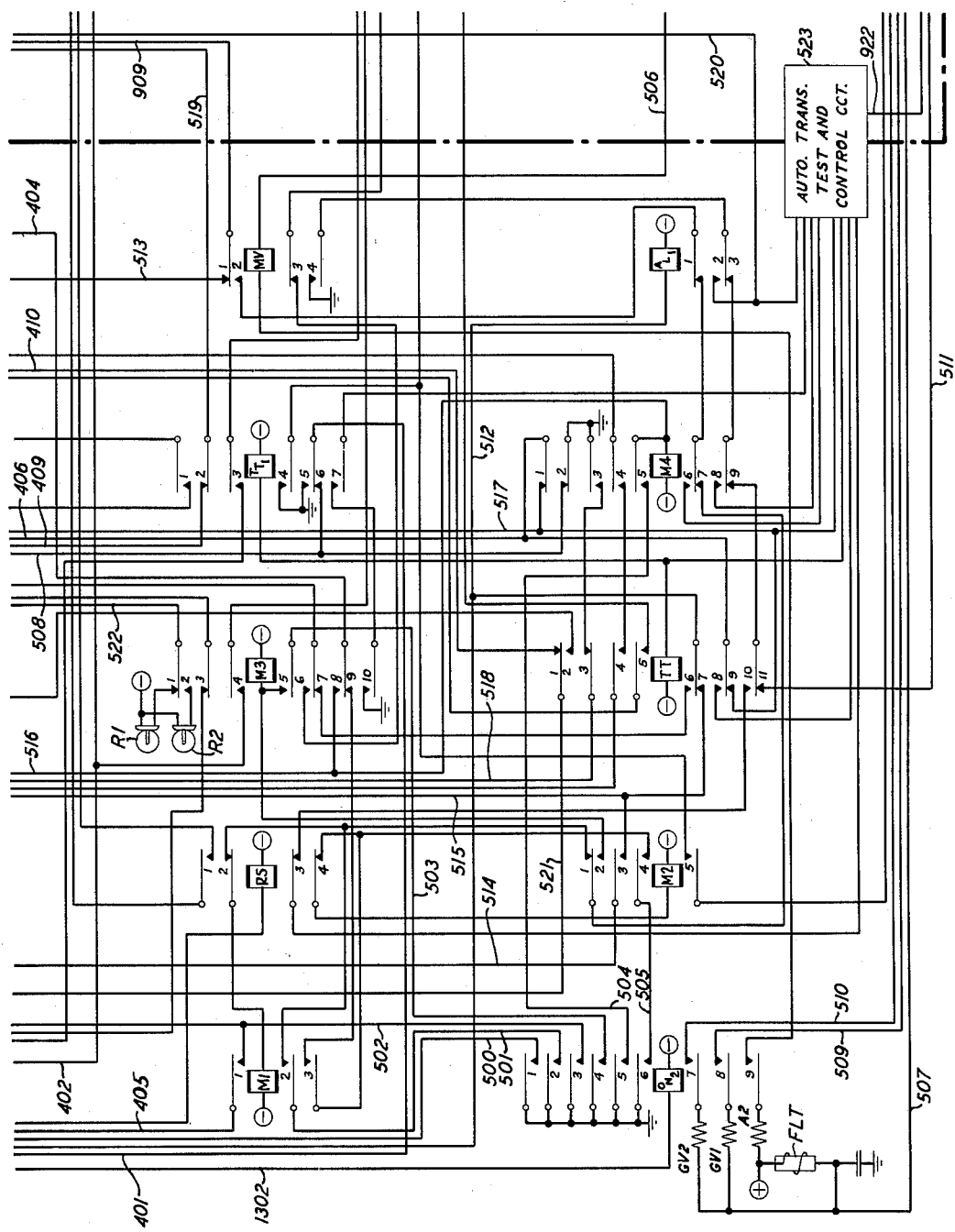
Fig. 5 shows the circuits for counting the ringing signals.
Figure 6:
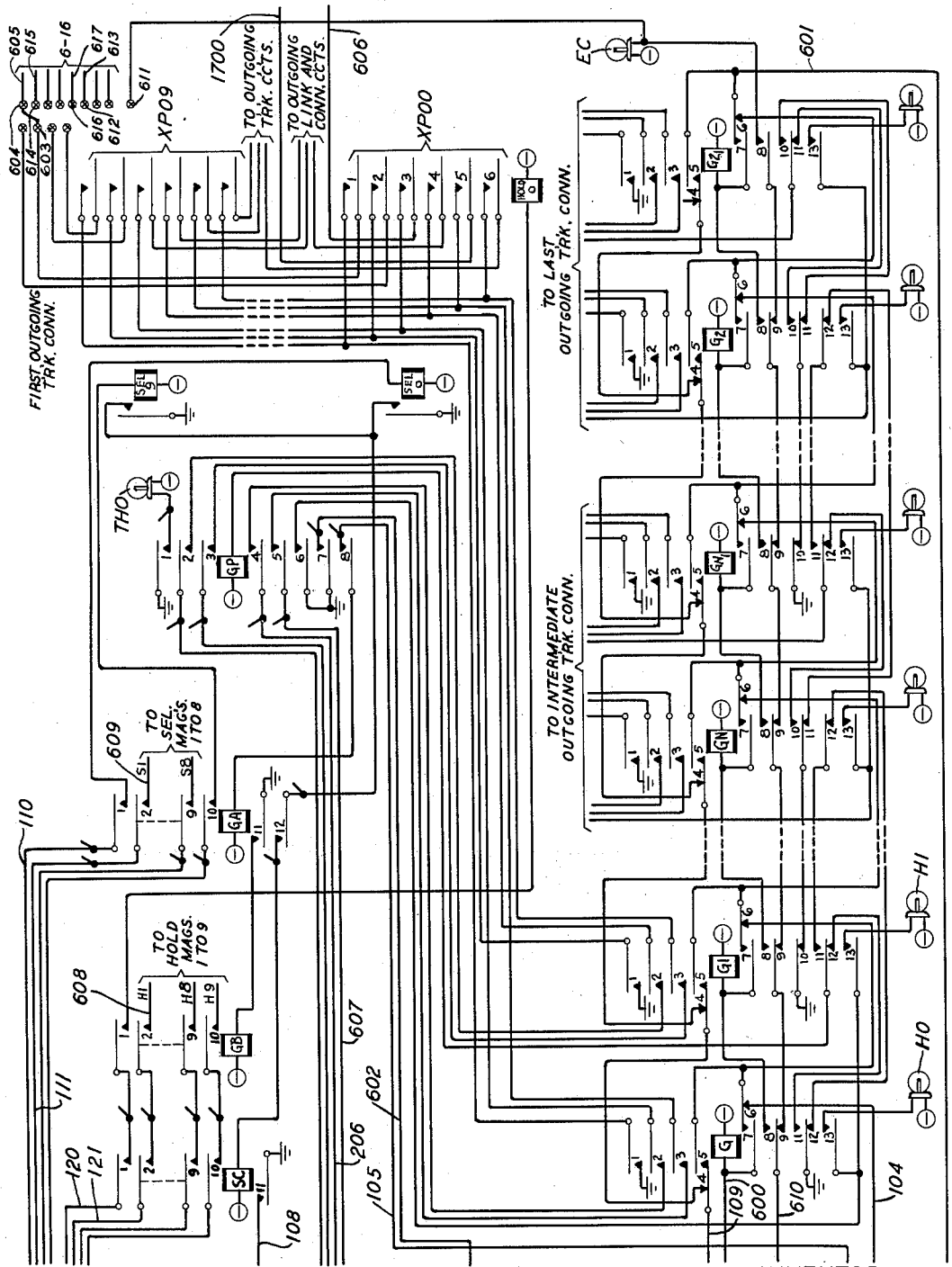
Fig. 6 shows the circuits for selecting a test connector switch and part of one such switch.
Figure 7:
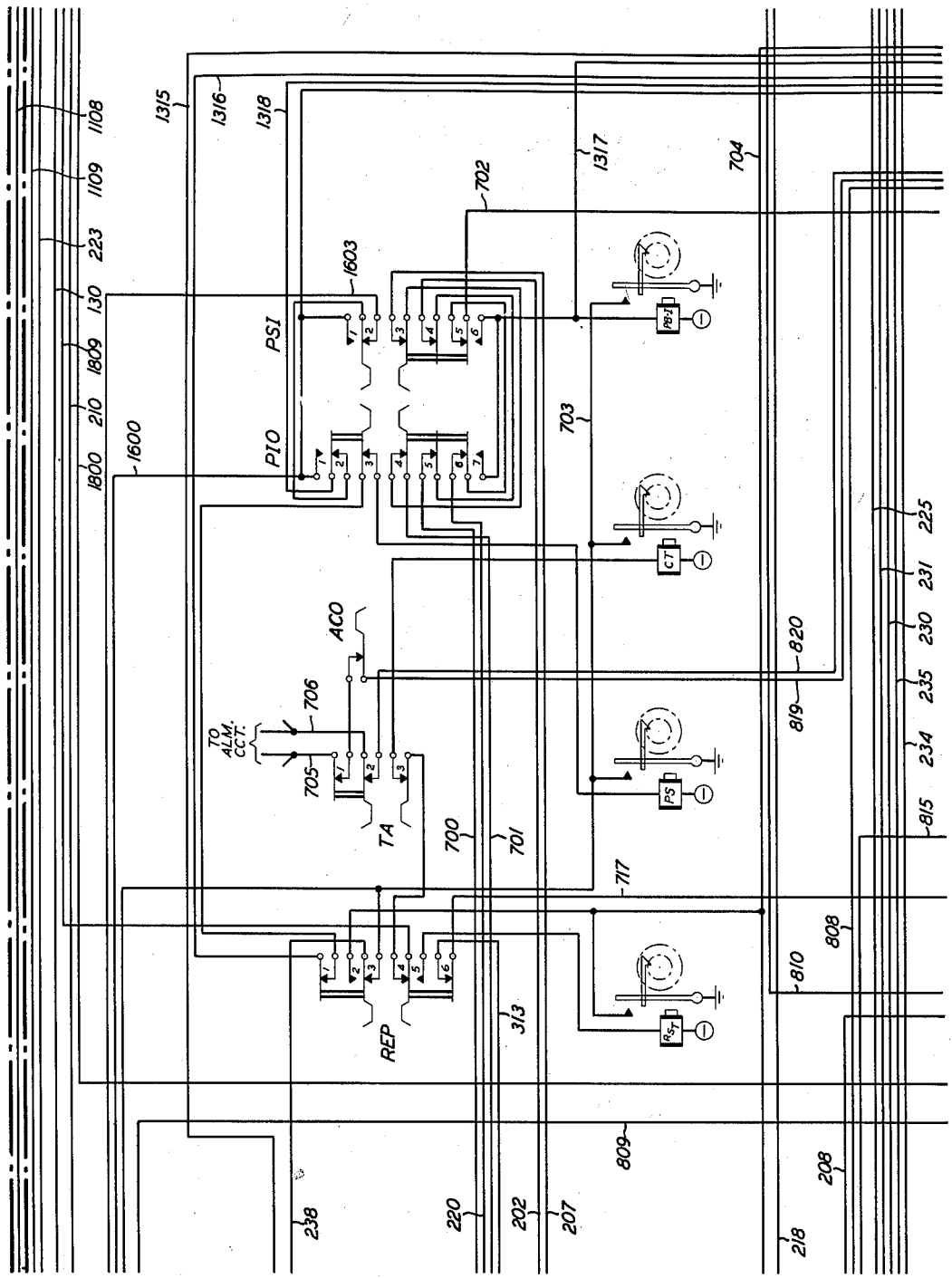
Fig. 7 shows the registers for registering the completion of various types of tests.
Figure 8:
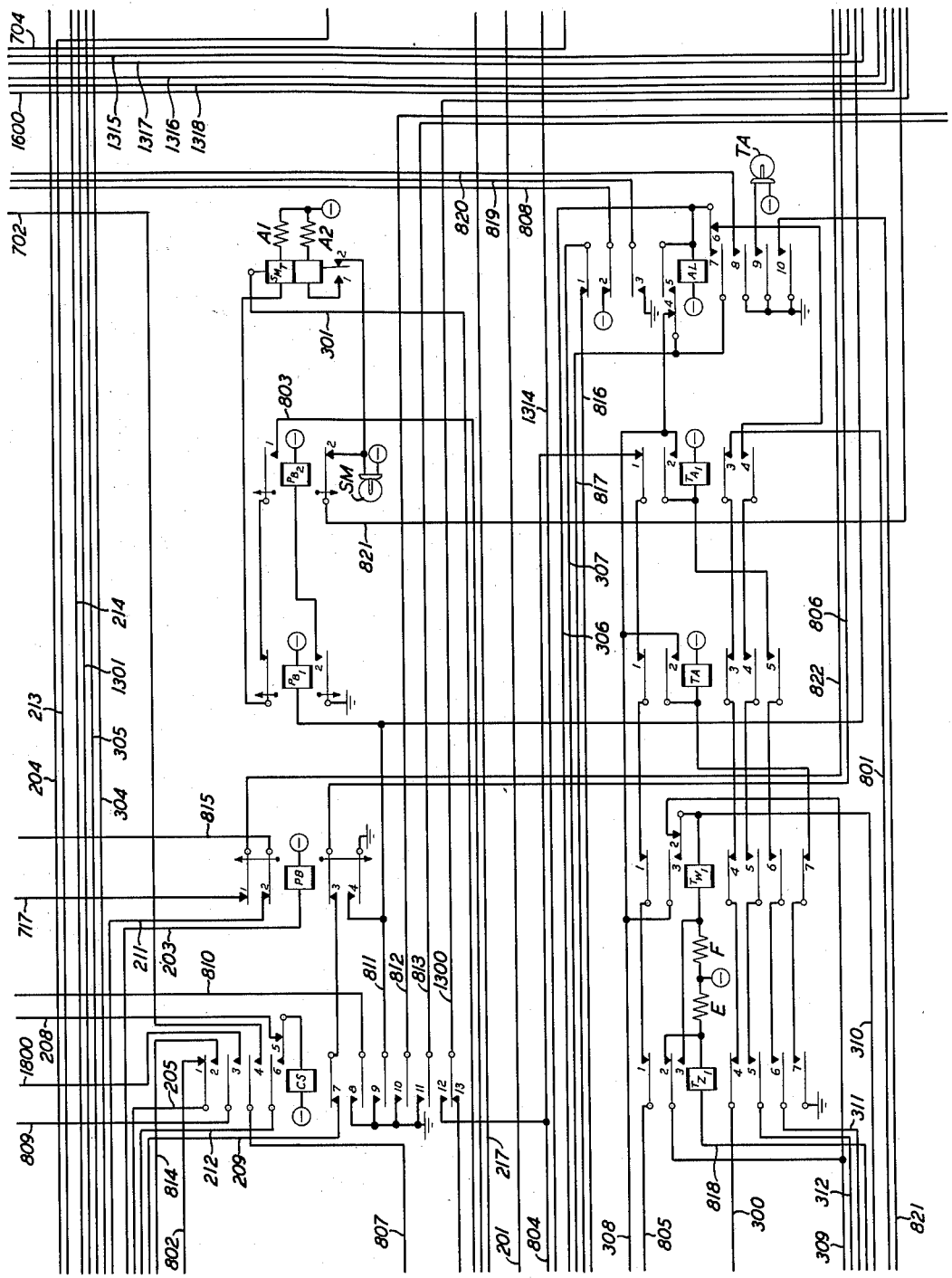
Fig. 8 shows another part of the timing circuit.
Figure 9:
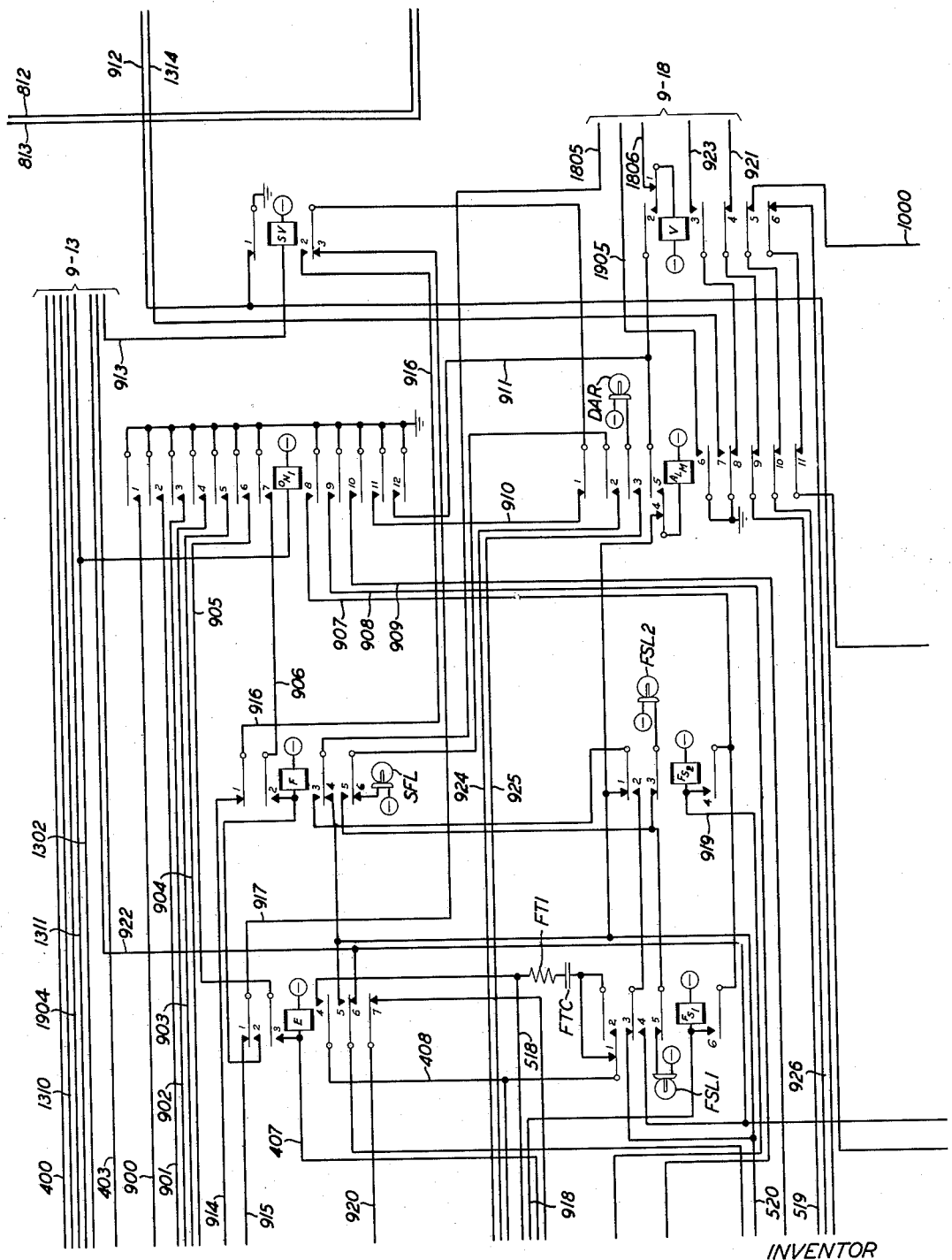
Fig. 9 shows one off-normal relay and an additional part of the supervisory signal counting circuit.

The decoder connector closes a plurality of circuits from the decoder to the test circuit including a set of fifteen conductors which appear at a set of terminals 303. There are five conductors for each of three code digits and the terminals 303 are grounded in accordance with the two-out-of-five code to set up a test code which is transmitted to the decoder when the decoder connector operates. The test code may be selected from those not required by or suitable for traffic. As shown in Fig. 3, terminals 303 are grounded in accordance with the code 208. Certain other conductors are extended to the test circuit which are grounded or connected to check conductors to satisfy the requirements of the decoder. Since these conductors are not involved in the operation of the test circuit they have not been shown.

As described in the above-identified Gooderham et al. application the decoder seizes the translator 1110 which translates the code, after which the marker connector 1111 is operated to select an idle marker 1112. The marker 1112 functions under the control of the translated code to operate trunk block connector 1100 and trunk block relay 1101. The marker then tests the busy test conductor provided by the test circuit and finding it apparently idle connects ground thereto as for a regular call. Ground connected to conductor 1109 causes relay MS(2) to operate.

Having completed the process of trunk selection as indicated by the operation of relay MS(2), the marker identifies the outgoing link frame on which the trunk under test appears by means of the multifrequency signal superimposed on the operating circuit for the select magnet 1102 and, similarly, identifies the incoming link frame on which the test circuit appears by the multifrequency signal superimposed on the operating circuit for select magnet 1107. It then selects an idle path through the link frames to connect the test circuit with the trunk under test as on a regular call.

Relay MS(2), in operating, connects ground over its contact 1 and contact 2 of relay BT1(2) to conductor 1301 which extends as previously traced to the busy test conductor 1700 of the trunk of Fig. 17. Over its contacts 1 and 2 relay MS(2) closes a circuit from ground to battery through the upper winding of relay BT(2). Relay BT(2) operates and locks through resistance BTR(2) and over its contact 2 to ground at contact 1 of relay MS(2). Relay MS(2) also closes a circuit from ground on contact 8 of relay ON(2), conductor 217, contact 3 of relay MS(2), conductor 225 to battery through the winding of relay SLA(12). Relay SLA(12) operates in this circuit and locks over its contact 5, conductor 1202, contact 4 of relay SLC(13) to ground on conductor 217.

When the marker has closed the cross-points of the link frames, it makes its usual checks for double connections and holding grounds and substitutes a battery test relay for ground on the circuit of relay MS(2) causing relay MS(2) to release. The marker also releases relay MT(2). Relay MT(2), when released, closes a circuit from ground on conductor 210, contact 2 of relay IR(18), conductor 1800, contact 3 of relay CS(8), conductor 809, contact 1 of relay MT(2) to conductor 226 which is the incoming sleeve conductor and is extended through the incoming link and outgoing link switches to conductor 1701 to the marker and over contact 4 of relay LO(17) to conductor 1700. In addition, relay MT(2) at its contact 10 connects direct ground to conductor 1109. Ground on conductors 1701 and 1109 satisfy the the marker, which now requests release by connecting ground to conductor 227 thereby operating relay RL(3). Relay RL(3) locks over its contact 5, contact 1 of relay TR(3) to ground on conductor 215.

When relay MS(2) releases, as above described, relay BT(2) remains operated in a locking circuit over the circuit previously traced to conductor 1700 and thence over contact 4 of relay LO(17) and conductor 1701 through the link switches to conductor 226.

When relay RL(3) operates, as above described, it opens the circuit of relay MC(2) causing that relay to release. With relay MC(2) released, the circuits of select magnets 1107 and 1102 are opened so that they may be used, if required, in connection with service calls. Relay MC(2) also disconnects battery from conductor 221 to release the decoder connector 1104 and thereby the decoder 1105 and the marker 1112. Relay RL(3) closes a circuit from ground over its contact 1, conductor 304, contact 7 of relay ST1(13) to battery through lamp OS(13). In addition, relay RL(3) closes a circuit from ground on conductor 102, contact 4 of relay BT1(2), contact 3 of relay BT(2), conductor 205, contact 2 of relay CS(8), conductor 814, contact 3 of relay RL(3), conductor 305 to battery through the winding of relay ST1(13). Relay ST1(13) operates in this circuit and locks over its contact 5 to ground on conductor 214.

Relay ST1(13), in operating, opens the circuit above traced for lamp OS(13) at its contact 7 and extends this circuit over its contact 6, contact 9 of relay SL1(13), contact 9 of relay SL0(13), contact 8 of relay SLC(13) to battery through lamp ASX(13). The operation of relay ST1(13) indicates the satisfactory completion of marker release and that the holding ground has been properly extended through the link switches.

If the holding ground had not been closed through the link switches, relay BT(2) would have released when the marker released relay MS(2). With relay BT(2) released the circuit for relay ST1(13) would not have been closed. The test circuit could not have proceeded with its operation and after the timing circuit had completed its function the lighted condition of lamp OS(13) would have indicated the absence of the holding ground.

When the marker releases and the test circuit is connected to the outgoing trunk, the test circuit is prepared to accept a delay-dial signal from the trunk. If the delay-dial signal is not removed after a suitable interval, the test circuit will time out as described hereinafter. When the delay-dial signal is changed to a start-dial signal, a one-half second timing interval is started to distinguish between a legitimate start-dial signal and a premature recorder flash. When a multifrequency trunk is being tested the incoming supervisory relay is given a non-operate test during the one-half second timing interval and, at the end of the interval an operate test is made before pulsing is started. When a dial type trunk is being tested, the non-operate test is made at the end of the one-half second timing interval and the operate test after pulsing has been completed. As previously mentioned, the trunk of Fig. 17 is one designed for multifrequency pulsing.

It will be remembered that, when relay MS(2) operated, it operated relay SLA(12) which locked under the control of relay SLC(13). With relay SLA(12) operated, a circuit is closed from battery through the winding of relay MFP(12), conductor 1203, contact 4 of relay MF(16), conductor 1601, contact 2 of relay SLA(12), conductor 1204, contact 1 of relay PF(14) to ground on conductor 217. Relay MFP(12) operates in this circuit and locks over its contact 5 to conductor 1204 and ground as above traced. With relay MFP(12) operated, a second locking circuit for relay SLA(12) extends from conductor 1202, over contact 9 of relay MFP(12), contact 4 of relay KP(12), conductor 218 to ground, over contacts 9 and 8 of relay ON(2). Relay SLA(12) also closes a circuit from ground over its contact 4, conductor 1207, contact 3 of relay GTF(18) to battery, through the winding of relay GTC(18).

With relay SLA(12) operated, as soon as relay MT(2) releases, the test circuit for the incoming supervisory relay of the trunk circuit may be traced from battery through the winding of relay SL(17), contact 7 of relay SL(17), contact 2 of relay OS(17), in simplex through the upper and middle windings of relay LO(17), windings of retard coil A(17), conductors 1702 and 1703 which are extended through the outgoing link and incoming link switches to conductors 228 and 229, contacts 3 and 5 of relay MT(2), conductors 230 and 231, contacts 8 and 6 of relay SLA(12) and thence over conductor 1205, lower winding of relay SL(13), resistance SL2(13) to ground on conductor 217.

At the same time, a circuit is closed from battery through resistance P(17), lower winding of the outgoing supervisory relay SVP(17), contact 3 of jack T(17), contact 5 of relay SL(17), windings of relay R(17), windings of retard coil B(17), conductors 1704 and 1705, through the outgoing link and incoming link switches to conductors 232 and 233, contacts 7 and 8 of relay MT(12), conductors 234 and 235, contacts 10 and 12 of relay SLA(12), conductor 1206, windings of relays OFH(20) and ONH(20), contact 4 of relay BD(20) to a reduced battery potential provided by the voltage divider including resistances ZN(20) and ZM(20).

When relay ST1(13) operates, as above described, it connects ground over its contacts 4 to conductor 1302 completing circuits for relays ON1(9) and ON2(5). Relay ON1(9) operates and connects ground to conductors 900 to 911. Relay ON2(5) also operates and connects ground to conductors 500 to 505. Relay ST1(13) also closes a circuit from ground over its contact 2, conductor 1303, contact 3 of relay PF(14), contact 4 of relay STP(14), contact 7 of relay U(14), contact 5 of relay TN(14), contact 5 of relay HU(14), contact 7 of relay SXD(14) to battery, through the winding of relay KPP(14). Relay KPP(14) operates in this circuit.

When the circuit connecting relays SL(17) and SL(13) is closed as above described, the resistance of the lower winding of relay SL(13) and of resistance SL2(13) provides a non-operate test for relay SL(17). However, relay SL(13) operates, closing its contact 2 to complete a circuit for relay SL1(13). Relay SL1(13) operates and locks over its contact 6 and either over contact 6 of relay SL0(13) or over contact 3 of relay SLT(13) to ground on conductor 213. Relay SL1(13) closes a circuit from battery through the winding of relay SLT(13), contact 5 of relay SL1(13), contact 5 of relay SL0(13) to ground on conductor 213, operating relay SLT(13) which opens one branch of the locking circuit of relay SL1(13), leaving relay SL1(13) locked under the control of relay SL0(13).

In the trunk circuit, relay SVP(17) is polarized by a circuit through its upper winding which may be traced from battery through resistance M1(17), contact 1 of relay SL(17), contact 2 of jack T(17), upper winding of relay SVP(17), contact 1 of jack T(17) to ground at contact 4 of relay G(17). As will be described hereinafter, if the distant office is not ready to receive pulses, ground will be connected to conductor 1708 by the composite signaling circuit 1720, over contact 10 of relay SL(17) in shunt of battery through resistance P(17) as a delay-dial indication. With ground on conductor 1708 the polarization of relay SVP(17) prevents its operation and if such ground is absent, the resistance of relays OFH(20) and ONH(20) is sufficient to also prevent the operation of relay SVP(17). Relays OFH(20) and ONH(20) are also polarized so that, as long as the ground is connected to conductor 1708, relay OFH(20) will be operated and when ground is removed from conductor 1708, relay ONH(20) will be operated.

When relay SL1(13) operates, as above described, it closes a circuit from ground at contact 1 of relay RL(3), conductor 304, contact 6 of relay ST1(13), contact 8 of relay SL1(13), conductor 1304 to the armature of relay OFH(20). If neither relay OFH(20) nor relay ONH(20) is operated, the circuit extends over contacts 1 of relays OFH(20) and ONH(20), conductor 2000, contact 3 of relay TG0(13) to battery through lamp BSX(13). The test circuit timing arrangement will then function to sound an alarm and the lighting of lamp BSX(13) will indicate that the pulsing simplex circuit has not been completed.

As long as the delay-dial signal is received from the trunk, relay OFH(20) operates and a circuit is closed from ground to conductor 1304 as above traced, contact 2 of relay OFH(20), conductor 2001, contact 1 of relay TG0(13) to battery, through lamp DDL(13).

When the delay-dial signal is removed as will be described hereinafter, relay OFH(20) releases and relay ONH(20) operates. A circuit is then closed from ground on conductor 1304, over contact 1 of relay OFH(20), contact 2 of relay ONH(20), conductor 2002, contact 5 of relay TG0(13) to battery through the winding of relay TG0(13). Relay TG0(13) operates and locks over its contact 6 to ground on conductor 1304. With relay TG0(13) operated, ground on conductor 2002 is extended over contact 4 of relay TG0(13) to battery through lamp ONH(13).

Relay TG0(13) also closes a circuit from ground over its contact 8, conductor 1308 to battery through the winding of relay SPA(19). Relay SPA(19) operates in this circuit and locks over its contact 4, contact 5 of relay SPC(19), conductor 1800 to ground at contact 3 of relay ST1(13).

A premature subsequent off-hook signal causes the reconnection of ground to conductor 1708 to release relay ONH(20) and reoperate relay OFH(20). With relay TG0(13) operated, a circuit would be closed from ground on conductor 1304, contact 2 of relay OFH(20), conductor 2001, contact 2 of relay TG0(13), conductor 1305, contact 1 of relay LDG(14), contact 2 of relay MOP(14), contact 4 of relay PFL(14) to battery through the winding of relay PFL(14).

With relay PFL(14) operated, lamp PFLL(14) will be lighted to indicate a premature flash. At its contact 6, relay PFL(14) extends ground on conductor 213 to conductor 1314 and over contact 1 of relay TB(3), which is operated at this time, to conductor 306 and battery through the winding of alarm relay AL(8). In addition, relay PFL(14) extends its operating ground over its contact 3 to battery through lamp OFH(14). Lamp OFH(14) will follow the premature flashes. At its contact 1, relay PFL(14) opens the circuit of relay SL0(13) and at its contact 2, closes a circuit from ground on conductor 213, contact 5 of relay SLC(13), contact 4 of relay PSL(13), conductor 1402, contact 2 of relay PFL(14), conductor 2201, contact 3 of relay TST(22) to battery through resistance PGR(22) to stop the timing operation.

Likewise, if during the timing interval relay SL(17) should operate falsely, opening the circuit of relay SL(13) as will be described hereinafter, the release of relay SL(13) closes a circuit from ground over its contact 1, contact 8 of relay SL0(13), contact 7 of relay SL1(13), contact 2 and winding of relay PSL(13) to battery. Relay PSL(13) operates and locks over its contact 3 to ground on conductor 213 lighting lamp PSLL(13) to indicate that the SL relay of the trunk operated prematurely. At its contact 4, relay PSL(13) opens the circuit closed by relay PFL(14) for stopping the timing and at its contact 1, connects ground on conductor 213 to conductor 1314 to operate relay AL(8).

Relay MFP(12), which is operated as previously described, prepares the test circuit for multifrequency out pulsing. Relay MFP(12) closes a circuit from ground over its contact 4, conductor 1208 to battery through the winding of relay MFC(15), operating the latter relay. Relay MFC(15) extends the multifrequency currents, as supplied from source 1500, through the code selector switches A1(15) to C3(15) to the contacts of the digit advance relays KPP(14), HU(14), TN(14), U(14) and STP(14). Relay MFP(12) also connects the two-wire side of the hybrid coil HY(12) including the lower left winding of coil A(12) and the upper left winding of coil B(12) over its contacts 2 and 6, conductors 1209 and 1210 to the armature of relay PG1(22) in the pulse generating circuit. At its contact 3, relay MFP(12) connects resistance MF(12) across conductors 1209 and 1210. At its contact 11, relay MFP(12) opens a shunt around resistance S(12) to include that resistance in the balancing winding of the hybrid coil HY(12).

When relay GTC(18) operates as above described, it closes a circuit from battery through the winding of relay TTR(21), conductor 2100 to ground at contact 3 of relay GTC(18). With relays GTC(18) and TTR(21) operated, the operation of relay TG0(13), above described, initiates the measurement of the one-half second timing interval above mentioned by closing a circuit from battery through resistance AJ(13), contact 7 of relay TG0(13), conductor 1306, contact 5 of relay GTF(18), contact 2 of relay GTC(18), conductor 1801, winding of relay TST(22), conductor 2204, contact 7 of relay TTR(21), contact 5 of relay W(21), contact 5 of relay DE1(21) to ground.

The operation of relay TST(22) disconnects ground from conductor 2205 in shunt of battery through resistance PGR(22). The lower winding of relay PG(22) and the windings of relays P(22) and PCK(22) are now energized in the reverse direction. Relays P(22) and PCK(22) immediately close their contacts 2. However, the removal of ground from conductor 2205 permits condenser PGC(22) to charge through the upper winding of relay PG(22). This charging current is in a direction to cause relay PG(22) to hold its contact 1 closed and is initially strong enough to overcome the reverse energization of the lower winding. As the condenser becomes charged, the current flow in the upper winding decreases and the lower winding becomes effective to cause relay PG(22) to close its contact 2. As soon as this contact is closed, ground on conductor 813 is connected to conductor 2205 and restores the energization of the lower winding of relay PG(22) and of the windings of relays P(22) and PCK(22) to the original direction. Relays P(22) and PCK(22) immediately close their contacts 1 but condenser PGC(22) now discharges through the upper winding of relay PG(22), opposing the energization of the lower winding of relay PG(22) for an interval, after which relay PG(22) opens its contact 2 and the operations above described are repeated. Relay P(22) is ineffective at this time since the circuits closed over its contacts 1 and 2 are open elsewhere.

When relay PCK(22) closes its contact 2, it completes a circuit from ground over contact 8 of relay CS(8), conductor 810, contact 1 of relay KP(12), conductor 1201, contact 1 of jack PCKJ(22), contact 2 of relay PCK(22), contact 2 of jack PCKJ(22), conductor 2206, contact 4 of relay PE(22) to battery through the winding of relay PC(22). Relay PC(22) operates in this circuit and locks through the upper winding of relay PE(22), contact of relay PD(22), contact 1 of relay PC(22), conductor 2207, contact 4 of relay DE2(21) to ground on conductor 1201. Relay PE(22) does not operate in this locking circuit, being shunted over its contact 4 by the operating circuit for relay PC(22). When relay PCK(22) opens its contact 2, relay PE(22) operates. At the second closure of its contact 2 by relay PCK(22), ground is connected as above traced to conductor 2206, over contact 3 and through the lower winding of relay PE(22) to battery through the winding of relay PD(22). Relay PE(22) is held operated and relay PD(22) operates in this circuit, relay PD(22) opening the locking circuit for relay PC(22) which releases. When relay PCK(22) opens its contact for the second time, relays PE(22) and PD(22) release and the pulse divider made up of relays PE(22), PC(22) and PD(22) is ready for reoperation.

When relay PE(22) operates at the end of the first pulse from contact 2 of relay PCK(22), it closes a circuit from ground on conductor 1201, contact 3 of relay DE2(21), conductor 2101, contact 1 of relay TST(22), contact 2 of relay PE(22), conductor 2208, contact 7 of relay PC4(21), contact 4 of relay PC2(21), contact 6 of relay PC3(21), contact 6 of relay PC5(21) to battery through the upper winding of relay PC1(21). Relay PC1(21) operates and closes a locking circuit for itself from battery through its lower winding and over its contact 4, contact 5 of relay PC2(21), contact 4 of relay PC3(21), contact 3 of relay PC4(21), contact 4 of relay PC5(21) to ground on conductor 2101.

When relay PE(22) releases at the end of the second pulse from relay PCK(22), a circuit is closed from ground as above traced to conductor 2101, contact 1 of relay TST(22), contact 1 of relay PE(22), conductor 2209, contact 3 of relay PC1(21) to battery through the winding of relay PC2(21). Relay PC2(21) operates and locks over its contact 6, contact 4 of relay PC3(21) and thence as traced for the locking circuit of relay PC1(21) to ground on conductor 2101. Relay PC2(21), at its contact 5, opens the locking circuit of relay PC1(21) and that relay releases. The operation of relay PC2(21) at this time initiates a series of operations which will be described hereinafter but, for convenience, the operation of the counting relays in response to a full complement of ten pulses will be described at this time. From the circuits above traced for relays PC1(21) and PC2(21), it will be noted that with relay PE(22) operated, ground is connected to conductor 2208, while with relay PE(22) released, ground is connected to conductor 2209. Therefore, conductor 2208 is grounded at the end of each odd numbered pulse and conductor 2209 is grounded at the end of each even numbered pulse. With conductor 2208 grounded at the end of the third pulse a circuit is completed over contact 7 of relay PC4(21) and contact 3 of relay PC2(21) to battery through the winding of relay PC3(21). Relay PC3(21) operates and locks over its contact 5 to the previously traced locking circuit and at its contact 4 opens the locking circuit of relay PC2(21) which releases. At the end of the fourth pulse, with conductor 2209 grounded, a circuit is closed over contact 3 of relay PC3(21) to battery through the winding of relay PC4(21). Relay PC4(21) operates and locks over its contact 4 to the above-traced locking circuit and at its contact 3 opens the locking circuit for relay PC3(21) which releases. At the end of the fifth pulse ground on conductor 2208 completes a circuit over contact 6 of relay PC4(21) to battery through the winding of relay PC5(21). Relay PC5(21) operates and locks in a circuit from battery through its winding, over contact 6 of relay PC1(21), contact 5 of relay PC5(21) to ground on conductor 2101. At its contact 4, relay PC5(21) opens the locking circuit of relay PC4(21) which releases. At the end of the sixth pulse ground on conductor 2209 completes a circuit over contact 3 of relay PC5(21) to battery through the upper winding of relay PC6(21). Relay PC6(21) operates and locks through its lower winding and over its contact 3 directly to conductor 2101. Since relay PC5(21) is locked under the control of relay PC1(21), relay PC5(21) remains operated at the end of the sixth pulse. At the end of the seventh pulse ground on conductor 2208 closes a circuit for operating relay PC1(21) which extends as above traced except that contact 5 of relay PC6(21) is substituted for contact 6 of relay PC5(21). Relay PC1(21) closes a temporary locking circuit for itself from battery through its lower winding over its contact 4, contact 5 of relay PC2(21), contact 4 of relay PC3(21), contact 5 of relay PC1(21), contact 4 of relay PC6(21) to ground on conductor 2101. However, relay PC1(21) opens the locking circuit of relay PC5(21) and that relay releases, to restore the original locking circuit. Relays PC2(21), PC3(21) and PC4(21) operate at the end of the eighth, ninth and tenth pulses locking and releasing the previously operated counting relay the same as above described.

When relay PC2(21) operated as above described, a circuit is closed from ground over contact 1 of relay Z(21), contact 2 of relay TTR(21), conductor 2102, contact 4 of relay GTC(18), conductor 1802, contact 1 of relay PC2(21), contact 1 of relay PC6(21), winding of relay DE1(21) to battery through resistance CB(21). However, with contact 1 of relay PCK(22) closed, ground is connected from conductor 1201 over contact 1 of relay PCK(22), contact 3 of jack PCKJ(22), conductor 2203, contact 1 of relay DE1(21) to resistance CB(21) and battery in shunt of the winding of relay DE1(21). When relay PCK(22) opens its contact 1 and closes its contact 2, relay DE1(21) operates, opening the circuit of relay TST(22) causing that relay to release. However, with relay DE1(22) operated, ground is disconnected from contact 3 of relay TST(22) so that conductor 2205 is not grounded and relay PG(22) continues to pulse. Relay TST(22) disconnects ground from the armature of relay PE(22) to prevent the operation of any additional counting relays. When relay PCK(22) recloses its contact 1, connecting ground to conductor 2203, a circuit is extended over contact 2 of relay DE1(21) to battery through the winding of relay DE2(21). Relay DE2(21) operates and closes a holding circuit for relay DE1(21) over contact 2 of relay DE2(21) and contact 2 of relay DE1(21) to ground connected to conductor 2203 under the control of relay PCK(22). At its contact 3 relay DE2(21) disconnects ground from conductor 2101 to release relay PC2(21) and at its contact 4 disconnects ground from conductor 2207. The disconnection of ground from conductor 2207 at this time has no effect but, if an odd number of pulses had been counted, leaving relays PC(22) and PE(22) locked to conductor 2207, the removal of ground from conductor 2207 would insure the restoration of the pulse dividing relays to normal.

Figure 21:
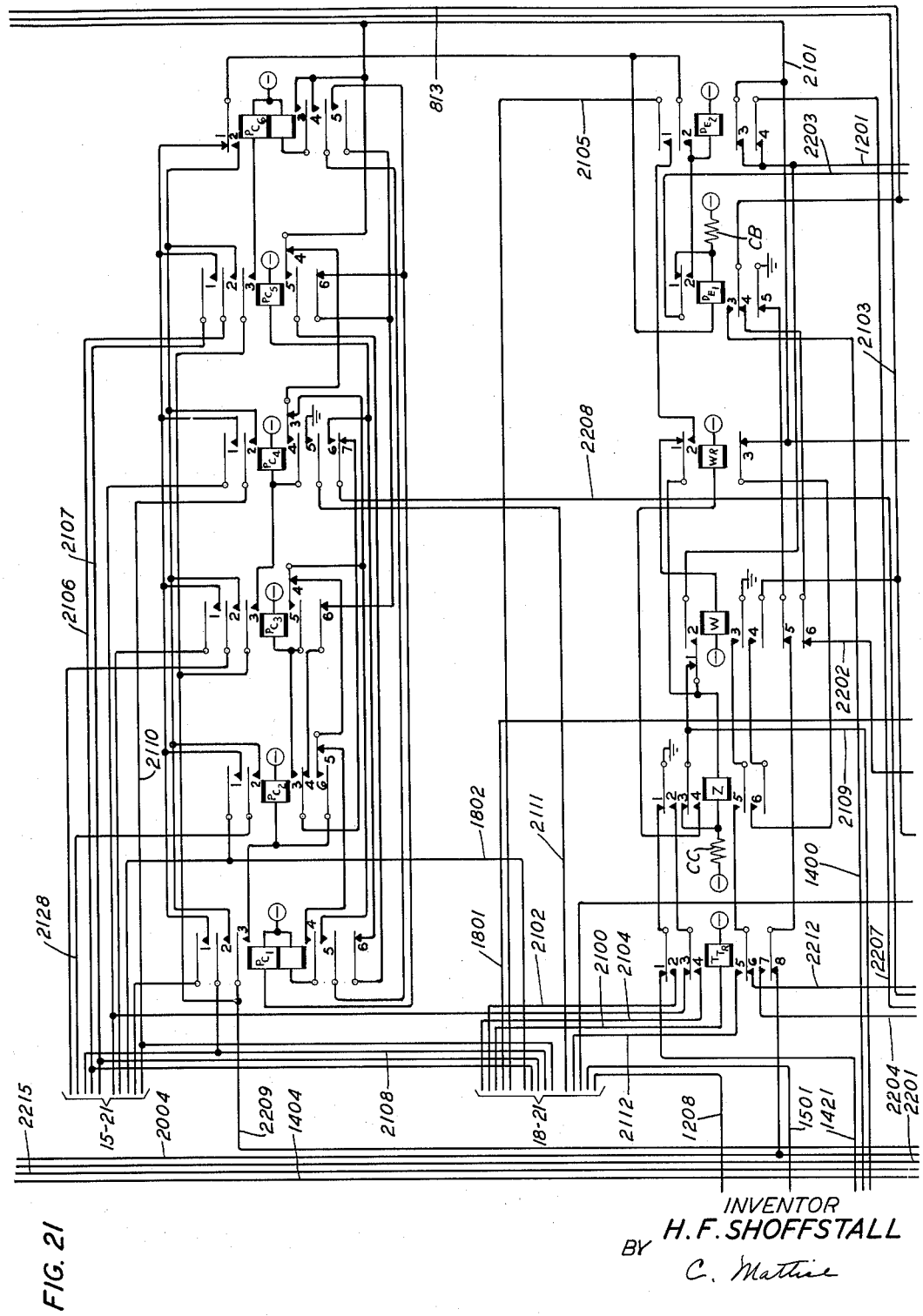
Fig. 21 shows a plurality of counting relays.
Figure 22:
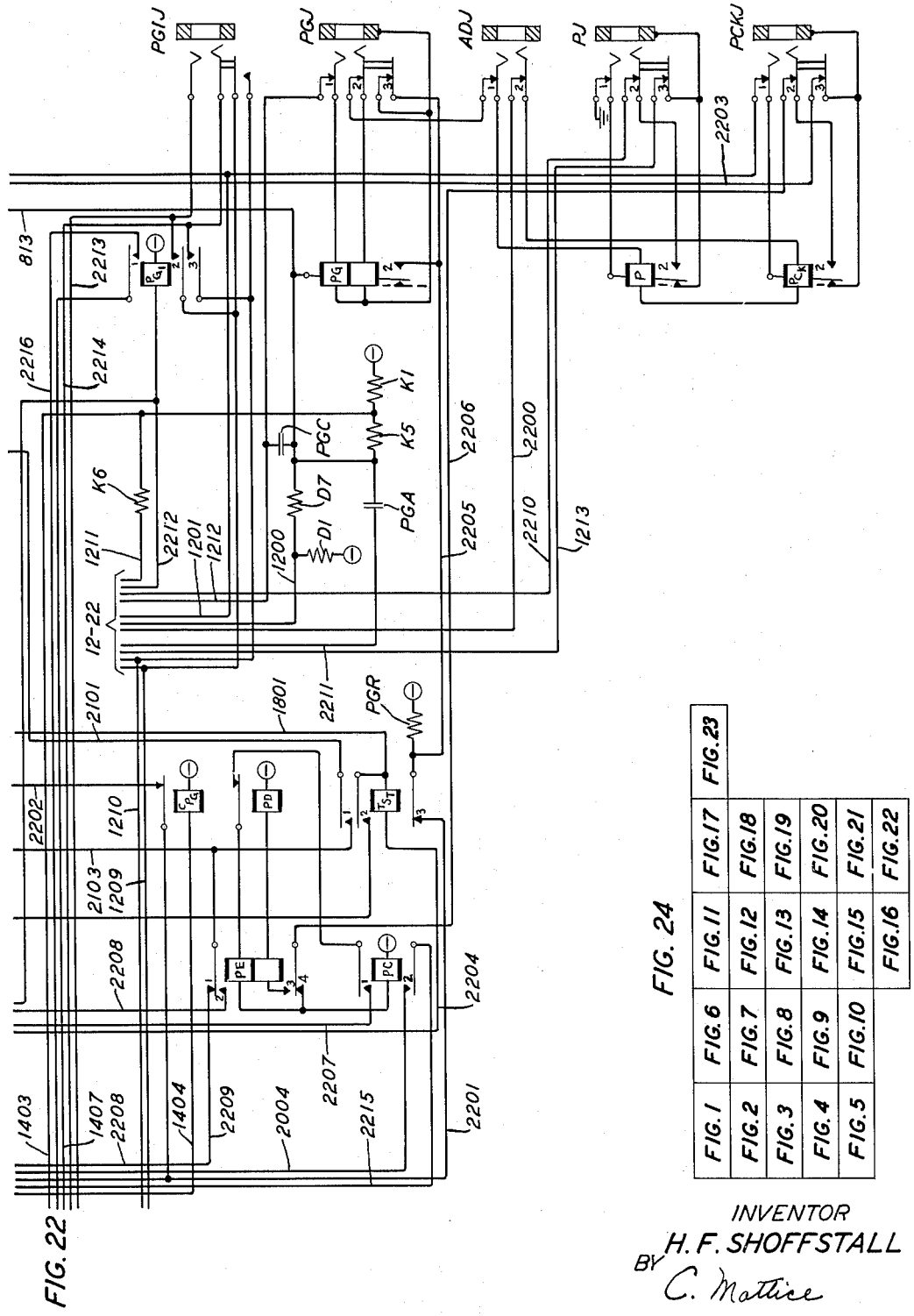
Fig. 22 shows the pulse generating circuits.

With relay DE1(21) operated, a circuit is closed from battery through the winding of relay W(21), contact 1 of relay WR(21), contact 1 of relay W(21), conductor 2109, contact 5 of relay LDG(14), conductor 1400, contact 3 of relay DE1(21) to ground on conductor 813. Relay W(21) operates in this circuit and locks over contact 1 of relay WR(21) and contact 2 of relay W(21) to ground on conductor 1201. Relay W(21) also closes a circuit from battery through resistance CC(21) and the winding of relay Z(21), contact 2 of relay W(21) to ground on conductor 1201 but relay Z(21) cannot operate, since it is shunted by ground connected to resistance CC(21) over contact 3 of relay Z(21) and conductor 2109 under the control of relay DE1(21) as above traced. When relay PCK(21) again opens its contact 1, relays DE1(21) and DE2(21) release, opening the shunt around the winding of relay Z(21) and permitting that relay to operate. Relay W(21), however, opens the circuit of relay TST(21) so that it cannot be operated when relay DE1(21) releases. With relay Z(21) operated, ground on conductor 2101 is connected over contact 3 of relay WR(21), contact 6 of relay Z(21), contact 4 of relay W(21) to conductor 2103 and the armature of relay PE(22). Relays PC(22), PE(22) and PD(22) again operate under the control of relay PCK(22) in turn operating the counting relays of Fig. 21.

When relay PC2(21) is again operated, a circuit is closed from ground over contact 2 of relay Z(21), contact 4 of relay TTR(21), conductor 2104, contact 5 of relay GTC(18), conductor 1802, contact 1 of relay PC2(21), contact 1 of relay PC6(21) to battery through the winding of relay DE1(21) as above. When relay PCK(22) opens its contact 1, relay DE1(21) operates. Relay DE1(21) closes the circuit above traced from conductor 813 to conductor 2109 and thence over contact 4 of relay Z(21) to battery through the winding of relay WR(21). Relay WR(21) operates, opening the circuit of relay W(21) causing the latter relay to release. Relay Z(21) is held operated over contact 1 of relay W(21) and conductor 2109 to ground under the control of relay DE1(21). At the next closure of contact 1 of relay PCK(22), relay DE2(21) operates releasing the counting relays and closing the circuit from ground on conductor 2109, contact 1 of relay W(21), contact 2 of relay WR(21), contact 1 of relay DE2(21), conductor 2105, contact 1 of relay GTC(18) to battery through the winding of relay GTF(18). Relay GTF(21) operates in this circuit to indicate the termination of the timing operation and locks over its contact 4 and conductor 1207 to ground at contact 4 of relay SLA(12).

With relay GTF(18) operated, the circuit of relay GTC(18) is opened and that relay releases. If relay ONH(20) remains operated until the end of the timing interval as it should, and neither relay PFL(14) nor relay PSL(13) is operated, the operation of relay GTF(18) closes a circuit from battery through the winding of relay SLO(13), conductor 1307, contact 5 of relay SXD(14), conductor 1401, contact 1 of relay GTF(18), conductor 1803, contact 1 of relay PFL(14), conductor 1402, contact 4 of relay PSL(13), contact 5 of relay SLC(13) to ground on conductor 213. Relay SLO(13) operates and closes a circuit from ground over its contact 1 and contact 2 of relay SL1(13) to battery through lamp SLO(13). At its contact 2, relay SLO(13) disconnects the trunk busy lead, which has been extended as previously traced to conductor 204, from the locking circuit of relay BT(2) causing relay BT(2) to release. At its contact 5, relay SLO(13) also opens the circuit of relay SLT(13) and the latter relay starts to release slowly. At its contact 4 relay SLO(13) connects ground on conductor 213 through resistance SL3(13) and the upper winding of relay SL(13). This reduces the resistance in the circuit of relay SL(17) sufficiently to permit relay SL(17) to operate. Relay SL(17), in operating, closes a locking circiut for itself over its contact 8 to ground at contact 4 of relay G(17) and opens the circuit of relay SL(13). Relay SLO(13) also opens the holding circuit of relay SL1(13) which releases quickly and, during the slow release time of relay SLT(13), connects conductor 204, which extends as above traced to the trunk busy conductor, over contact 3 of relay SLO(13), contact 3 of relay SL1(13), contact 1 of relay SLT(13) to battery through the winding of relay SLC(13). Relay SLC(13) operates from the busy ground supplied as previously traced by the test circuit and locks over its contact 6 to ground on conductor 213.

If relay SL(17) fails to operate or there is a false battery connection on conductor 1702 or conductor 1703, relays SL(13) and SL1(13) will fail to release. When relay SLT(13) releases, it recloses at its contact 3 the supplementary locking circuit for relay SL1(13) to conductor 213 and when the test circuit times out, lamp SLO(13) lighted will indicate a failure of the trunk relay SL(17) to operate. If the false battery disappears after relay SLT(13) has released and before the test circuit times out, relay SL(13) will release and with relay SL1(13) held operated, closes a circuit from ground over contact 1 of relay SL(13), contact 7 of relay SLO(13), contact 4 of relay SL1(13), contact 2 of relay SLT(13) to battery through lamp TXB(13) to indicate a temporary battery cross. If there are no troubles present, relay SLC(13) operates as above described, opening at its contact 5 the operating circuit for relay SLO(13) and causing that relay to release.

Relay GTF(18) was operated when contacts 1 of relays P(22) and PCK(22) were closed. At the end of the pulse period relays P(22) and PCK(22) open their contacts 1 and close their contacts 2. The opening of contact 1 of relay PCK(22) causes relays DE1(21) and DE2(21) to release. With relay TST(22) released by the operation of relay GTF(18), the release of relay DE1(21) connects ground on conductor 813 over contact 4 of relay DE1(21), contact 6 of relay W(21), conductor 2202, contact of relay CPG(22) and contact 3 of relay TST(22) to conductor 2205 to stop the pulsing.

The test circuit is now ready to transmit the designation of the test line to the distant office. Assuming that this designation is 861, switches A1(15) to A3(15) will be set in position 8, switches B1(15) to B3(15) will be set in position 6 and switches C1(15) to C3(15) will be set in position 1.

With contact 2 of relay P(22) closed, a circuit is now completed from ground over contact 1 of jack PJ(22), contact 2 of relay P(22), contact 2 of jack PJ(22), conductor 2210, contact 6 of relay GTF(18), conductor 1804, contact 10 of relay MFP(12) to battery through the winding of relay KP(12). Relay KP(12) operates in this circuit and locks in a circuit from battery through the winding of relay KP(12), contact 10 of relay MFP(12), contact 5 of relay KP(12) to ground on conductor 218. With relay KP(12) operated, the lower winding of relay PG(22) is connected as above traced to conductor 2200 and thence over contact 3 of relay KP(12), conductor 1211 through resistance K6(22), conductor 1403 to reduced battery potential provided by resistances K5(22) and K1(22). Relay KP(12) also connects condenser PGA(22) over conductor 2211, contact 6 of relay KP(12) and conductor 1212 in parallel with condenser PGC(22). Until relay KP(12) operates, condenser PGA(22) is connected over conductor 2211 and contact 7 of relay KP(12) through resistance KPR(12) to ground on conductor 218 to hold it discharged. These changes in the circuits of relay PG(22), resulting from the operation of relay KP(12), cause it to generate pulses at the speed required for multifrequency out pulsing.

Relay KP(12) also disconnects ground from conductor 1201 to prevent the operation of the counting relays during multifrequency pulsing. In addition, relay KP(12) prepares a circuit from battery through the winding of relay PG1(22), conductor 2212, contact 8 of relay KP(12), conductor 1213, contact 3 of jack PJ(22) to contact 1 of relay P(22). Since relay P(22) is now energized in a direction to hold its contact 2 closed, relay PG1(22) does not operate at this time. In addition, relay KP(12) at its contact 4 opens the supplementary locking circuit for relay SLA(12) and the latter relay releases, provided the test of relay SL(17) has been satisfactorily completed and relay SLC(13) has operated as above described.

With relay SLA(12) released, conductors 230 and 231, which are connected as previously traced to the trunk conductors 1702 and 1703, are now extended over contacts 9 and 7 of relay SLA(12), contacts 5 and 7 of key 4WT(12) to the lower windings of the repeating coil B(12) forming part of the hybrid coil HY(12) and conductors 234 and 235, which are connected as previously traced to the trunk conductors 1704 and 1705, are now extended over contacts 13 and 11 of relay SLA(12), contacts 4 and 2 of key 4WT(12) to the upper winding of repeating coil A(12) forming part of the hybrid coil HY(12). Relay SLA(12), at its contact 4, opens the locking circuit of relay GTF(18) causing that relay to release. Relay SLA(12) in releasing, also closes a circuit from ground on conductor 217, contact 1 of relay PF(14), conductor 1204, contact 1 of relay SLA(12), contact 8 of relay MFP(12), conductor 1214, contact 9 of relay MOP(14), conductor 1404 to battery through the winding of relay CPG(22).

When relay CPG(22) operates, ground is removed from conductor 2205 causing relay PG(22) to start pulsing. Relay P(22) immediately closes its contact 1 to complete the circuit of relay PG1(22) as above traced. Relay PG1(22) connects the input winding of the hybrid coil HY(12) over contacts 2 and 6 of relay MFP(12), conductors 1209 and 1210, contacts 2 and 3 of relay PG1(22), conductors 2213 and 2214, contacts 10 and 11 of relay SXD(14), contacts 7 and 9 of relay KPP(14), conductors 1405 and 1406, contacts 2 and 5 of relay MCF(14) to conductors 1512 and 1520 leading to the multifrequency supply circuit 1500. The frequencies supplied to conductors 1512 and 1520 constitute a preliminary or key pulse signal necessary to prepare the receiving circuit at the distant end to receive the multifrequency code pulses. Following is a table showing the frequencies and conductors corresponding to the various digits and to the special signals:

| Digit or Signal | Frequencies | Conductors |
|---|---|---|
| 0 | 1300~ | 1514 |
|   | 1500~ | 1517 |
| 1 | 700~ | 1510 |
|   | 900~ | 1511 |
| 2 | 700~ | 1510 |
|   | 1100~ | 1512 |
| 3 | 900~ | 1511 |
|   | 1100~ | 1512 |
| 4 | 700~ | 1510 |
|   | 1300~ | 1514 |
| 5 | 900~ | 1511 |
|   | 1300~ | 1514 |
| 6 | 1100~ | 1512 |
|   | 1300~ | 1514 |
| 7 | 700~ | 1510 |
|   | 1500~ | 1517 |
| 8 | 900~ | 1511 |
|   | 1500~ | 1517 |
| 9 | 1100~ | 1512 |
|   | 1500~ | 1517 |
| KP | 1100~ | 1512 |
|   | 1700~ | 1520 |
| ST | 1500~ | 1517 |
|   | 1700~ | 1520 |

Relay PG1(22) also closes a circuit from battery through the winding of relay HU(14), contact 11 of relay MOP(14), contact 4 of relay KPP(14), conductor 2216, contact 1 of relay PG1(22), conductor 1407, contact 6 of relay KPP(14) to ground over the operating circuit for relay KPP(14). Relay HU(14) operates in this circuit and locks over its contact 6 and contact 5 of relay TN(14), contact 7 of relay U(14), contact 4 of relay STP(14), contact 3 of relay PF(14), conductor 1303 to ground at contact 2 of relay ST1(13). At its contact 5, relay HU(14) opens the operating circuit of relay KPP(14) but that relay is held operated as long as relay PG1(22) is operated over its contact 6, conductor 1407, contact 1 of relay PG1(22), conductor 2216, contact 4 of relay KPP(14), contact 11 of relay MOP(14) and the locking circuit for relay HU(14).

When relay P(22) opens its contact 1, relay PG(22) releases, in turn releasing relay KPP(14). As soon as relay KPP(14) releases, it connects conductor 1211 to conductor 1403 over its contact 1 thereby short-circuiting resistance K6(22) to decrease the pulse period for transmitting the digits.

At the next operation of relay PG1(22) the trunk conductors are connected to conductors 2213 and 2214 as previously traced, conductors 2213 and 2214 being connected over contacts 10 and 11 of relay SXD(14), contacts 8 and 10 of relay KPP(14), contacts 7 and 9 of relay HU(14), conductors 1408 and 1409, contacts 5 and 10 of relay MFC(15), brushes of switches A1(15) and A2(15) to conductors 1511 and 1517 to transmit a signal representing the digit 8.

In the manner previously described, relay PG1(22) closes a circuit from ground on the locking circuit of relay HU(14), over contact 4 of relay HU(14), contact 5 of relay KPP(14), conductor 1407, contact 1 of relay PG1(22), conductor 2216, contact 3 of relay KPP(14), contact 2 of relay HU(14) to battery through the winding of relay TN(14). Relay TN(14) operates in this circuit and locks over its contact 6 and contact 7 of relay U(14) to ground as previously traced. At its contact 5, relay TN(14) opens the previously traced locking circuit for relay HU(14) but the latter relay remains operated over its contacts 6 and 4 and the operating and locking circuits of relay TN(14) until relay PG1(22) releases.

When relay PG1(22) releases, relay HU(14) releases and conductors 2213 and 2214 are extended over contacts 10 and 11 of relay SXD(14), contacts 8 and 10 of relay KPP(14), contacts 8 and 10 of relay HU(14), contacts 7 and 9 of relay TN(14), conductors 1410 and 1411, contacts 4 and 9 of relay MFC(15), brushes of switches B1(15) and B2(15) to conductors 1514 and 1512.

When relay PG1(22) again operates, it connects conductors 2213 and 2214 to the trunk conductors as previously traced, to transmit a signal representing the digit 6 to the distant office. At the same time, relay PG1(22) closes a circuit for relay U(14) extending from battery through the winding of relay U(14), contact 2 of relay TN(14), contact 1 of relay HU(14), contact 3 of relay KPP(14), conductor 2216, contact 1 of relay PG1(22), conductor 1407, contact 5 of relay KPP(14), contact 3 of relay HU(14), contact 4 of relay TN(14), contact 7 of relay U(14), contact 4 of relay STP(14) to ground as above traced. Relay U(14) operates and locks over its contact 8 and contact 4 of relay STP(14) to ground. Relay U(14) opens the locking circuit for relay TN(14) but relay TN(14) is held operated over its contacts 5 and 4 and the operating and locking circuits of relay U(14) until relay PG1(22) releases.

When relay PG1(22) releases, relay TN(14) releases and conductors 2213 and 2214 are extended as previously traced to the lower armatures of relay TN(14) and thence over contacts 8 and 10 of relay TN(14), contacts 9 and 11 of relay U(14), conductors 1412 and 1413, contacts 3 and 8 of relay MFC(15), brushes of switches C1(15) and C2(15) to conductors 1510 and 1511.

When relay PG1(22) reoperates, conductors 2213 and 2214 are connected to the trunk conductors and a signal representing the digit 1 is transmitted to the distant office. In addition, relay PG1(22) closes a circuit for relay STP(14) extending from battery through the winding of relay STP(14), over contact 3 of relay SXD(14), contact 4 of relay U(14), contact 1 of relay TN(14), contact 1 of relay HU(14) and thence as previously traced over the contact of relay PG1(22) to contact 3 of relay HU(14), contact 3 of relay TN(14), contact 6 of relay U(14), contact 4 of relay STP(14), contact 3 of relay PF(14) to ground over conductor 1303. Relay STP(14) operates and locks over its contact 5 and contact 3 of relay PF(14) to ground on conductor 1303. Relay STP(14) opens the locking circuit of relay U(14) but that relay is held operated over its contacts 8 and 6 and the operating and locking circuits of relay STP(14) until relay PG1(22) releases.

When relay PG1(22) releases, relay U(14) also releases and conductors 2213 and 2214 are connected as previously traced to the lower armatures of relay U(14), over contacts 10 and 12 of relay U(14), contacts 6 and 7 of relay STP(14), conductors 1414 and 1415, contacts 1 and 7 of relay MFC(14) to conductors 1520 and 1517.

When relay PG1(22) reoperates to connect conductors 2213 and 2214 to the trunk conductors, a final or start pulse is transmitted to the distant office. Relay PG1(22) also closes a circuit from battery through the winding of relay PF(14), contact 2 of relay STP(14), contact 3 of relay U(14), contact 1 of relay TN(14) and thence as previously traced to contact 3 of relay TN(14), contact 5 of relay U(14), contact 3 of relay STP(14), contact 3 of relay PF(14) to ground on conductor 1303. Relay PF(14) operates in this circuit and locks over its contact 4 to ground on conductor 1303. Relay PF(14) opens the locking circuit of relay STP(14) but relay STP(14) is held operated over its contacts 5 and 3 and the operating and locking circuits of relay PF(14) until relay PG1(22) releases.

Relay PF(14), at its contact 1, opens the previously traced circuit for relay CPG(22) but, as long as relay STP(14) remains operated, a supplementary connection between conductors 217 and 1204 is closed at contact 1 of relay STP(14) holding relay CPG(22) operated until the end of the pulse period. When relay STP(14) releases, relay CPG(22) also releases to reclose the connection of ground to conductor 2205 and stop the operation of the pulsing relays. Relay MFP(12) is also held operated until relay STP(14) releases and then releases, followed by relay MFC(15). The release of relay MFP(12) opens the circuit of relay KP(12) which also releases.

Ringing and supervision tests

With relay KP(12) released, a circuit is closed from ground over contact 3 of relay SLA(12), contact 11 of relay KP(12), conductor 1215, contact 1 of relay SLC(13), conductor 1309, contact 4 of relay DTC(18) to battery through the winding of relay STC(18) operating that relay to prepare the test circuit for making ringing and supervision tests. With relay KP(12) released, a circuit is closed from ground over contact 1 of relay SV(9), conductor 912, contact 12 of relay KP(12), conductor 1216, contact 9 of relay SLC(13) to battery through lamp SV(13) to indicate that the test circuit is waiting for the test line. Relay SLA(12), in releasing, prepares a circuit from battery through the winding of relay SV(9), conductor 913, in parallel through resistances AE1(19) and AE2(19), windings of relay AX(19), contacts 2 and 3 of key LO(19), conductors 1901 and 1902, windings of retard coil BR(12), contacts 9 and 7 of relay SLA(12) to conductors 231 and 230 and thence to the outgoing trunk conductors 1702 and 1703 as previously traced.

When relay OS(17) was operated, as previously described, it disconnected ground at its contact 9 from conductor 1707 leading to the composite signaling circuit 1720 and extended that conductor over its contact 8 and contact 2 of relay SVP(17) to battery through resistance lamp AL(17). The composite signaling circuit 1720, in response to this signal, connects ground to conductor 2302 completing a circuit over contact 3 of relay CO(23) to battery through the winding of relay LC(23) and over contact 4 of relay CO(23) to battery through the winding of relay SV(23). Relay SV(23), at its contact 2, disconnects ground from conductor 2303 leading to the composite signaling circuit 1720 and at its contact 1 connects that conductor to battery through resistance lamp AL(23). The composite signaling circuit in response to this signal connects ground to conductor 1708 as a delay-dial signal.

When relay SL(17) operates as previously described, it extends the supervisory simplex circuit through resistance SV(17) over contact 9 of relay SL(17) to conductor 1708 leading to the composite signaling circuit. Ground connected to conductor 1708 as a delay-dial signal should prevent the test circuit from transmitting pulses until the control equipment at the distant office is ready to receive them.

As described in the above-identified McKim et al. patent, the operation of relay LC(23) operates relay IN(23), which locks and causes the connection of a sender, included in the control equipment 2350, with the incoming trunk. When the sender is ready to receive pulses, relay SV(23) is released, connecting ground to conductor 2303 which results in the removal of ground from conductor 1708 as a start-dial signal.

Figure 23:
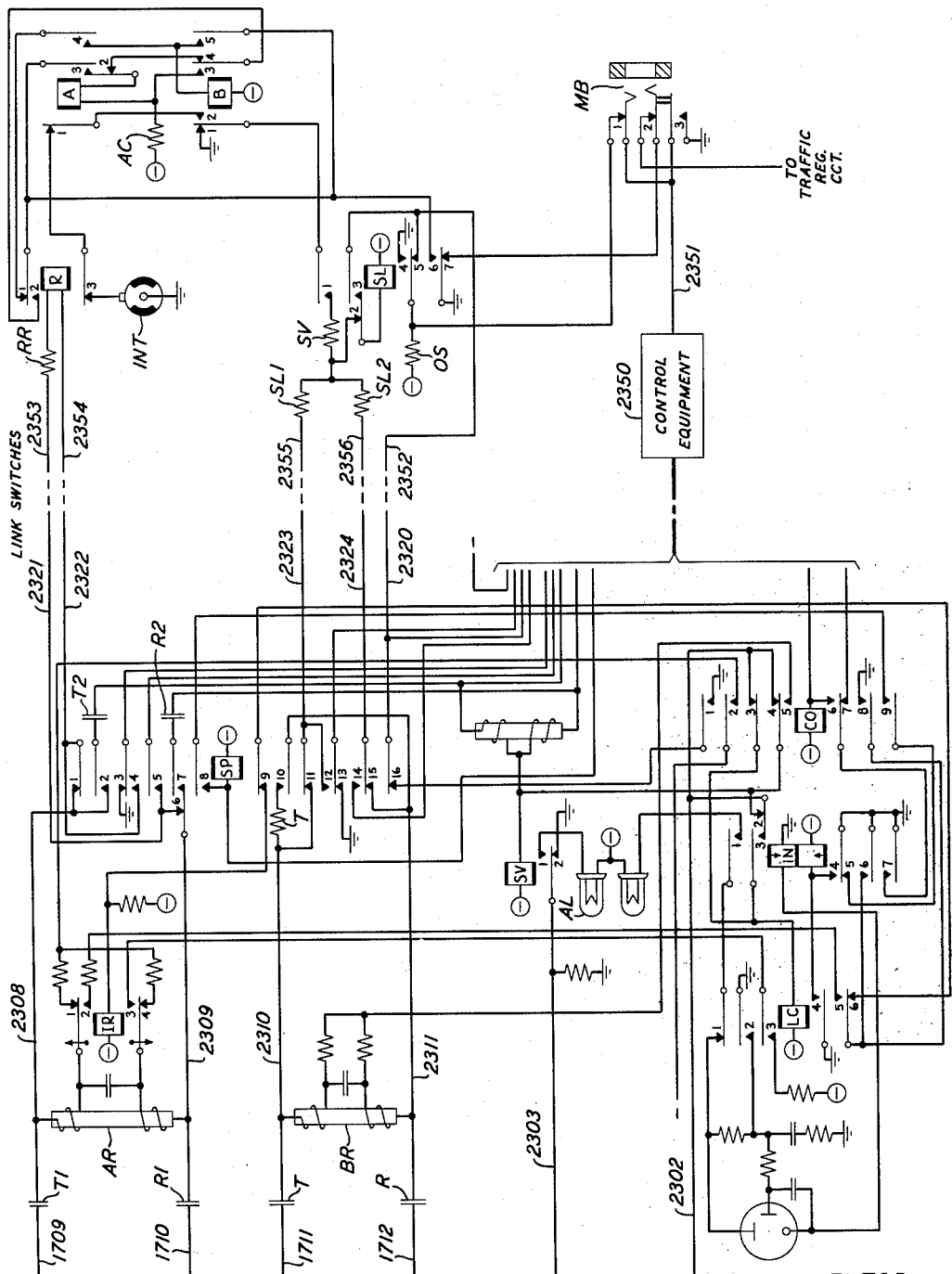
Fig. 23 shows an incoming trunk at the distant office and the trunk test line.

In response to the designation transmitted to the sender at the distant office, a marker included in control equipment 2350 tests for an idle test line such as shown at the right of Fig. 23. The test line is marked idle by the connection of battery through resistance OS(23), contact 1 of jack MB(23) to conductor 2351. The marker then sets up a connection from the incoming trunk circuit at the left of Fig. 23 to the idle test line at the right of Fig. 23 through the usual incoming and outgoing link switches, not shown. During the establishment of this connection, the control equipment 2350 operates relay SL(23) which locks under the control of the marker until the connection has been established after which it is held locked over its contact 3, conductor 2352, through the link switches to conductor 2320, contact 16 of relay SP(23) to ground at contact 1 of relay CO(23). At its contact 4, relay SL(23) connects ground to conductor 2351 to mark the test line busy. Conductors 2321 to 2324 of the incoming trunk circuit are extended through the link switches to conductors 2353 to 2356 of the test line. With relay SL(23) operated, a circuit is closed from battery through the winding of relay SV(23), contact 5 of relay CO(23) through the windings of retard coil BR(23), conductors 2310 and 2311, contacts 11 and 15 of relay SP(23), conductors 2323 and 2324 through the link switches to conductors 2353 and 2356, resistances SL1(23) and SL2(23) in parallel, resistance SV(23), contact 1 of relay SL(23), contact 1 of relay B(23) to ground. Relay SV(23) operates, connecting battery to conductor 2303 resulting in the connection of ground to conductor 1708 and thence to the simplex circuit over conductors 1702 and 1703 leading to the test circuit and the winding of relay SV(9) as above traced. Relay SV(9) now should remain operated during the transmission of ringing current to the test line.

When relay ON2(5) operates, it prepares the multivibrator tube V1(10) for operation as a timing device. The plate terminals of tube V1(10) are normally connected through resistances RV1(10) and RV2(10) in parallel, over conductor 507 and through retard coil FLT(5) to +130 volt battery. When relay ON2(5) operates, it connects +130 volt battery through retard coil FLT(5), resistance GV1(5), contact 8 of relay ON2(5), conductor 509 to ground through resistance GV3(10). With delay VD(10) unoperated, conductor 509 is connected through resistances G6(10) and G7(10) in parallel to the right grid of tube V1(10). Relay ON2(5) closes a circuit from ground over its contact 1, conductor 500, contact 7 of relay MA(4), conductor 402 to battery through the winding of relay VA(10). Relay VA(10) operates and, with relay VB(10) unoperated, connects resistances G3(10) and G1(10) in parallel. Relay ON2(5) also connects +130 volt battery through retard coil FLT(5), resistance GV2(5), contact 7 of relay ON2(5), conductor 510 to ground through resistance GV4(10). Conductor 510 is connected through resistances G1(10) and G3(10) in parallel to the left grid of tube V1(10) and through resistances VAR(10) and VBR(10) to the two grids of tube V2(10). In addition, relay ON2(5) connects +130 volt battery through resistance A2(5) over contact 9 of relay ON2(5) through the winding or relay MV(5), conductor 506 to the plate terminals of tube V2(10). The cathodes of tubes V1(10) and V2(10) are grounded. The right plate of tube V1(10) is connected through condenser CV2(10) to the left grid of that tube, while the left plate is connected through condenser CV1(10) to the right grid.

Until relay STV(10) operates, —48 volt battery is connected through resistance AW(10) over contact 1 of relay STV(10) to the left grid of tube V1(10) and to the grids of tube V2(10) to maintain the left half of tube V1(10) and the tube V2(10) blocked. With positive potential connected to the right grid of tube V1(10), the right half of that tube is conducting.

When relay SV(9) operates in response to the connection of the trunk circuit under test to the test line, it extinguishes lamp SV(13) and closes a circuit from ground over contact 11 of relay ON1(9), contact 1 of relay ALM(9), contact 2 of relay SV(9), contact 1 of relay F(9), conductor 914, contact 3 of relay D1(4), contact 6 of relay C1(4), contact 1 of relay B(4), conductor 400, contact 6 of relay MAN(13), conductor 1310 to battery through the winding of relay A(4). Relay A(4) operates in this circuit and locks over its contact 2 and conductor 900 to ground at contact 1 of relay ON1(9).

With relay A(4) operated, a circuit is closed from battery through the winding of relay STV(10), conductor 1000, contact 5 of relay V(9), contact 10 of relay ALM(9), conductor 926, contact 4 of relay A(4), conductor 401, contact 6 of relay TT1(5), conductor 508 to ground at contact 2 of relay M4(5) or at contact 7 of relay C1(4). Relay STV(10) disconnects battery from the left grid of tube V1(10).

At this time the voltage on the left plate of tube V1(10) is a maximum and condenser CV1(10) is charged. Condenser CV2(10) is charged to a somewhat lower voltage due to the current flow through resistance RV2(10). Following the removal of the —48 volt blocking potential, condenser CV2(10) starts to discharge and this discharge current causes a voltage drop across resistances G1(10) and G3(10) in parallel, which is in a direction to maintain the negative bias on tube V1(10). As condenser CV2(10) discharges, this bias is gradually reduced until finally the left half of tube V1(10) and tube V2(10) start to conduct. When the left half of tube V1(10) starts to conduct, the voltage drop across resistance RV1(10), due to this plate current, reduces the potential on the left plate of tube V1(10) and the condenser CV1(10) then starts to discharge. This discharge current causes a voltage drop across resistances G6(10) and G7(10) introducing a negative bias on the right section of tube V1(10) which reduces the plate current of that section. The voltage on the right plate of tube V1(10) then begins to rise because of the similar drop across resistance RV2(10). Condenser CV2(10) now begins to charge and the voltage drop across resistances G1(10) and G3(10) is in a direction to make the potential on the left grid of tube V1(10) more positive so that its plate current increases. This further reduces the potential on the left plate of tube V1(10) so that the discharge of condenser CV1(10) continues. The result is that when the left section of tube V1(10) starts to conduct the discharge of condenser CV1(10) causes the right section of tube V1(10) to be immediately biased to cut-off, while the charge through condenser CV2(10) makes the left section of tube V1(10) immediately fully conducting. With the left section of tube V1(10) fully conducting the potential on the left plate of tube V1(10) stabilizes and condenser CV1(10) continues its discharge until the negative bias on the right grid of tube V1(10) drops to the point where that section of the tube again starts to conduct. The above process is then repeated in the reverse order so that the right half of tube V1(10) immediately becomes fully conducting and the left half is immediately cut off.

The alternate conducting and cut-off periods of the left section of tube V1(10) and the simultaneous conducting and cut-off periods of tube V2(10) will continue until relay STV(10) is released as will be described hereinafter. Resistances G1(10) and G3(10) determine the time interval during which the left section of tube V1(10) and tube V2(10) are non-conducting, while resistances G6(10) and G7(10) determine the time interval during which these tubes are conducting. With relay MV(5)

included in the plate circuit of tube V2(10), that relay will be operated whenever tube V2(10) is conducting and released when it is non-conducting. The values of resistances G1(10) and G2(10) are so selected that a period of two seconds will elapse between the operation of relay STV(10) and the first operation of relay MV(5).

When relay A(4) operates following the operation of relay SV(9), it closes a circuit from battery through the winding of relay SPB(19), contact 6 of relay SPA(19), conductor 1904 to ground at contact 1 of relay A(4). Relay SPB(19) operates in this circuit and locks over its contact 4 to ground at contact 3 of relay SPA(19). Relay SPB(19) closes a circuit from ground over its contact 7 to battery through the winding of relay SPC(19). With relay SPC(19) operated, conductors 234 and 235, which are connected with trunk conductors 1704 and 1705, as previously traced, are extended over contacts 13 and 11 of relay SLA(12) through the windings of retard coil AR(12), conductors 1217 and 1218, contacts 2 and 4 of relay R(19), windings of relays BX(19) and BXA(19) and resistances AA(19), U(19) and thence in simplex over contact 3 of relay SPC(19) through the winding of relay SP(11), contact 2 of relay SPB(19) to ground at contact 2 of relay SPA(19).

Relay SPC(19) opens the locking circuit of relay SPA(19) and closes a circuit from battery through the winding of relay AL1(5), conductor 512, contact 3 of relay MA(4), conductor 403, contact 4 of relay SPC(19), conductor 1800 to ground at contact 3 of relay ST1(13).

In the trunk circuit with relay SL(17) operated, conductors 1704 and 1705 extend through the windings of retard coil B(17), windings of relay R(17), contact 4 of relay SL(17) to the pad control conductor 1713 which is normally connected to —48 volt battery. If battery is present on conductor 1713, relay SP(19) operates in the above-traced circuit and closes a circuit from ground over its contact 2, contact 5 of relay SPB(19), contact 5 of relay SPA(19) to battery through the winding of relay SP1(19). Relay SP1(19) operates and locks over its contact 4 to ground on conductor 1800. If there is no battery on conductor 1713, relay SP(19) does not operate and relay SP1(19) also remains normal.

Relay SPC(19) opens the locking circuit of relay SPA(19) and that relay releases slowly. When relay SPA(19) releases, it removes ground from the circuit of relay SP(19) and that relay releases. Relay SPA(19) also opens the locking circuit of relay SPB(19) which in turn releases slowly. Relay SPB(19) opens the operating circuit for relay SPC(19) to permit that relay to release slowly. When relay SPC(19) releases, it releases relay AL1(5). When relay SPB(19) closes its back contact, it connects battery to the circuit of relay SP(19). Relay SP(19) should not reoperate under this condition but, if there is a cross to resistance ground on either of the conductors included in the circuit of relay SP(19), that relay operates, closing a circuit over its contact 2, contact 6 of relay SPB(19) to battery through the winding of relay SPC(19) to prevent the release of relay SPC(19). If relay SPC(18) is held operated, relay AL1(5) also fails to release.

If relay SP1(19) is not operated, when relay SPA(19) releases, a circuit is closed from ground at contact 2 of relay STC(18), conductor 1815, contact 1 of relay SPA(19), contact 1 of relay SP1(19) to battery through lamp NPB(19). If relay SPC(19) is held operated, relay SP(19) remains operated and a circuit is closed from ground over contact 1 of relay SP(19), contact 3 of relay SPB(19), contact 3 of relay SP1(19) to battery through lamp XPC(19). If relay SP(19) fails to operate in the first circuit above traced, but does operate in the second circuit, it will close a circuit from ground over its contact 1, contact 3 of relay SPB(19), contact 2 of relay SP1(19) to battery through lamp GPC(19).

Relays BX(19) and BXA(19) are differentially wound so that, if either lead is open or crossed to battery so as to upset the balance of the simplex circuit, one or both of these relays will operate, connecting ground over contact 1 of relay SPC(19) to battery through the winding of relay BX1(19). Relay BX1(19) operates, and at its contact 3, closes a locking circuit for relay SPB(19). At its contact 1, relay BX1(19) lights lamp XPC(19) and, at its contact 4, connects ground over contact 2 of relay SPB(19) to the winding of relay SP(19). Relay BX1(19) prepares a locking circuit for itself over its contact 2 and conductor 1905 to ground at contact 6 of relay ALM(9) when that relay is operated as will be described hereinafter.

It will be remembered that the circuit of relay SV(9) extends through the windings of relay AX(19). This relay is wound differentially so that any defect in the circuit of relay SV(9) which unbalances the simplex circuit will cause relay AX(19) to operate. While relay SPC(19) is operated, if relay AX(19) is operated, a circuit is closed from ground over the contact of relay AX(19), contact 2 of relay SPC(19), to battery through the winding of relay AX1(19). Relay AX1(19) lights lamp XSP(19), and connects ground to the winding of relay SPC(19), preventing the release of relay SPC(19) and thereby the release of relay AL1(5). Relay AX1(19) also prepares a locking circuit for itself over its contact 3 and conductor 1905. At the end of the first two-second interval, relay MV(5) operates, remaining operated for an interval of approximately .15 second; and, if relay AL1(5) is released, closes a circuit from ground over contact 4 of relay MV(5), contact 3 of relay AL1(5), contact 9 of relay M4(5), contact 11 of relay TT(5), conductor 511, contact 1 of relay NR1(16), conductor 1602 to battery through the winding of relay R(19).

When relay R(19) operates, it disconnects conductors 1217 and 1218 from the windings of relays BX(19) and BXA(19) and connects conductor 1217 to battery through resistance AY(19) and connects conductor 1218 to ground through resistance AX(19). The connection of battery and ground to conductors 1217 and 1218 should cause the operation of relay R(17) in the trunk circuit under test. Relay R(17) connects condenser TR(17) over its contact 2, resistance RR(17), contact 3 of relay G(17) to +130 volt battery through resistance lamp BL(17) causing this condenser to receive a charge.

If the pad control test above described is successful so that relay AL1(5) releases, when relay MV(5) operates a circuit is closed from battery through the winding of relay M1(5), contact 2 of relay RS(5), contact 1 of relay M2(5), contact 7 of relay M4(5), contact 1 of relay AL1(5), contact 2 of relay MV(5), conductor 909 to ground at contact 10 of relay ON1(9). Relay M1(5) operates and locks in a circuit from battery through its winding, contact 2 of relay RS(5), contact 2 of relay M1(5), conductor 501 to ground at contact 2 of relay ON2(5). Relay M1(5) closes a circuit from battery through the winding of relay MA(4), conductor 405, contact 1 of relay M1(5), conductor 502 to ground at contact 3 of relay ON2(5). Relay MA(4) operates and locks over its contact 4 to ground on conductor 502. With relay MA(4) operated, the circuit of relay VA(10) is opened and relay VA(10) releases connecting resistance G2(10) in parallel with resistance G1(10) to increase the next period to 2.5 seconds. Relay MA(4) further opens the circuit of relay AL1(5).

When relay MV(5) releases, it closes a circuit from ground on conductor 909, contact 1 of relay MV(5), conductor 513, contact 3 of relay FED(4), conductor 404, contact 9 of relay M3(5), contact 3 of relay M1(5), contact 4 of relay RS(5) to battery through the winding of relay M2(5). Relay M2(5) operates in this circuit and locks over contact 4 of relay RS(5), contact 4 of relay M2(5), and conductor 505 to ground at contacct 6 of relay ON2(5). Relay M2(5) closes a new operating circuit for relay AL1(5) from conductor 512, contact 7 of relay TT(5), contact 3 of relay M2(5), conductor 514 to ground at contact 5 of relay B(4).

The release of relay MV(5) also opens the circuit of relay R(19) which in turn release relay R(17). With relay R(17) released, condenser TR(17) is connected over contact 3 of relay R(17) through resistance CR(17), contact 6 of relay SL(17), contact 3 of jack T(17), through the lower winding of relay SVP(17) to —48 volt battery through resistance P(17). Condenser TR(17) discharges in this circuit causing relay SVP(17) to operate for the discharge time, during which time it disconnects battery from conductor 1707 and connects ground thereto. The connection of ground to conductor 1707 causes the composite signaling circuit to remove ground from conductor 2302 releasing relay LC(23) in the incoming trunk at the distant office. Relay LC(23), in releasing, closes a circuit from battery through the winding of relay IR(23), contact 9 of relay SP(23), contact 6 of relay LC(23) to ground at contact 8 of relay CO(23). When relay SVP(17) releases, relay LC(23) reoperates, opening the circuit of relay IR(23). However, relay IR(23) is slow to release and for a measured interval closes a circuit from resistance battery over contact 3 of relay LC(23), contact 3 of relay IR(23), lower winding of retard coil AR(23), conductor 2309, contact 6 of relay SP(23), conductor 2321, through the link switches to conductor 2353, resistance RR(23), winding of relay R(23) conductor 2354, through the link switches to conductor 2322, contact 1 of relay SP(23), conductor 2309, upper winding of retard coil AR(23), contact 2 of relay IR(23), contact 5 of relay LC(23) to ground at contact 6 of relay IN(23). Relay R(23) operates in this circuit and closes a circuit from battery through resistance AC(23), winding of relay A(23), contact 2 of relay A(23), contact 4 of relay B(23), contact 2 of relay R(23) to ground at contact 6 of relay SL(23). Relay A(23) operates in this circuit and locks over its contact 3 to ground at contact 6 of relay SL(23). When relay IR(23) releases, relay R(23) also releases, closing a circuit from battery, through the winding of relay B(23), contact 4 of relay A(23), contact 1 of relay R(23) to ground at contact 6 of relay SL(23). Relay B(23) operates in this circuit and locks over its contact 5 to ground at contact 6 of relay SL(23). The operation of relay B(23) disconnects steady ground from the supervisory simplex circuit causing relay SV(23) to release and connect ground to conductor 2303 leading to the composite signaling circuit 1720 which in turn connects battery to conductor 1708 to release relay SV(9). The release of relay SV(9) is a signal that the first ringing signal has been transmitted and removed.

The release of relay SV(9) closes a circuit from ground at contact 11 of relay ON1(9), contact 1 of relay ALM(9), contact 3 of relay SV(9), conductor 917, contact 4 of relay E(9), conductor 915, contact 3 of relay D(4), contact 5 of relay C(4), contact 3 of relay A(4) to battery, through the winding of relay B(4). Relay B(4) operates in this circuit and locks over its contact 3, conductor 902, to ground at contact 3 of relay ON1(9). Relay B(4) opens the circuit of relay AL1(5) causing that relay to release.

If the trunk circuit fails to release relay SV(9) following the first ringing signal, relay B(23) is not operated and relay AL1(5) is held operated. If a premature flash is received so that relay SV(9) is reoperated before relay MV(5) reoperates, a circuit is closed from ground over contact 11 of relay ON1(9), contact 1 of relay ALM(9), contact 2 of relay SV(9), conductor 916, contact 1 of relay F (9), conductor 914, contact 3 of relay D1(4), contact 6 of relay C1(4), contact 2 of relay B(4) to battery, through the winding of relay C(4). Relay C(4) closes a circuit from battery through the winding of relay AL1(4), conductor 512, contact 7 of relay TT(5), conductor 515, contact 1 of relay M4A(4) to ground at contact 6 of relay C(4).

When relay MV(5) reoperates, at the end of the second timing interval, if relay AL1(5) has been released, a second ringing signal is transmitted and when relay MV(25) again releases, the ringing signal is transmitted to the test line in the manner above described. With rela R(23) reoperated, a circuit is closed from ground at contact 6 of relay SL(23), over contact 2 of relay R(23), contact 3 of relay B(23) to battery through resistance AC(23) in shunt of the winding of relay A(23) causing relay A(23) to release. With relay A(23) released, when relay R(23) again releases, the supervisory simplex circuit is extended over contact 2 of relay B(23), contact 1 of relay A(22), contact 3 of relay R(23) to ground through interrupter INT(23). Ground pulses at a speed of 120 impulses per minute are now transmitted over the supervisory simplex to the test circuit.

Assuming that the test proceeds without trouble, the second operation of relay MV(5) also closes a circuit from ground on conductor 909, contact 2 of relay MV(5), contact 1 of relay AL1(5), contact 7 of relay M4(5), contact 2 of relay M2(5) to battery, through the winding of relay M3(5). Relay M3(5) operates and locks over its contact 5, conductor 503 to ground at contact 4 of relay ON2(5).

When relay MV(5) releases for the second time to mark the end of the second ringing signal, a circuit is closed from ground on conductor 909, contact 1 of relay MV(5), conductor 513, contact 3 of relay FED(4), conductor 404, contact 8 of relay M3(5), conductor 516 to battery, through the windings of relay M4(5) and M4A(4). Relay M4(5) closes a locking circuit for itself and relay M4A(4) over its contact 5 and conductor 504 to ground at contact 5 of relay ON2(5). With relay M4A(4) operated, a circuit is closed from ground over contact 1 of relay C1(4), contact 2 of relay M4R(4) to conductor 515, contact 7 of relay TT(5), conductor 512 to battery through the winding of relay AL1(4).

Relay SV(9) now operates and releases under the control of interrupter INT(23). The first operation operates and locks relay C(4) as previously described, but with relay M4A(4) operated relay AL1(5) is not operated. The next release of relay SV(9) connects ground to conductor 917 and over contact 1 of relay E(9), conductor 915, contact 3 of relay D(4), contact 4 of relay C(4) to battery, through the winding of relay C1(4). Relay C1(4) operates, locks over its contact 4 and conductor 901 to ground at contact 2 of relay ON1(9), and opens the circuit of relay AL1(5). When relay SV(9) again operates, it connects ground to conductor 916, contact 1 of relay F(9), conductor 914, contact 3 of relay D1(4), contact 5 of relay C1(4) to battery, through the winding of relay D(4). Relay D(4) operates and locks over its contact 1 to ground on conductor 904. The next release of relay SV(9) connects ground to conductor 917 and over contact 1 of relay E(9), conductor 915, contact 2 of relay D(4), conductor 406, contact 9 of relay TT(5), conductor 517 to battery, through the winding of relay D1(4). Relay D1(4) operates and locks over its contact 5 to ground on conductor 908. When relay SV(9) reoperates it connects ground to conductor 916 and over contact 1 of relay F(9), conductor 914, contact 4 of relay D1(4), conductor 407 to battery through the winding of relay E(9). Relay E(9) operates and locks over its contact 3 to ground on conductor 905. The next release of relay SV(9) connects ground to conductor 917 and over contact 2 of relay E(9) to battery, through the winding of relay F(9). Relay F(9) operates and locks over its contact 2 to ground on conductor 906. Therefore, three complete flashes are counted by means of relays C1(4) to F(5).

When relay M4(5) operates to indicate the completion of the second ringing signal, it connects ground over its contact 3, contact 3 of relay TT(5), conductor 518, resistance FTR(4) to battery, through the upper winding of relay FT(4). At the same time, a circuit is closed from battery through the lower winding of relay FT(4), conductor 408, contact 1 of relay FS1(4), condenser FTC(9), resistance FT1(9) to ground on conductor 518. However, until relay C1(4) operates, conductors 403 and 518 are connected together, shunting condenser FTC(9). With both windings of relay FT(4) energized, relay FT(9) holds its contact 1 open. When relay C1(4) operates, following the release of relay SV(9) at the beginning of the second off-hook signal which is the beginning of the flashing period, the shunt is removed from condenser FTC(9) and that condenser charges through the lower winding of relay FT(4) energizing the lower winding during the charging interval. When the charging current decays, relay FT(4) closes its contact 1 and, if the off-hook signal is of proper length so that relay D(4) has not yet operated, a circuit is closed from battery through the winding of relay FS1(9), conductor 918, contact 4 of relay D(4), contact 1 of relay FT(4), contact 1 of relay C(4) to ground on conductor 518. Relay FS1(9) operates and locks over its contact 6 to ground on conductor 907. The values of resistance FT1(9) and condenser FTC(9) are selected to provide an elapsed time of approximately .15 second between the operation of relay C1(4) and the operation of relay FS1(9). When relay D(4) operates at the beginning of the second on-hook period, conductors 518 and 408 are connected together over contact 9 of relay D(4) and contact 1 of relay D1(4), again shunting condenser FTC(9). Therefore, if the second off-hook signal is too short, the operation of relay D(4) will prevent the operation of relay FS1(9).

When relay D1(4) operates at the beginning of the third off-hook signal, the shunt around condenser FTC(9) is again opened to time that signal and, if the signal is of sufficient duration, a circuit is closed from battery through the winding of relay FS2(9), conductor 919, contact 2 of relay D1(4), contact 7 of relay E(9), conductor 920, contact 1 of relay FT(4), contact 1 of relay C(4) to ground on conductor 518. Relay FS2(9) operates and locks over its contact 4 to ground on conductor 907. When relay E(9) operates at the beginning of the third on-hook signal, it connects conductors 408 and 518 together over its contact 4 to terminate the timing operation and, if the third off-hook signal is too short, prevents the operation of relay FS2(9).

The operation of relay C1(4) marks the end of the ringing test and the beginning of the supervisory test. At its contact 7, relay C1(4) opens the circuit of relay STV(10), which releases to again connect —48 volt battery to the left grid of tube V1(10) and stop the multivibrator. In addition, a time interval to cover the supervisory test is started by the operation of relay C1(4). When relay STC(18) operated, as previously described, a circuit was closed from ground over contact 5 of relay STC(18), conductor 2100 to battery through the winding of relay TTR(21). With relay TTR(21) operated, when relay C1(4) operates, a circuit is closed from battery through resistance AJ(13), conductor 1311, contact 3 of relay C1(4), contact 3 of relay M4A(4), conductor 409, contact 2 of relay TT1(5), conductor 519, contact 9 of relay ALM(9), contact 4 of relay V(9), conductor 921, contact 4 of relay STC(18), conductor 1801, winding of relay TST(22), conductor 2204, contact 7 of relay TTR(21), contact 5 of relay W(21) to ground at contact 5 of relay DE1(21).

Relay TST(22) operates in this circuit to disconnect ground from conductor 2205 and permit relays PG(22), P(22) and PCK(22) to start pulsing. In a manner previously described, relay PCK(22) operates relays PC(22), PD(22) and PE(22) to in turn operate the counting relays PC1(21), etc. When relay PC6(21) operates, relay PC5(21) is held operated under the control of relay PC1(21) as previously described, and a circuit is closed from battery through resistance CB(21), winding of relay DE1(21), contact 2 of relay PC6(21), contact 2 of relay PC5(21), conductor 2106, contact 6 of relay STC(18), conductor 2102, contact 2 of relay TTR(21) to ground at contact 1 of relay Z(21). As previously described, relay DE1(21) disconnects ground from conductor 2205 so that the pulsing relays continue to operate. It also opens the circuit of relay TST(21) causing that relay to release so that no more counting relays can operate. In addition, it operates relay W(21). At the next pulse, relay DE2(21) operates, releasing the operated counting relays and at the end of the pulse, relays DE1(21) and DE2(21) both release permitting relay Z(21) to operate. With relay Z(21) operated, the counting relays can again operate under the control of relay PCK(22). When relay PC5(21) now operates, a circuit is closed from battery through resistance CB(21), winding of relay DE1(21), contact 1 of relay PC6(21), contact 1 of relay PC5(21), conductor 2107, contact 7 of relay SCT(18), conductor 2104, contact 4 of relay TTR(21) to ground over contact 2 of relay Z(21).

With relay Z(21) operated, the operation of relay DE1(21) causes relay WR(21) to operate and open the circuit of relay W(21) which releases. Relay WR(21) also prevents the operation of any additional counting relays. At the next pulse, relay DE2(21) operates to mark the end of a timing interval of approximately 1¼ seconds.

If during this timing interval relays FS1(9), FS2(9) and F(9) have been operated as above described, a circuit is now closed from ground on conductor 813, contact 3 of relay DE1(21), conductor 1400, contact 5 of relay LDG(14), conductor 2109, contact 1 of relay W(21), contact 2 of relay WR(21), contact 1 of relay DE2(21), conductor 2105, contact 3 of relay STC(18), conductor 1805, contact 3 of relay F(9), contact 2 of relay FS2(9), contact 4 of relay FS1(9), conductor 922 to battery through the winding of relay STF(18). Relay STF(18) operates in this circuit and closes a circuit from ground over its contact 1, conductor 1806, contact 1 and winding of relay V(9) to battery. Relay V(9) operates in this circuit and locks over its contact 2 to ground on conductor 911. Relay V(9), at its contact 4, disconnects battery from the winding of relay TST(22) causing that relay to release and connect ground to conductor 2205 to stop the pulse generator. The release of relay DE2(21) opens the circuit of relay STF(18) and that relay releases. Relay V(9) closes a circuit from ground over contact 8 of relay ALM(9), contact 3 of relay V(9), conductor 923, contact 2 of relay STF(18), conductor 1807, contact 5 of relay SP1(19), conductor 1903, contact 3 of key RP2(13), conductor 1312 to battery through the winding of relay DTC(18) to prepare for the disconnect test. Relay DTC(18) opens the circuit of relay STC(18) causing that relay to release.

During the ringing and supervisory tests, above described, relay ALM(9) may be operated under a variety of conditions to indicate faulty operation. As previously described, if there is battery on the pad control circuit or a battery cross on either of the conductors included in the pad control and ringing circuit, relay SPC(19) is held operated. In addition, a cross on one of the conductors of the supervisory circuit which would disturb the balance of the supervisory simplex will cause relay SPC(19) to be held operated. With relay SPC(19) held operated, relay AL1(5) is also held operated and when relay MV(5) operates to initiate the first ringing signal a circuit is closed from ground over contact 4 of relay MV(5), contact 2 of relay AL1(5), conductor 520, contact 4 and winding of relay ALM(9) to battery. Relay ALM(9), if operated, locks over its contact 5 to ground on conductor 911.

If relay SPC(19) releases, relay AL1(5) also releases, but if the trunk circuit has prematurely returned an on-hook signal, relay B(4) will be operated when relay MV(5) operates for the first time and a circuit will be closed from ground over contact 4 of relay B(4), contact 3 of relay MA(4), conductor 512 to battery, through the winding of relay AL1(5), reoperating the latter relay to close the above-traced circuit for relay ALM(9).

As above described, relay M2(5) operates when relay MV(5) releases at the end of the first ringing signal and shortly thereafter the trunk should return an on-hook signal operating relay B(4). If the on-hook signal is not received and relay B(4) has not operated, a circuit is closed from ground over contact 5 of relay B(4), conductor 514, contact 3 of relay M2(4), contact 7 of relay TT(5), conductor 512 to battery through the winding of relay AL1(5). When relay MV(5) reoperates at the beginning of the second ringing signal, relay ALM(9) is operated.

If the trunk circuit initiates its flashing operation prematurely, relay C(4) will be operated before relay M4A(4) operates at the end of the second ringing signal and a circuit will be closed from ground over contact 6 of relay C(4), contact 1 of relay M4A(4), conductor 515, contact 7 of relay TT(5), conductor 512 to battery through the winding of relay AL1(4) and relay ALM(9) will be operated.

If flashing does not start so that relay C1(4) is normal and relay AL1(5) is operated when relay MV(5) reoperates at the end of a third timing interval, relay MV(5) closes a circuit from ground over its contact 4, and contact 2 of relay AL1(5) to conductor 520 to operate relay ALM(9).

When the timing circuit grounds conductor 1805 as above described, relay ALM(9) will also be operated if the flashing signal generated by the test line has not been received properly. If the trunk is released prematurely so that three complete flashing signals have not been received and therefore relay F(9) is not operated, relay ALM(9) operates in a circuit from battery through its winding and over its contact 4, contact 4 of relay F(9) to ground on conductor 1805. If a sufficient number of flashing signals have been received but the first on-hook signal is too short so that relay FS1(9) has not been operated, while the second on-hook signal is of adequate length as indicated by the operation of relay FS2(9), relay ALM(9) operates in a circuit from battery through its winding and over its contact 4, contact 3 of relay FS1(9), contact 2 of relay FS2(9), contact 3 of relay F(9) to ground on conductor 1805. If the second on-hook signal is too short, irrespective of the length of the first on-hook signal, relay ALM(9) operates in a circuit through its winding and over its contact 4, contact 1 of relay FS2(9), contact 3 of relay F(9) to ground on conductor 1805.

Lamps are lighted to indicate the reason for the operation of relay ALM(9). As previously traced, lamp NPB(19) is operated to indicate the absence of battery on the pad control circuit; lamp GPC(19) is lighted to indicate the presence of ground on the pad control circuit; lamp XPC(19) is lighted to indicate a cross on the pad control circuit; and lamp XSP(19) is lighted to indicate a cross on the supervisory circuit.

If relay B(4) operates prematurely, lamp HIT(4) is lighted over contact 8 of relay C(4), contact 6 of relay B(4) and contact 1 of relay MA(4). If relay C(4) operates prematurely, lamp CHT(4) is lighted over contact 7 of relay C(4), contact 6 of relay B(4) and contact 1 of relay MA(4). If relay F(9) fails to operate, lamp SFL(9) is lighted over contact 6 of relay F(9), contact 2 of relay ALM(9), conductor 924, contact 5 of relay D(4), conductor 410, contact 1 of relay TT(5), conductor 521 to ground at contact 2 of relay MA(4). If relay FS1(9) fails to operate, lamp FSL1(9) is lighted over contact 5 of relay FS1(9), contact 5 of relay F(9), contact 2 of relay ALM(9) to ground over conductor 924. Similarly if relay FS2(9) fails to operate, lamp FSL2(9) is lighted over contact 3 of relay FS2(9), contact 5 of relay F(9), contact 2 of relay ALM(9) to ground on conductor 924.

If the test is stopped during the first ringing period, lamp R1(5) will be lighted over contact 1 of relay M3(5), conductor 522, contact 6 of relay D(4), conductor 410, contact 1 of relay TT(5), conductor 521 to ground on contact 2 of relay MA(4). If the test is stopped during the second ringing period, lamp R2(5) will be lighted over contact 2 of relay M3(5) to ground over conductor 522 as above traced. With relay ALM(9) operated, lamp DAR(9) is lighted over contact 3 of relay ALM(9), conductor 925, contact 3 of relay C(4), contact 6 of relay D(4), conductor 410 and thence to ground as above traced.

Figure 10:
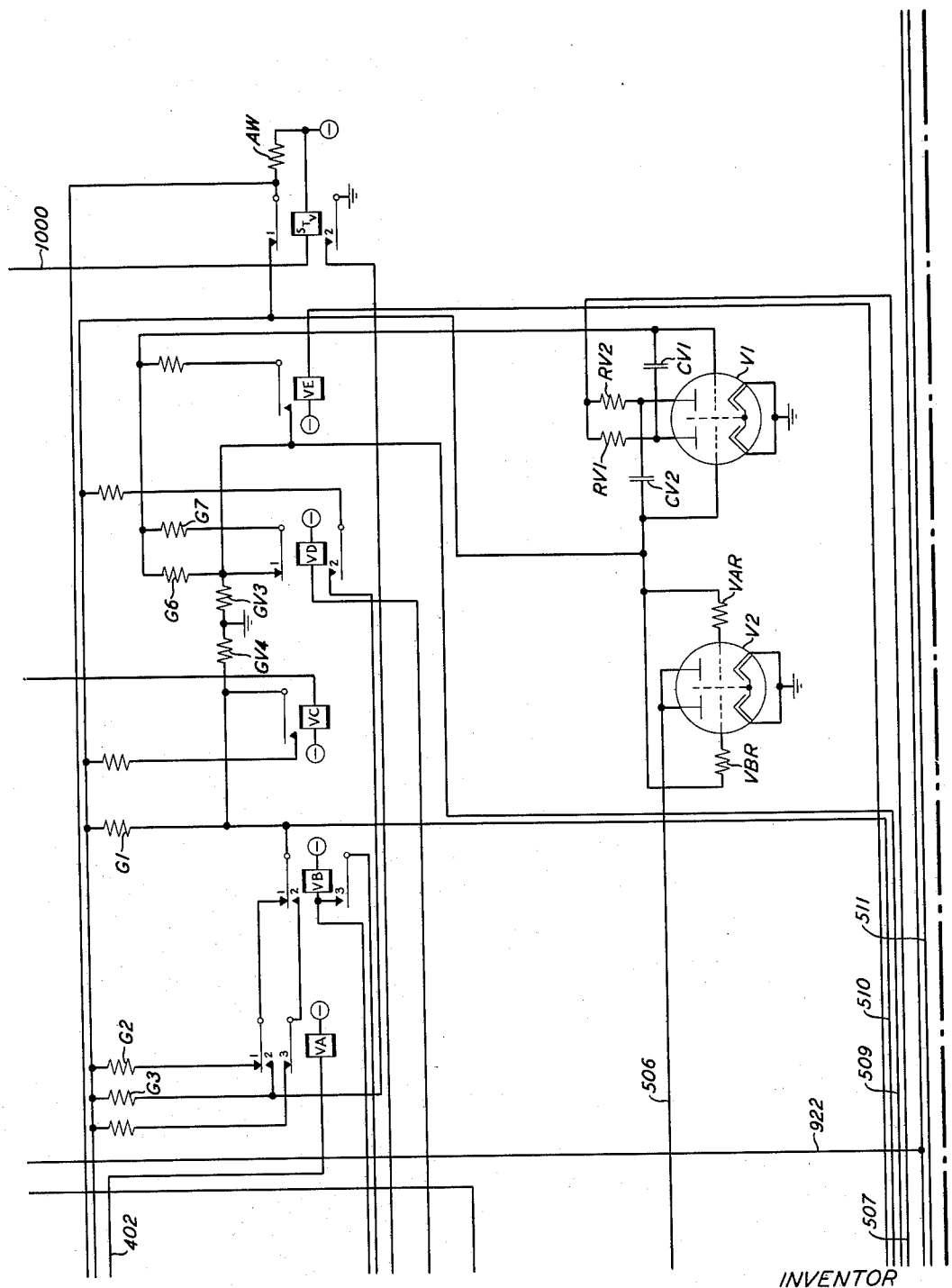
Fig. 10 shows a multivibrator and certain control circuits therefor.
Figure 11:
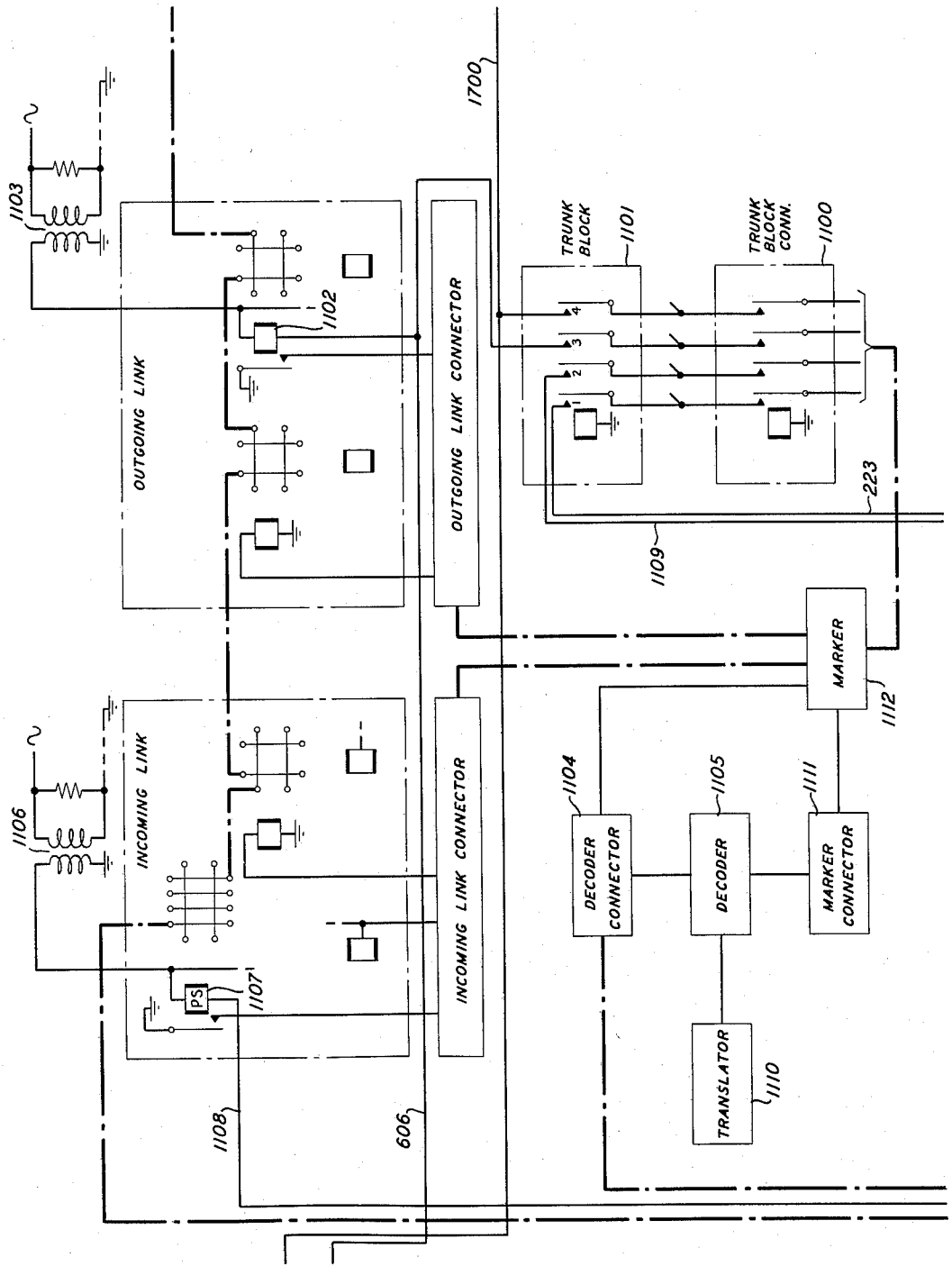
Fig. 11 shows in diagrammatic form the link switches for connecting the test circuit with the outgoing trunk to be tested and certain control equipment.
Figure 12:
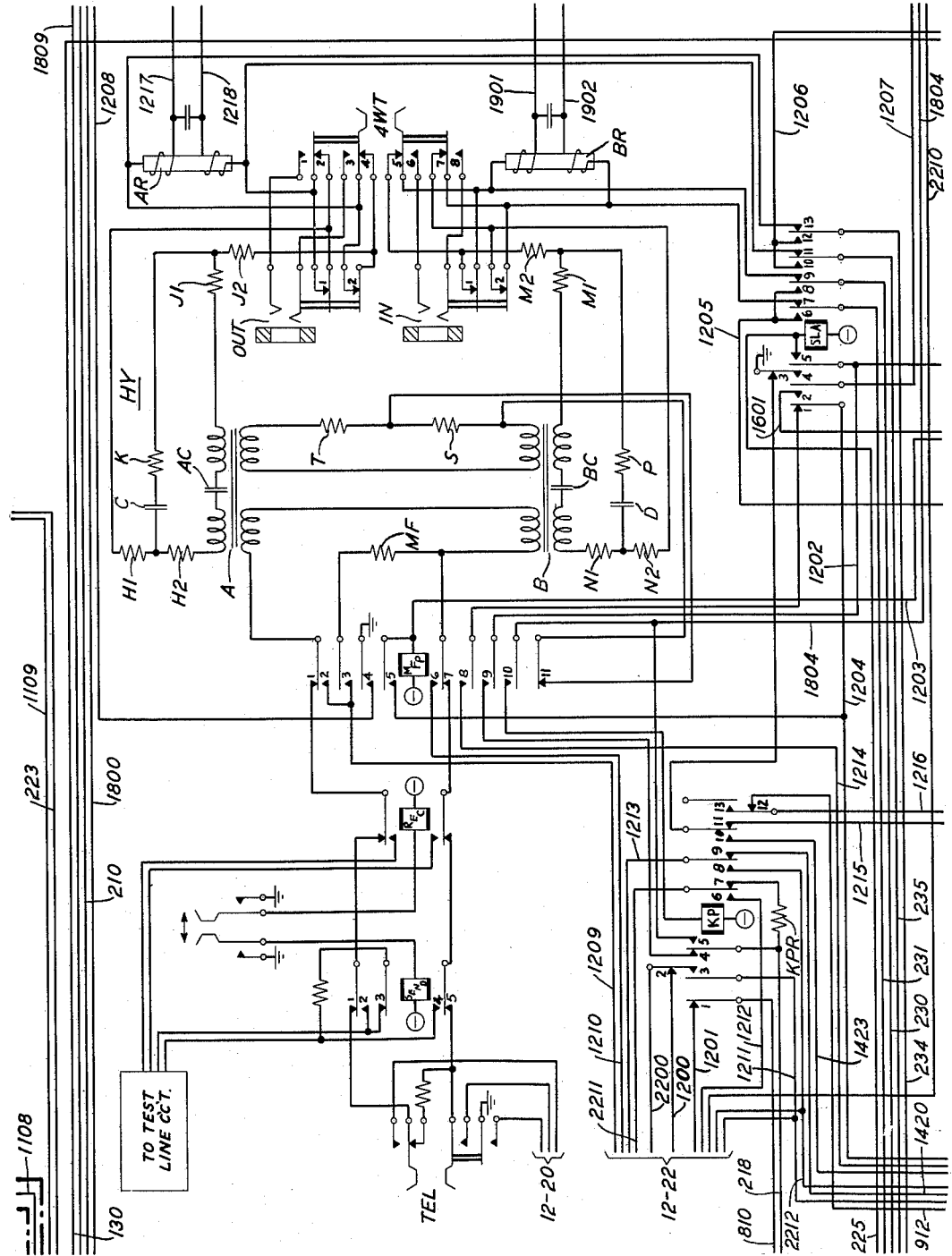
Fig. 12 shows a hybrid coil and circuits for controlling connections therewith.
Figure 13:
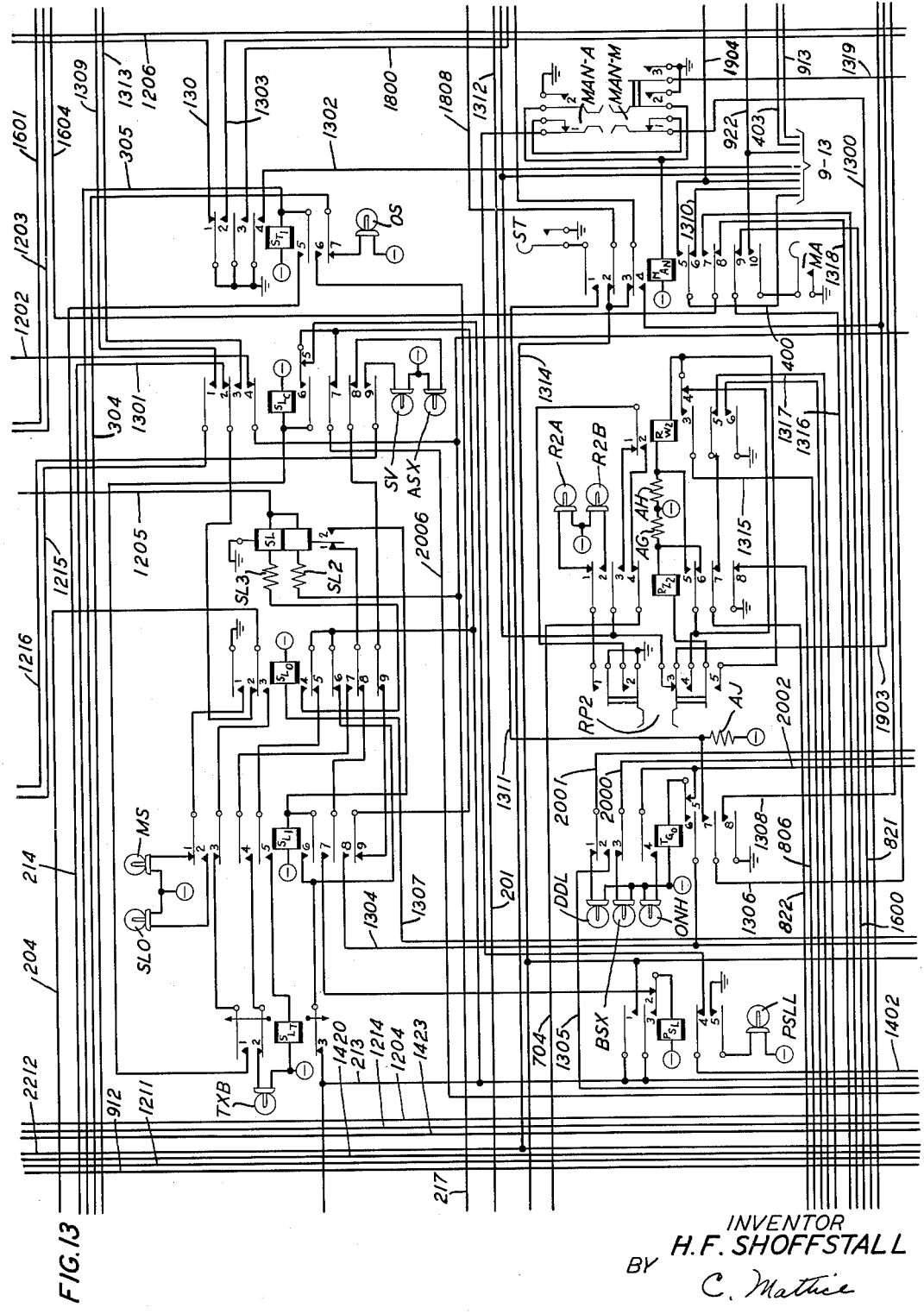
Fig. 13 shows the circuits for testing the SL relay of the trunk and the circuits for controlling manual tests.
Figure 14:
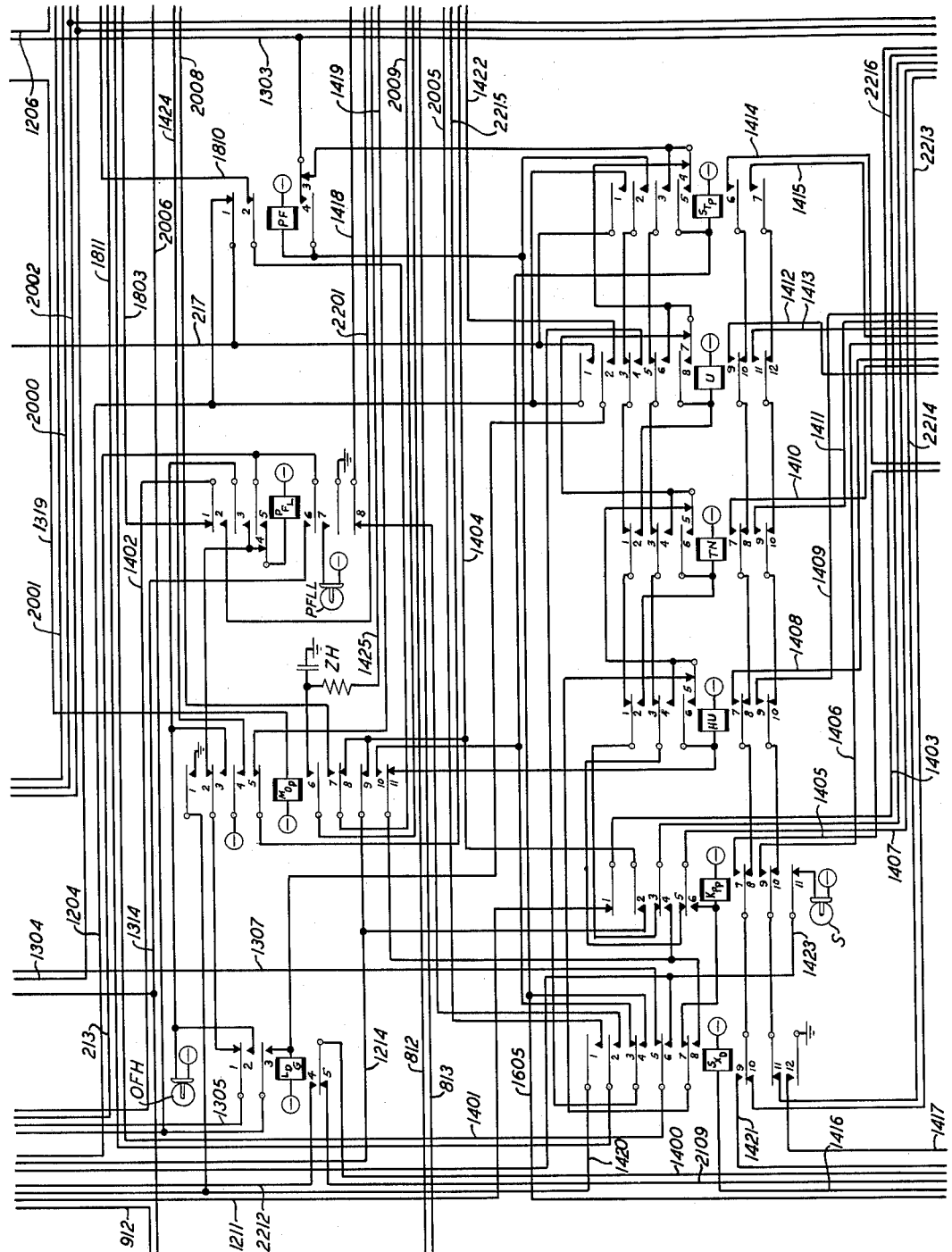
Fig. 14 shows the progress relays for controlling the transmission of designations to the distant office.

The transmission testing arrangement 523 is associated with this testing circuit and uses equipment in this circuit to obtain access to the trunks to be tested and to control the selection of a transmission test line at the distant office. The multivibrator of Fig. 10 also functions in connection with the transmission testing equipment, which equipment controls relays TT(5), TT1(5), VB(10), VC(10), VD(10) and VE(10) to modify the operation of the multivibrator in accordance with the requirements of the transmission tests.

*Disconnect test*

Assuming however that the test has progressed in a satisfactory manner, relay DTC(18) is operated as above described. When relay GTC(18) released, it opened the operating circuit of relay GTF(18) and when relay SLA(12) released, it opened the locking circuit of relay GTF(18) releasing the latter relay to in turn release relay SLO(13). Relay SLC(13) remains locked to off-normal ground on conductor 213. Therefore with relay DTC(18) operated, the busy test conductor of the trunk, which is extended to conductor 204 as previously traced, is now connected over contact 2 of relay SLO(13), contact 3 of relay SLC(13), conductor 1313, contact 1 of relay DTC(18), contact 2 of relay FDC(18), contact 1 of relay SDC(18) to battery through the winding of relay BTG(18). Relay BTG(18) operates over this conductor to the ground supplied thereto by the test circuit through the link switches as previously traced and locks over its contact 3 to its operating circuit independent of the contact of relay SDC(18).

Relay BTG(18) closes a circuit from ground over its contact 2, contact 1 of relay DC1(18) to battery through the winding of relay IR(18). Relay IR(18) operates and locks over its contact 3 to ground on conductor 210. With relay IR(18) operated, ground is disconnected from conductor 1800 and thereby from conductor 1701. The disconnection of ground from conductor 1800 also releases the hold magnets of the incoming link and outgoing link switches breaking down the connection between the test circuit and the talking conductors of the trunk.

The removal of ground from conductor 1701 opens the locking circuit of relay OS(17) which releases. With relay OS(17) released, +130 volt battery is connected through resistance lamp BL(17), contact 3 of relay G(17), contact 4 of relay OS(17) to the main anode of tube TM(17) and through resistance BR(17) to condenser TMC(17) which is connected through resistance AR(17) to the control anode of tube TM(17). The cathode of tube TM(17) is connected through the upper winding of relay G(17) to ground. When the charge on condenser TMC(17) reaches the breakdown potential of tube TM(17), the tube breaks down and current flows through the upper winding of relay G(17) in a direction to oppose the current flowing through its lower locking winding and causes relay G(17) to release. When relay G(17) releases, relay SL(17) is also released.

The release of relay OS(17) also disconnects conductor 1707 from the armature of relay SVP(17) leaving that conductor connected to ground as a release signal to the distant office. Ground on conductor 1707 causes the composite signaling circuit to disconnect ground from conductor 2302 releasing relay LC(23). Relay LC(23) causes the timed release of relay IN(23) in turn releasing relay CO(23) which disconnects ground from conductor 2320 to release the link switches at the distant office and thereby release relays SL(23) and B(23) in the test line, restoring the test line to normal.

When relay DTC(18) operated as above described, it connected ground over its contact 7 to conductor 2100 operating relay TTR(21). When relay IR(18) operates, it closes a circuit from battery through resistance AJ(13), conductor 1311, contact 7 of relay IR(18), contact 4 of relay DC2(18), contact 6 of relay DTC(18), conductor 1801 to the winding of relay TST(22) and thence to ground as previously traced. Relay TST(22) removes ground from conductor 2205 to permit relay PG(22) to start pulsing. The counting relays are operated under the control of relay PCK(22) in the manner previously described. Relay PC6(21) is operated in response to the sixth pulse from relay PCK(22) and locks over its contact 3, conductor 2101, under the control of relay DE2(21). The seventh pulse operates relay PC1(21) which releases relay PC5(21). With relays PC1(21) and PC6(21) operated a circuit is closed from battery through resistance CB(21), winding of relay DE1(21), contact 2 of relay PC6(21), contact 2 of relay PC1(21), conductor 2108, contact 8 of relay DTC(18), conductor 2102, contact 2 of relay TTR(21) to ground at contact 1 of relay Z(21). As previously described, relay DE1(21) operates during the pulse period following that in which relay PC1(21) was operated and at the end of that pulse period relay DE2(21) operates, releasing the counting relays. Relay DE1(21) operates relay W(21) and releases relay TST(22). Relay DE1(21) also holds open the connection of ground to conductor 2205 so that relay PG(22) continues to pulse. At the end of the pulse period relays DE1(21) and DE2(21) release permitting relay Z(21) to operate. With relays W(21) and Z(21) operated, ground on conductor 2101 is connected over contact 3 of relay WR(21), contact 6 of relay Z(21) and contact 4 of relay W(21) to conductor 2103 to permit the counting relays to be reoperated.

Relay PCK(22) operates relays PC1(21) to PC6(21) and then reoperates relays PC1(21) to PC4(21). With relay PC4(21) operated, a circuit is closed from battery through resistance CB(21), winding of relay DE1(21), contact 2 of relay PC6(21), contact 2 of relay PC4(21), conductor 2110, contact 9 of relay DTC(18), conductor 2104, contact 4 of relay TTR(21), contact 2 of relay Z(21) to ground. When relay PCK(22) removes the shunt from the winding of relay DE1(21) that relay operates, in turn operating relay WR(21). Relay WR(21) releases relay W(21) but relay Z(21) is held operated under the control of relay DE1(21). With relay W(21) released and relay WR(21) operated, a circuit is now closed from ground on conductor 813, contact 3 of relay DE1(21), conductor 1400, contact 5 of relay LDG(14), conductor 2109, contact 1 of relay W(21), contact 2 of relay WR(21), contact 1 of relay DE2(21) to conductor 2105. If relay BTG(18) has not released at this time, ground on conductor 2105 is extended over contact 5 of relay DTC(18), contact 4 of relay BTG(18) to battery through the winding of relay SDC(18). Relay SDC(18) operates and locks over its contact 2 to ground at contact 6 of relay IR(18). When the last pulse ends, relays DE1(21), DE2(21), Z(21) and WR(21) release, relay DE1(21) restoring the connection of ground to conductor 2205 to stop the pulse generation.

While the foregoing operations are taking place, when relay PC4(21) operates for the first time, it connects ground over its contact 5 to conductor 2111 completing a circuit over contact 3 of relay DTC(18) to battery through the winding of relay DC1(18). Relay DC1(18) operates and locks over its contact 3 to ground at contact 4 of relay IR(18). When relays Z(21) and W(21) have operated following the first cycle of operations by the counting relays, a circuit is closed from ground over contact 3 of relay W(21), contact 5 of relay Z(21), contact 5 of relay TTR(21), conductor 2112, contact 2 of relay DTC(18) to battery through the winding of relay DC2(18) operating the latter relay.

Relay BTG(18) remains operated until relay G(17) has released to return the trunk circuit of Fig. 17 to normal. If relay BTG(18) releases after relay DC1(18) operates but before relay DC2(18) operates, a circuit is closed from battery through the winding of relay FDC(18), contact 1 of relay DC2(18), contact 4 of relay DC1(18), contact 1 of relay CDT(18), contact 1 of relay IR(18) to ground at contact 1 of relay BTG(18). Relay FDC(18) operates and locks over its contact 3 to ground at contact 6 of relay IR(18). With relay FDC(18) operated, lamp FDCL(18) is lighted to indicate a fast disconnect. Relay FDC(18) also disconnects relay BTG(18) from the busy test conductor of the trunk to prevent that relay from reoperating if the trunk is seized by a marker.

If relay BTG(18) is still operated at the end of the timing period, relay SDC(18) is operated as above described. Either relay FDC(18) or relay SCD(18), when operated, connects ground to conductor 1808 over contact 2 of relay MAN(13), conductor 1314, contact 1 of relay TB(3), conductor 306 to battery through the winding of relay AL(8) to bring about an alarm as will be described hereinafter. If relay BTG(18) remains operated until the test circuit times out, a circuit is closed from ground over contact 2 of relay BTG(18) and contact 2 of relay DC1(18) to light lamp NDC(18) as an indication that the test failed because the trunk did not release. However, if relay BTG(18) releases following the operation of relay SDC(18) but prior to the end of trouble time-out, a circuit is closed from ground over contact 1 of relay BTG(18), contact 1 of relay IR(18), contact 1 of relay CDT(18), contact 4 of relay DC1(18), contact 2 of relay DC2(18), contact 4 of relay FDC(18), contact 4 of relay SCD(18) to battery through lamp SDCL(18) to indicate an exceptionally slow disconnect.

*Advance of test connector*

If relay BTG(18) releases, following the operation of relay DC2(18) and prior to the operation of relay SDC(18), indicating the satisfactory completion of the disconnect test, a circuit is closed from ground at contact 1 of relay BTG(18), contact 1 of relay IR(18), contact 1 of relay CDT(18), contact 4 of relay DC1(18), contact 2 of relay DC2(18), contact 4 of relay FDC(18), contact 5 of relay SCD(18), conductor 1809, contact 4 of key REP(7), contact 3 of key TA(7) to battery through the winding of register CT(7). Register CT(7) operates to register the satisfactory completion of a test and connects ground over its contact and conductor 703 to battery through the upper winding of the advance relay CA(1). Relay CA(1) closes a locking circuit for itself from battery through its lower winding, over its contact 3 to ground on conductor 1600 which is effective until the cross-point XPO0(6) is opened to release the class relays PT(16) and MF(16). Relay CA(1) opens the circuit of relay ON(2) causing that relay to release and removes ground from conductors 210 to 218 in turn releasing any relays held operated thereover.

At its contact 6, relay CA(1) connects a supplementary ground to conductor 105 to hold relays GA(6) and GB(6) operated. In addition, relay CA(1) closes a circuit from battery through the upper winding of relay CA1(2), conductor 236, contact 6 of relay RN(1), contact 3 of relay CA(1) to ground on conductor 1600.

Relay CA1(2) operates in this circuit and locks in a circuit from battery through its lower winding and over its contact 7, conductor 211 to ground at contact 7 of relay CA(1). Conductor 211 is also grounded at contact 2 of relay ON(2), contact 2 of relay RL(3) and over contact 2 of relay PB(8), conductor 815 and contact 12 of relay ST(1). With relay CA1(2) operated, the locking circuit of relay ST(1) is opened so that, if the start key STT(1) has been restored, relay ST(1) will release and the progress of the test circuit will be arrested at this point. At its contacts 3 and 4, relay CA1(2) opens the trunk busy-test circuits and at its contacts 5 and 6 opens the select magnet-operating circuits.

Assuming that the test is to continue and that key STT(1) and relay ST(1) remain operated, relay CA1(2) closes a circuit from ground over contact 7 of relay GP(6), conductor 602, contact 1 of relay RN(1), contact 2 of relay S(1), contact 4 of relay H9(1), contacts 5 of relays H8(1) to H1(1), contact 4 of relay H0(1), contact 2 of relay CA(1), conductor 107, contact 1 of relay CA1(2), conductor 237, contact 2 of key STT(1), contact 2 of relay ST(1), contact 7 of relay H0(1) to battery through the winding of relay H1(1). Relay H1(1) operates in this circuit and locks over its contact 6 and contacts 5 of the higher numbered H relays including relay H8(1) and contact 4 of relay H9(1) to ground as above traced. With relay H1(1) operated, one holding circuit for relay H0(1) is opened, but that relay is held operated over its contacts 6 and 4, contact 2 of relay CA(1), conductor 107, contact 1 of relay CA1(2), conductor 237, contact 2 of key STT(1), contact 2 of relay ST(1), contact 7 of relay H0(1) and thence over the locking circuit of relay H1(1) to ground. With both relays H0(1) and H1(1) operated, the circuit of hold magnet HOLD0(6) is opened and the cross-point XPO0(6) is opened. The opening of cross-point XPO0(6) opens the circuit for the class relays PT(16) and MF(16) causing those relays to release and disconnect ground from conductor 1600, thereby releasing relay CA(1) in turn releasing relay H0(1) and extinguishing lamp U0(1). With relay H1(1) operated alone, a circuit is closed from ground over contact 1 of relay H0(1), contact 1 of the next even numbered H relay, not shown, contact 2 of relay H1(1) to conductor 121. Ground on conductor 121 lights lamp U1(1) and extends over contacts 2 of relays SC(6) and GB(6) to conductor 608 leading to the next hold magnet. Select magnet SEL(6) is held operated and therefore the next cross-point in the 0 level is closed, to associate the trunk test circuit with another pair of outgoing trunks.

When relay ON(2) releases, it opens the locking circuit of relay RL(3) causing that relay to release. With relay ON(2) released, relay BT1(2) is also released, reclosing the operating circuit for relay PB(8). With relays ON(2), RL(3) and CA(1) released and relay PB(8) reoperated, the locking circuits for relay CA1(2) are opened and that relay releases. When relay CA1(2) releases, the circuit for operating relay ON(2) is again closed and the test circuit is ready to start a test on the next trunk.

When the test of the next trunk is completed, relay CA(1) will be operated as above described and the next H relay will be operated. In this way the ten trunks appearing in the contacts 1, 3 and 5 of the ten cross-points in the 0 level will be tested. At the end of the test of the tenth trunk, relay H9(1) will be operated and when relays CA(1) and CA1(2) operate, a circuit is closed from ground at contact 7 of relay GP(6), conductor 602, contact 1 of relay RN(1), contact 2 of relay S(1), contacts 3 of relays H9(1) to H0(1), contact 2 of relay CA(1), conductor 107, contact 1 of relay CA1(2), conductor 237, contact 2 of key STT(1), contact 2 of relay ST(1), contact 8 of relays H0(1) to H8(1), contact 6 of relay H9(1) to battery through the winding of relay S(1). Relay S(1) operates in this circuit and locks over its contact 3 and conductor 108 to ground at contact 5 of relay CA(1) and contact 11 of relay SC(6). At its contact 2, relay S(1) opens the locking circuit for relay H9(1) and that relay releases, in turn releasing the corresponding hold magnet and opening the associated cross-point.

Relay S(1) closes a circuit which extends from ground on conductor 602 over contact 2 of relay GS(1), contact 4 of relays S9(1), contacts 5 of relays S8(1) to S1(1), contact 4 of relay S0(1), contact 1 of relay S(1), contact 5 of relay S0(1) to battery through the winding of relay S1(1). Relay S1(1) operates in this circuit and locks over its contact 6 and contacts 5 of the other numbered S relays including relay S8(1) and contact 4 of relay S9(1), contact 2 of relay GS(1), contact 1 of relay RN(1) to ground on conductor 602. Relay S0(1) is held operated over its contact 4, contact 1 of relay S(1), contact 5 of relay S0(1), contact 6 of relay S1(1) and thence as above traced for the locking circuit of relay S1(1).

With relays S0(1) and S1(1) operated, the circuit of select magnet SEL0(6) is opened and that select magnet releases, in turn releasing relay SC(6) opening one locking circuit for relay S(1). When relay CA(1) releases as above described, the locking circuit of relay S(1) is opened and that relay releases opening the holding circuit for relay S0(1) and reclosing the previously traced operating circuit for relay H0(1). With relay S1(1) operated and relay S0(1) released, a circuit is closed from ground over contact 1 of relay S0(1), contact 1 of the next even numbered S relay, contact 2 of relay S1(1) to conductor 111 lighting lamp T1(1). Conductor 111 extends over contact 2 of relay GA(6) to conductor 609 to operate the select magnet of level 1 of the cross bar switch. This select magnet reoperates relay SC(6) and with relay H0(1) operated, hold magnet HOLD0(6) is reoperated to close the cross-point at vertical 0 in level 1. The trunks appearing in contacts 1, 3 and 5 of the cross-points of level 1 are now tested in turn.

When the trunks appearing in level 1 have been tested the next numbered S relay will be operated and the test will progress as above described until the last trunk level 9 has been tested. At this time, relays S9(1) and H9(1) will be operated. When relays CA(1) and CA1(2) operate, relay S(1) is operated under the control of relay H9(1) as above, locking and releasing relay H9(1). With relay S9(1) operated, a circuit is closed from battery through the winding of relay GS(1), contact 6 of relay S9(1), contacts 8 of relays S8(1) to S1(1), contact 6 of relay S0(1), contact 1 of relay S(1), contacts 3 of relays S0(1) to S9(1), contact 2 of relay GS(1), contact 1 of relay RN(1), conductor 602 to ground at contact 7 of relay GP(6). Relay GS(1) operates and locks over its contact 3 to ground over contact 4 of relay S(1). Relay GS(1), at its contact 2, opens the holding circuit for relay S9(1) and that relay releases.

With relay GS(1) operated, a circuit is closed from battery through the winding of relay G1(6), contact 8 of relay G(6), conductor 610, contact 1 of relay GS(1), conductor 109, contact 5 of relay G(6), contacts 6 of relays G1(6) to GZ1(6), conductor 601 to ground at contact 3 of relay RN(1). Relay G1(6) operates and locks over its contact 7 and contacts 6 of the remaining G relays to ground over conductor 601. Relay G(6) is held operated over its contacts 7 and 5, conductor 109, contact 1 of relay GS(1), conductor 610, contact 8 of relay G(6), contact 7 of relay G1(6) and thence over the locking circuit of relay G1(6) to ground. With relays G(6) and G1(6) operated, the circuit of relay GP(6) is opened and that relay releases, in turn releasing relays GA(6) and GB(6). With relay GP(6) released, the operating circuit for the numbered S and H relays is opened.

When the test circuit is returned to normal, relays CA1(2) and CA(1) release, in turn releasing relay S(1)

and relay GS(1). With relay GS(1) released, the holding circuit for relay G(6) is opened and that relay releases. With relay G1(6) operated and relay G(6) released, relay GP(6) is reoperated in a circuit from battery through the winding of relay GP(6), contact 11 of relay G1(6), contact 12 of the first G relay of the next pair, to ground at contact 12 of relay G(0). With relay GP(6) reoperated, relays GA(6) and GP(6) are also reoperated. With relay GP(6) reoperated, relays S0(1) and H0(1) operate in the circuits previously described, in turn operating select magnet SEL0(6) and hold magnet HOLD0(6).

With relay G1(6) operated, the contacts 2, 4 and 6 of cross-point XPO0(6) and of the other cross-points of this switch are extended over the contacts of relay GP(6) to the test circuit to permit the second trunk connected to cross-point XPO0(6), and in turn the second trunks connected to the remaining cross-points, to be tested in the manner above described.

After all of the trunks connected with the first outgoing trunk connector have been tested, the first G relay of the next pair is operated and a new set of GP, GA and GB relays are operated to control the select magnets and hold magnets of the next outgoing trunk connector switch. In this way all of the outgoing trunks in the office may be tested. When the last group of trunks has been tested, the last G relay, for example relay GZ1(6), will be operated. Relay GZ1(6) lights the H lamp indicating the group of one hundred lines associated with that relay. In addition, with relay GZ1(6) operated, the operation of relay GS(1) closes a circuit from ground at contact 3 of relay RN(1), conductor 601, contact 5 of relay GZ1(6), contacts 4 of relays GZ(6) to G(6), conductor 109, contact 1 of relay GS(1), conductor 610, contacts 9 of relays G(6) to GZ(6), contact 8 of relay GZ1(6) to battery through lamp EC(6). If, as is probable, the number of outgoing trunks is such that there will be a number of unused cross-points in the last outgoing trunk connector, the class terminal corresponding to terminal 603 of the first unused set of terminals will be cross-connected to terminal 611 and lamp EC(6) will be lighted after the test circuit has advanced to that crosspoint. With the class terminal connected to lamp EC(6), none of the class relays of Fig. 16 will operate and relay ON(2) cannot operate, so that the test circuit times out and brings in an alarm with lamp EC(6) lighted to indicate that the test cycle has been completed.

Key STT(1) may be restored to stop the progress of the test circuit when it is desired to stop for an interval and then resume testing on the next trunk. When key STT(1) is restored, the test in progress will be completed since relay ST(1) is locked under the control of relay CA1(6) which has not operated during the progress of the test. At the completion of the test, relay CA1(6) will be operated as previously described, releasing relay ST(1). However, with key STT(1) restored, the circuit for operating the next numbered H relay is open. Relay CA(1) remains operated under the control of the class relays and the test connector remains operated. When key STT(1) is reoperated, relay ST(1) is reoperated and the test circuit advances to the next trunk and resumes testing on that trunk.

If it is desired to return the test circuit and the test connector to normal, so that testing may be resumed on the first trunk, key RNK(1) is closed. This key is controlled by the same key lever as key STT(1) so that key STT(1) is opened whenever key RNK(1) is closed. As above described, the test in progress will be completed. When relay CA1(2) operates, releasing relay ON(2) and the relays locked under its control, a circuit will be closed from battery through the winding of relay RN(1), contact 1 of key RNK(1), conductor 130 to ground at contact 1 of relay ST1(13). Relay RN(1) operates and locks to ground over contact 2 of key RNK(1). With relay RN(1) operated, the holding circuit for the G relay is opened, releasing the test connector. Relay RN(1) also opens the locking circuits for the numbered S and H relays, causing these relays to release. In addition, relay RN(1) opens the operating circuit for relay ST(1). When all of the test circuit relays have released as indicated by all of the lamps becoming dark, key RNK(1) is restored to normal.

*Particular circuit selection*

Keys PCST(1), PCH(1), PCT(1) and PCU(1) are provided to permit the test connector to be advanced manually to any desired trunk. If a test is in progress and the trunk to be tested is a higher numbered trunk, the test may be stopped by restoring to normal key STT(1) as above described. If the trunk to be tested is a lower numbered trunk, the test circuit must be restored to normal and then advanced to the desired trunk.

Assume, for example, that the completion of the previous test has left relays G1(6), S0(1) and H0(1) operated and that the trunk to be tested appears in the trunk connector associated with relay GN(6) in level 1 and vertical 1, when the test circuit returns to normal key PCH(1) will be operated closing a circuit from battery through the winding of relay GN(6), assuming that relay GN(6) follows relay G1(6) in the sequence, contact 8 of relay G1(6), contact 9 of relay G(6), conductor 610, contact 5 of relay ST(1), which is now released, contact of key PCH(1), conductor 109, contact 4 of relay G(6), contact 5 of relay G1(6), contacts 6 of relays GN(6) to GZ1(6), conductor 601 to ground at contact 3 of relay RN(1). Relay GN(6) operates in this circuit and locks over its contact 7 and contacts 6 of relays GN1(6) to GZ1(6) to ground on conductor 601. Relay G1(6) is held operated under the control of key PCH(1). The operation of relay GN(6) causes the release of relays GP(6), GA(6) and GB(6), releasing relays S0(1) and H0(1) to in turn release the hold magnet HOLD0(6) and select magnet SEL0(6) and open the cross-point XPO0(6). The opening of the cross-point releases the class relays and thereby releases relays CA(1) and CA1(2). When key PCH(1) is opened, relay G1(6) releases. If it is desired to advance to a higher numbered group, key PCH(1) will be reoperated until the proper G relay is operated as indicated by the lighting of the associated thousands and hundreds lamps. When the proper G relay is operated, the associated GP relay will be operated, in turn operating relays S0(1) and H0(1) in the manner previously described.

Key PCT(1) will now be operated closing a circuit from battery through the winding of relay S1(1), contact 5 of relay S0(1), contact of key PCT(1), contact 7 of relay ST(1), contact 4 of relay S0(1), contacts 5 of relays S1(1) to S8(1), contact 4 of relay S9(1), contact 2 of relay GS(1), contact 1 of relay RN(1), conductor 602 to ground at contact 7 of the operated GP relay. Relay S1(1) operates and locks as previously described, relay S0(1) remaining operated under the control of key PCT(1). When key PCT(1) is opened, relay S0(1) will release. In a similar manner, key PCT(1) may be reoperated until the proper numbered S relay is operated as indicated by the lighting of the associated tens lamp.

Key PCU(1) will then be operated closing a circuit from battery through the winding of relay H1(1), contact 7 of relay H0(1), contact 1 of relay ST(1), contact of key PCU(1), contact 4 of relay H9(1), contacts 5 of relays H1(1) to H8(1), contact 4 of relay H9(1), contact 2 of relay S(1), contact 1 of relay RN(1), conductor 602 to ground at contact 7 of the operated GP relay. Relay H1(1) operates in this circuit and relay H0(1) is held operated under the control of key PCU(1). When key PCU(1) is restored, relay H0(1) releases and the test circuit is associated with the desired trunk. By reoperating key PCU(1), the numbered H relays may be operated successively until the desired relay is operated as indicated by the lighting of the associated unit's lamp.

When key STT(1) is reoperated, the operated S and H relays cause the closure of the desired cross-point and the selected trunk is tested.

If it is desired to advance the test circuit to a lower numbered trunk, key STT(1) is restored to stop the test circuit. When the test in progress is completed, key RNK(1) is closed to restore the test circuit to normal and is then released. Key PCST(1) is then operated closing a circuit from battery through the winding of relay G(6), conductor 600, contact 3 of relay ST(1), contact of key PCST(1), conductor 104, contacts 6 of relays G(6) to GZ1(6), conductor 601 to ground at contact 3 of relay RN(1). With relay G(6) operated, keys PCH(1), PCT(1), and PCU(1) may be operated to advance to the desired trunk as above described.

Repeat tests

If it is desired to make repeated tests on the same trunk, for example, after repairs or adjustments have been made, key REP(7) will be operated. A particular circuit may be selected and the first test performed in the manner above described. With key REP(7) operated, conductor 1809, which is grounded as an indication of the completion of a satisfactory test as above described, is disconnected from register CT(7) and is connected to the repeat single test register RST(7). Register RST(7) closes a circuit from ground over its contact and conductor 704 to battery through the lower winding of relay CA1(2). Relay CA1(2) releases relay ON(2) to restore the test circuit to normal and thereby to release the incoming and outgoing link switches. Since relay CA(1) is not operated, the trunk connector cross-point remains closed. When the test circuit is restored to normal, register RST(7) releases, in turn releasing relay CA1(2). With relay CA1(2) released, relay ON(2) reoperates and a new test is started on the same trunk.

The test circuit is also arranged to make two tests in rapid succession on the same trunk to determine that the incoming trunk at the distant end of the outgoing trunk under test will release quickly enough so that an immediate reseizure at the outgoing end for a second call will not find the incoming end still engaged on the original call. In order to make this test, key RP2(13) is operated. The first test is carried to the completion of the supervision test at which time the test line of Fig. 23 is returning flashes at 120 impulses per minute. During the first test, lamp R2A(13) is lighted over contact 1 of relay RZ2(13) and contact 1 of key RP2(13). With key RP2(13) operated, the circuit previously traced over contact 3 of key RP2(13) for operating relay DTC(13) now extends over contact 4 of key RP2(13), contact 4 of relay RW2(13), winding of relay RW2(13), resistance AH(13) to battery. Relay RW2(13) operates and locks over its contact 3, conductor 1315 to ground at contact 1 of relay CAK(2). Relay RW2(13) closes a circuit from battery through resistance AG(13), winding of relay RZ2(13), contact 5 of key RP2(13), contact 3 of relay RW2(13) to ground on conductor 1315, but relay RZ2(2) cannot operate, being shunted by the operating circuit for relay RW2(13). Relay RW2(13) also closes a circuit from ground over contact 2 of key RP2(13), contact 2 of relay RW2(13), contact 4 of relay RZ2(13), conductor 704, lower winding of relay CA1(2) to battery. Relay CA1(2) releases relay ON(2) which causes the connection through the link switches to be broken down and permits the test circuit to restore to normal, preparatory for the next test. When relay V(9) releases, the operating circuit of relay RW2(13) is opened and relay RZ2(13) is permitted to operate. With relay RZ2(13) operated, the circuit of relay CA1(2) is opened releasing relay CA1(2) to permit relay ON(2) to reoperate and start the new test. With relay RZ2(13) operated, lamp R2B(13) is lighted over contact 2 of relay RZ2(13). A busy test is made on the trunk under test and, as soon as that trunk is restored to normal, relay BT(2) releases to initiate a new call on the same trunk. With relay RW2(13) operated, the short-circuiting path through the lower winding of relay BT(2) is opened to permit that relay to release quickly.

When the second supervisory test is completed, ground is connected to conductor 1903 and over contact 4 of key RP2(13), contact 5 of relay RZ2(13) to battery through resistance AH(13) in shunt of the winding of relay RW2(13) causing relay RW2(13) to release. Relay RZ2(13) remains operated over contact 5 of key RP2(13), contact 4 of relay RW2(13), contact 4 of key RP2(13) to ground on conductor 1903. With relay RW2(13) released, a circuit is closed from ground over contact 2 of key RP2(13), contact 1 of relay RW2(13), contact 3 of relay RZ2(13), conductor 1312 to battery through the winding of relay DTC(18) to initiate the normal disconnect test. When the disconnect test is completed, relay V(12) releases, in turn releasing relay RZ2(13) to prepare for a similar test on the next trunk.

If, when the trunk circuit is reseized, the connection at the distant office has not been released, the flashing signals generated by the test line will continue to be applied to conductors 234 and 235. When these conductors are connected to the windings of relays ONH(20) and OFH(20), the successive operation of relays ONH(20) and OFH(20) in response to the flashing signal will cause the operation of the premature flash relay PFL(14) and the alarm relay AL(8) as previously described. Lamps PFLL(14) and R2B(13) will be lighted to indicate a failure on a rapid repeat test.

Busy and trouble timing

Reference has been made above to a time-out operation. A common timing circuit is used for both busy and trouble timing. This timing circuit employs relays TZ(3), TW(3), TZ1(8), TW1(8), TA(8) and TA1(8) which are operated either under the control of interrupter B(3) or interrupter TC(3).

When relay ST(1) operates, it closes the circuit previously traced for operating relay BY(3). With relay BY(3) operated, the contact of interrupter B(3) is connected over contact 2 of relay BY(3), conductor 307, contact 1 of relay AL(8), conductor 816, contact 2 and winding of relay TW(3) to battery through resistance D(3). When the contact of interrupter B(3) closes, relay TW(3) operates and locks over its contact 3, conductor 308, contact 4 of relay AL(8), conductor 817 to ground at contact 3 of relay BY(3). Relay TW(3) closes a circuit from battery through resistance C(13), winding of relay TZ(3), contact 6 of relay BY(3), contact 3 of relay TW(3) to ground over conductor 308, but relay TZ(3) cannot operate since ground from the interrupter on conductor 816 is connected over contact 2 of relay TZ(3) to resistance C(3) and battery in shunt of the winding of relay TZ(3). When the interrupter contact opens, relay TZ(3) operates.

At the next closure of the contact of interrupter B(3), ground is again connected to conductor 816 and over contact 3 of relay TZ(3) to battery through resistance D(3) in shunt of the winding of relay TW(3) causing the latter relay to release. Relay TZ(3) is held operated over contact 2 of relay TW(3) to ground on conductor 816. When interrupter B(3) opens its contact, relay TZ(3) also releases. Subsequent closures and openings of the interrupter contact cause the above operations to be repeated.

During the time that relay TW(3) is released and relay TZ(3) held operated, a circuit is closed from ground over contact 6 of relay TW(3), contact 7 of relay TZ(3), conductor 309, contact 2 and winding of relay TW1(8), resistance F(8) to battery, operating relay TW1(8) which locks over its contact 3 to ground on conductor 308. Relay TW1(8) closes a circuit from battery through resistance E(8), winding of relay TZ1(8), conductor 818, contact 5 of relay BY(3), conductor 310, contact 3 of relay TW1(8) to ground on conductor 308. Ground on conductor 309 is connected over contact 2 of relay TZ1(8) to battery through resistance E(8), preventing the operation of relay TZ1(8) at this time. When relay TZ(3) releases, relay TZ1(8) operates.

During the second cycle of operation of relays TZ(3) and TW(3), when relay TW(3) is released, ground is again connected to conductor 309 which is now extended over contact 3 of relay TZ1(8) to resistance F(8) in shunt of the winding of relay TW1(8) causing the latter relay to release. Relay TZ1(8) is held operated over contact 2 of relay TW1(8) to ground on conductor 309. When relay TZ(3) releases, relay TZ1(8) also releases. With relay TW1(8) released and relay TZ1(8) held operated, a circuit is closed from ground over contact 7 of relay TZ1(8), contact 7 of relay TW1(8) to battery through the winding of relay TA(8). Relay TA(8) operates in this circuit and locks over its contact 2 to ground on conductor 308.

During the third cycle of relays TW(3) and TZ(3), relays TW1(8) and TZ1(8) are again operated and during the fourth cycle relays TW1(8) and TZ1(8) are released. These operations are also repeated during the fifth and sixth cycles. When relays TZ(3) and TW(3) are operated during the fourth cycle, a circuit is closed from ground over contact 5 of relay TW(3), contact 5 of relay TZ(3), conductor 311, contact 6 of relay TZ1(8), contact 6 of relay TW1(8), contact 5 of relay TA(8) to battery through the winding of relay TA1(8). Relay TA1(8) operates and locks over its contact 2 to ground on conductor 308.

When relay TW(3) operates at the beginning of the sixth cycle, a circuit is closed from ground over contact 5 of relay TW(3), contact 6 of relay TZ(3), conductor 312, contact 5 of relay TZ1(8), contact 5 of relay TW1(8), contact 4 of relay TA(8), contact 4 of relay TA1(8), contact 6 and winding of relay AL(8) to battery. Relay AL(8) operates and locks over its contacts 5 and 7 to ground over conductor 817. At its contact 4, relay AL(8) opens the locking circuits for relays TZ(3) to TA1(8) causing all of the timing relays to release.

If the trunk is idle or becomes idle during the busy timing operation, relay CS(8) operates as above described, opening the locking circuit of relay BY(3) and causing that relay to release. Relay BY(3) disconnects interrupter B(3) from the timing relays and also disconnects ground from conductor 817 causing any operated ones of the timing relays to release. The speed of interrupter B(3) is such that approximately five minutes elapses between the operation of relay ST(1) and the operation of relay AL(8). The functions of relay AL(8) will be described hereinafter.

After relay CS(8) is operated and the timing relays have released, ground connected as above traced to conductor 1300 is extended over contact 12 of relay CS(8), conductor 804, contacts 1 of relays TA1(8), TA(8), TW1(8) and TZ1(8), conductor 805, contacts 1 of relays TW(3) and TZ(3) to battery through the winding of relay TB(3). Relay TB(3) operates and locks over its contact 4 to ground on conductor 804 to start the trouble timing operation. With relay TB(3) operated, interrupter TC(3) is connected over contact 2 of relay TB(3) and contact 1 of relay BY(3) to conductor 307 to operate the timing relays in the manner above described. Relay TB(3) also connects ground to conductor 817 to provide locking circuits for the timing relays and at its contact 5, connects conductors 818 and 310 together to close a link in the circuit of relay TZ1(3). The speed of interrupter TC(3) is such that approximately one minute elapses between the operation of relay CS(8) and the operation of relay AL(8). When the test is completed, relay ST(1) is released as previously described, opening the locking circuit for relay TB(3) to stop the timing.

If relay AL(8) is operated, it disconnects the interrupter from the timing relays. It also disconnects battery from conductor 808 to release the decoder connector if that circuit is operated. In addition, it connects ground over its contact 3, conductor 819, contact of key ACO(7), contact 1 of key TA(7) to conductor 705 and over its contact 8, conductor 820 and contact 2 of key TA(7) to conductor 706 leading to the alarm circuit to give an audible and visual alarm. Furthermore, relay AL(8) lights lamp TA(8). In addition, if relay TB(3) is operated, relay AL(8) closes a circuit from ground over its contact 10, conductor 821, contact 6 of relay TB(3) to the winding of register TBR(3) to register a trouble time out.

If the tests are being made under close observation, key TA(7) may be operated to prevent the sounding of an alarm if the circuit times out. With key TA(7) operated, the operating circuit for register CT(7) is opened, so that the circuit cannot advance automatically to the next trunk. Key ACO(7) may be operated following the sounding of an alarm to silence the audible alarm, the visual alarm being maintained.

Having observed the lamps lighted to identify the trunk under test and the point at which the test timed out, the test man may advance the test circuit to test the next trunk by operating key CA(2). Key CA(2) operated, closes an obvious circuit for relay CAK(2). Relay CAK(2) disconnects ground from conductor 1315 permitting relays RW2(13) and RZ2(13) to release if operated. Relay CAK(2) also disconnects ground from conductor 201 to restore the timing relays to normal and closes a circuit from ground at contact 13 of relay ST(1), conductor 101, contact 2 of key CAK(2) to conductor 809 to hold the link switches. At its contact 4, relay CAK(3) connects ground over conductor 238 and contact 3 of key REP(3) to conductor 703 to operate relay CA(1) and advance the test circuit to the next trunk. If key REP(7) is operated, this circuit extends over contact 2 of key REP(7) and conductor 704 to battery through the lower winding of relay CA1(2) to start a new test on the same trunk.

If a trunk is found to be defective, key LO(19) may be operated connecting battery through resistance AY(19) over contact 4 of key LO(19) to conductor 1902 and ground through resistance AX(19) over contact 1 of key LO(19) to conductor 1901. Conductors 1901 and 1902 extend as previously traced to conductors 1702 and 1703 through the windings of retard coil A(17), upper and middle windings of relay LO(17). Relay LO(17) operates in this circuit and locks in a circuit from battery through its lower winding and over its contact 1 to ground through resistance LO1(17). With relay LO(17) operated, ground is connected over contact 3 of relay LO(17) to conductor 1700 to mark the trunk busy. Ground is also connected over contact 6 of relay LO(17) to hold relay OS(17) operated.

*Marker trouble*

If the marker is unable to find an idle channel between the test circuit and the trunk under test, it connects ground to conductors 239 and 240. Ground on conductor 239 operates relay COF(3) which locks over its contact 5 to ground on conductor 215. Ground on conductor 240 completes a circuit over contact 3 of relay TR1(3) to battery through the winding of relay TR(3). Relay TR(3) operates and locks through the winding of relay TR1(3) over contact 2 of relay TR(3) to ground on conductor 215. Relay TR(3), at its contact 1, opens the circuit of relay MC(2) causing that relay to release. At its contact 3, relay TR(3) opens the select magnet circuit. The release of relay MC(2) opens the operating circuit for the decoder connector and causes that circuit to release, in turn releasing the marker. The release of the marker removes ground from conductors 239 and 240 permitting relay TR1(3) to operate in the locking circuit of relay TR(3). With relay TR1(3) operated, a circuit is closed over contact 1 of relay TR1(3) and contact 2 of relay COF(3) to battery through lamp COF(3). A circuit is also closed from ground over contact 2 of relay TR1(3), contact 4 of relay COF(3), contact 1 of key APB(3), contact 7 of relay COF(3), conductor 1314, contact 1 of relay TB(3), conductor 306 to battery through the winding of relay AL(3) causing an alarm to be brought in.

If the marker encounters other trouble in setting up the connection, it grounds conductor 240 operating relay TR(3) which causes the marker to be released as above described, after which relay TR1(3) operates. Conductor 239 is not grounded and relay COF(3) is not operated under this condition. Therefore, relay TR1(3) lights lamp MKT(3) over contact 1 of relay COF(3) and connects ground over its contact 2 and contact 6 of relay COF(3) to conductor 1314 to operate relay AL(3).

Passing trunk positions

Each trunk block relay controls the wiring of forty sets of terminals. For some block relays, all of the terminal sets will be wired to trunk circuits. For others, some terminals may be left vacant for future use, while some terminals may be wired to patching jacks by means of which additional trunks may be patched into the trunk group. The test circuit has a cross-point for each set of trunk block terminals, whether or not the terminals are wired, to permit testing any trunks which may later be wired thereto. Those cross-points having access to unwired terminals have their class contacts cross-connected to class terminal 612 which is connected over conductor 613 to battery through the winding of relay VT(16). When the test connector closes such a cross-point, relay VT(16) operates, closing a circuit for lighting lamp VTL(16) and also closing a circuit from ground over contact 2 of relay VT(16), contact 4 of relay OP1(16), contact 3 of relay OP2(16), contact 4 of relay PA(16), contact 4 of relay PT(16), contact 4 of relay VT(16), conductor 1603 to battery through the lower winding of relay CA(1). Relay CA(1) advances the trunk connector to the next trunk as previously described.

Trunk block terminals which are wired to patching jacks connect ground to the trunk busy conductor, but have the select magnet circuit opened. Therefore, when the associated cross-point is closed, the trunk will appear to be busy and relay BT(2) will be held operated. Since the select magnet circuit is opened, relay SMT(8) cannot operate following the release of relays PB(8) and PB1(8) and when relay PB2(8) releases, a circuit is closed from ground on conductor 102, contact 4 of relay BT1(2), contact 3 of relay BT(2), conductor 205, contact 1 of relay CS(8), contact 3 of relay COF(3), contact 1 of key APB(3), contact 8 of relay COF(3), conductor 301, contact 2 of relay SMT(8), contact 2 of relay PB2(8), conductor 821, contact 9 of relay MAN(13), conductor 1316, contact 1 of key REP(7), contact 3 of key PIO(7) to battery through the winding of register PS(7). Register PS(7) connects ground to conductor 703 to cause the test circuit to advance to the next cross-point.

Since it may be assumed that a trunk which is busy is in reasonably good condition, key APB(3) is provided to permit passing busy trunks. With key APB(3) operated as soon as relay PB(8) releases, the circuit above traced extends over contact 3 of relay COF(3), contact 2 of key APB(3), counductor 313, contact 6 of key REP(7), conductor 717, contact 1 of relay PB(8), conductor 822, contact 7 of relay RZ2(13), contact 5 of relay RW2(13), conductor 1317 to battery through the winding of register PBI(7). Register PBI(7) operates and connects ground to conductor 703 to cause the test circuit to advance to the next cross-point. With key APB(3) operated, register PBI(7) is also operated on an all-channels-busy-signal from the marker, ground being connected over contact 2 of relay TRI(3) contact 4 of relay COF(3) and contact 2 of key APB(3) to conductor 313 and thence as above traced to the winding of register PBI(7).

Dial type pulsating trunks

As previously mentioned, the trunk test circuit is also arranged to test trunks leading to offices requiring dial type pulsing. For this type of trunk the class contact of the cross-point is cross-connected to class terminal 614 which is connected over conductor 615 to the upper winding of relay PT(16). Relay PT(16) is operated as above described, extending its operating circuit to battery through the winding of relay DC(16). With relay DC(16) operated, lamp DCL(16) is lighted.

Busy test and the setting of the connection to the trunk through the link switches take place as previously described. When relay SLA(12) operates, a circuit is closed from battery through the winding of relay SXD(14), conductor 1416, contact 4 of relay DC(16), conductor 1601, contact 2 of relay SLA(12), conductor 1204, contact 1 of relay PF(14), conductor 217 to ground at contact 8 of relay ON(2). At its contact 12, relay SXD(14) connects ground over conductor 1417 to battery through the winding of relay DCC(15).

When the marker releases, relay ST1(13) operates as previously described. The start-dial signal from the distant office operates relay TGO(13) starting the timing interval which results in the operation of relay GTF(18) as above. With relay DCC(18) operated, the operation of relay GTF(18) closes a circuit from ground over contact 4 of relay DCC(15), conductor 1501, contact 7 of relay GTF(18), conductor 1810, contact 2 of relay PF(14), contact 8 of relay MOP(14), conductor 1404 to battery through the winding of relay CPG(22) to disconnect ground from conductor 2205 and permit relay PG(22) to continue pulsing. A circuit is also closed from battery through lamp S(14), contact 11 of relay KPP(14), contact 6 of relay SXD(14), conductor 1401, contact 1 of relay GTF(18), conductor 1803, contact 1 of relay PFL(14), conductor 1402, contact 4 of relay PSL(13), contact 5 of relay SLC(13) to ground on conductor 213, lighting lamp S(14) as an indication that pulsing is about to commence. As previously described, the operation of relay GTF(18) releases relay GTC(18) which in turn releases relay TTR(21).

When relay ST1(13) operates, it connects ground over its contact 2 to conductor 1303, completing a circuit over contact 3 of relay PF(14), contact 4 of relay STP(14), contact 7 or relay U(14), contact 5 of relay TN(14), contact 5 of relay HU(14), contact 8 of relay SXD(14), contact 11 of relay MOP(14) to battery through the winding of relay HU(14). Relay HU(14) operates and locks as previously described.

At the end of the timing operation, relay PCK(22) has its contact 1 closed. When this contact opens, relays DE1(21), DE2(21), Z(21) and WR(21) release as previously described. When now relay PCK(22) closes its contact 2, relay PC(22) is operated, completing a circuit from battery through the winding of relay BD(20), conductor 2003, contact 2 of relay GTF(18), conductor 1811, contact 2 of relay SXD(14), contact 8 of relay PFL(14), conductor 1418, contact 9 of relay DTR(20), conductor 1419, contact 5 of relay MOP(14), conductor 2215, contact 2 of relay PC(22), conductor 2004, contact 8 of relay TTR(21), contact 5 of relay W(21) to ground at contact 5 of relay DE1(21). Relay BD(20) operates in this circuit and at its contact 2 connects conductor 1419 to conductor 2004 to provide a locking circuit for itself independent of relay PC(22).

With relay BD(20) operated, ground on conductor 1201 is connected over contact 3 of relay DE2(21), conductor 2101, contact 3 of relay BD(20) and conductor 2103 to the upper armature of relay PE(22) to provide circuits for operating the counting relays. At its contact 4, relay BD(20) opens the circuit of relays ONH(20) and OFH(20) causing relay ONH(20) to release.

Trunk circuits similar to that shown in Fig. 17 may be used to give access to offices requiring dial type pulsing. With relay SXD(14) operated, the operate test for relay SL(17) cannot be made, but with relay SLA(12) operated, relay SL(13) is connected to the winding of relay SL(17) to perform the non-operate test as previously described. With relay SL(17) non-operated, the pulsing simplex circuit extends from conductors 1704 and 1705 through the windings of retard coil B(17), windings of relay R(17) over contact 5 of relay SL(17), contact 3 of jack T(17) through the lower winding of relay SVP(17) to battery through resistance P(17). In the test circuit, this circuit extends from conductors 232 and 233 over contacts 7 and 8 of relay MT(2), conductors 234 and 235, over contacts 12 and 10 of relay SLA(12) to conductor 1206 and over contact 6 of relay BD(20) to condenser SXD(20) and through resistance ZP(20) over contact 6 of relay DTR(20) or over the contact of relay MDP(20), conductor 2005, contact 1 of relay SXD(14), conductor 1420, contact 9 of relay KP(12), conductor 1213, contact 3 of jack PJ(22) to contact 1 of relay P(22). At the time relay BD(20) operates to prepare this circuit, relay P(22) is engaging its contact 2 and the circuit is not completed.

When relays P(22) and PCK(22) close their contacts 1, ground is connected to the pulsing simplex circuit by relay P(22) and ground is removed from the operating circuit of relay PC(22) by relay PCK(22) permitting relay PE(22) to operate and close the circuit for operating relay PC1(21) in the manner previously described. Therefore, each time that ground is connected to the pulsing circuit, a counting relay is operated. In the trunk circuit the connection of ground to the pulsing circuit causes relay SVP(17) to connect ground to conductor 1707 leading to the composite signaling circuit 1720 which transmits a corresponding pulse to the distant office.

Assuming that the digit switches of Fig. 15 are set for the same code as before, when eight pulses have been transmitted to the distant sender and relay PC6(21) has been operated followed by relay PC2(21), a circuit is closed from battery through resistance CB(21), winding of relay DE1(21), contact 2 of relay PC6(21), contact 2 of relay PC2(21), conductor 2128, brush of switch A3(15), contact 3 of relay DCC(15), conductor 1408, contact 7 of relay HU(14), contact 8 of relay KPP(14), contact 9 of relay SXD(14), conductor 1421, contact 1 of relay TTR(21), contact 1 of relay Z(21) to ground.

With relay DE1(19) operated, the locking circuit of relay BD(20) is opened and that relay releases, disconnecting the pulsing simplex circuit from the contact of relay P(22) and connecting it to the windings of relays ONH(20) and OFH(20) to detect a stop-dial or supervisory signal from the distant office during the interdigital period. The release of relay BD(20) also disconnects ground from the armature of relay PE(22) to prevent the operation of additional counting relays. In the manner previously described, relay W(21) is operated and the circuit for relay Z(21) prepared. Relay DE2(21) operates under the control of relay PCK(22), releasing relays PC2(21) and PC6(21). When relay PCK(22) opens its contact 1, relays DE1(21) and DE2(21) release and relay Z(21) operates.

With relays Z(21) and W(21) operated, a circuit is closed from battery through the winding of relay PG1(22), conductor 2212, contact 6 of relay TTR(21), contact 5 of relay Z(21), contact 3 of relay W(21) to ground. With relay HU(14) operated, the operation of relay PG1(22) closes the previously traced circuit for operating relay TN(14), relay TN(14) locking and opening one locking circuit for relay HU(14).

Ground is now reconnected to the armature of relay PE(22) over conductor 2103, contact 4 of relay W(21), contact 6 of relay Z(21), contact 3 of relay WR(21), contact 3 of relay DE2(21) and conductor 1201. Relays PG(22), P(22) and PCK(22) continue to pulse, but relay P(22) is rendered ineffective by the release of relay BD(20). The counting relays are operated under the control of relay PCK(22) to measure an interdigital interval. Relay BD(20) is not operated when relay PC(22) operates during the interdigital interval since its operating circuit is now opened at contact 5 of relay W(21). When relay PC4(21) operates, relay DE1(21) is operated over a circuit extending over contact 1 of relay PC6(21), contact 1 of relay PC4(21), contact 3 of relay TTR(21) to ground at contact 2 of relay Z(21). Relay WR(21) is now operated in the manner previously described, disconnecting ground from the armature of relay PE(22) to stop the operation of the counting relays and releasing relay W(21). When relays DE1(21) and DE2(21) release, the counting circuit is again normal. When relays Z(21) and W(21) release, relay PG1(22) releases in turn releasing relay HU(14).

The pulsing relays continue to operate and with relay W(21) released, relay BD(20) is reoperated to reestablish the out-pulsing circuit. When relay PC6(21) operates with relay PC5(21) held operated, relay DE1(21) is operated over contact 2 of relay PC6(21), contact 2 of relay PC5(21), conductor 2106, brush of switch B3(15), contact 2 of relay DCC(15), conductor 1410, contact 7 of relay TN(14), contact 8 of relay HU(14), contact 8 of relay KPP(14), contact 9 of relay SXD(14), conductor 1421, contact 1 of relay TTR(21) to ground at contact 1 of relay Z(21). The operations marking the termination of the digit and the interdigital interval take place as above described. When relay PG1(22) is again operated, relay U(14) is operated and locked, relay TN(14) releasing when relay PG1(22) is released.

The third digit is controlled in the manner above described by switch C3(15) and relay U(14). When relay BD(20) operates at the beginning of the third digit, a circuit is closed from battery through the winding of relay LDG(14), contact 2 of relay U(14), conductor 1422, contact 1 of relay BD(20), conductor 2006, contact 7 of relay SLC(13) to ground on conductor 213. Relay LDG(14) operates and locks over its contact 3 to ground over conductor 2006. With relay LDG(14) operated, the circuit of relay W(21) is opened so that no interdigital period will be measured following the third digit. When relay DE1(21) operates at the end of the third digit, it closes a circuit from ground on conductor 813, contact 3 of relay DE1(21), conductor 1400, contact 4 of relay LDG(14), conductor 2212 to battery through the winding of relay PG1(22). Relay PG1(22) closes a circuit from ground on conductor 1303 over contact 3 of relay PR(14), contact 4 of relay STP(14), contact 6 of relay U(14) and thence as previously traced over the contact of relay PG1(22) to contact 4 of relay U(14), contact 4 of relay SXD(14) to battery through the winding of relay PF(14). Relay PF(14) locks to conductor 1303 holding relay U(14) operated until relay PG1(22) releases at the end of the digit. With relay PF(14) operated and relay U(14) released, relay SXD(14) releases, in turn releasing relay DCC(15). Relay PF(14) also opens the circuit of relay CPG(22) so that, as soon as relay DE1(21) releases, ground is again connected to conductor 2205 to stop the pulsing.

With relay SXD(14) released, a circuit is closed from battery through the winding of relay SLO(13), conductor 1307, contact 5 of relay SXD(14), conductor 1401, contact 1 of relay GTF(18), conductor 1803, contact 1 of relay PFL(14), conductor 1402, contact 4 of relay PSL(14), contact 5 of relay SLC(13) to ground on conductor 213. The operate test of relay SL(17) and the supervision and ringing tests take place as described for the multifrequency trunk.

Other trunk classes

The operation of the test circuit for trunk classes which operate relay PT(16) has been described in detail. In addition, the function of class relay VT(16) in passing vacant terminals has been described. Class relays OP1(16) and OP2(16) are operated for trunks outgoing to operator positions, relay OP1(16) being operated for trunks not equipped with busy guard timing on disconnect and relay OP2(16) being operated for trunks which are equipped with busy guard timing. Relay PA(16) is operated with relay MF(16) or relay DC(16) for trunks outgoing to offices having automatic equipment but which are not equipped with an intertoll trunk test line. With relay OP1(16), OP2(16) or PA(16) operated, ground is connected to conductor 1604. If the test circuit is set for automatic operation, that is, if relay MAN(13) is not operated, ground on conductor 1604 extends over contact 8 of relay MAN(13), conductor 1318, contact 2 of key PIO(7), contact 2 of key PSI(7), conductor 1603, contact 6 of relay RN(1), conductor 236 to battery through the upper winding of relay CA1(2) ot cause the test circuit to advance to the next trunk.

Manual tests

For operator trunks and trunks to offices having no test line, tests are made on a manual basis with the assistance of an operator or test man at the distant office. If the test desk at the distant office may be reached by means of three code digits, the code may be sent out automatically and key MAN-A(13) will be operated. If a different number of digits is required, key MAN-M(13) will be operated and the code will be sent manually either by operating dial 2007 or by operating key-set 1530 according to the requirements of the distant office. With either key MAN-A(13) or key MAN-N(13) operated, relay MAN(13) is operated. In addition, the busy timing and trouble timing circuits are disabled.

The trunk to be tested, or the first of a group of such trunks, will be selected by means of keys PCST(1), PCH(1), PCT(1) and PCU(1) in the manner previously described. When key STT(1) is operated, the test circuit proceeds to make the trunk busy test and to control the connection of the test circuit with the desired trunk in a manner previously described. When the marker releases, relay ST1(13) is operated.

If the trunk to be tested is an operator trunk, class relay OP1(16) or class relay OP2(16) will be operated and the operation of relay ST1(13) closes a circuit from ground over its contact 2, conductor 1303, contact 1 of relay OP1(16) or contact 1 of relay OP2(16), conductor 1605 to battery through the winding of relay PF(14) to simulate the completion of out-pulsing. Relay PF(14) operates and locks over its contact 4 to ground on conductor 1303. Since relay SXD(14) is not operated, the non-operate and operate tests of the SL relay of the trunk are immediately performed after which lamp SV(13) lights as a signal to the test man that the connection has been established. When the operator responds at the distant office, lamp SV(13) will be extinguished.

Figure 20:
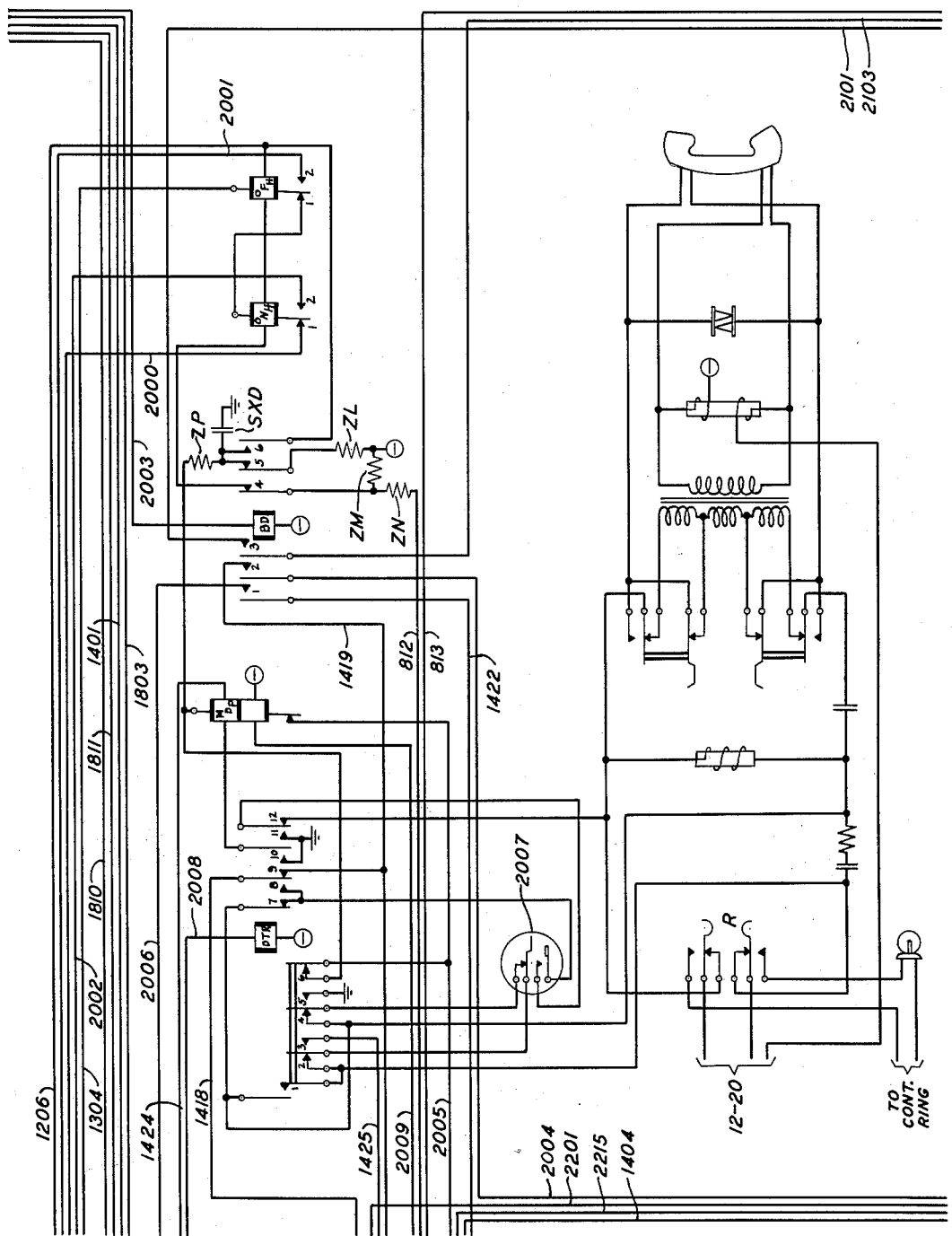
Fig. 20 shows an operator's telephone and control circuits for transmitting dial type pulses to the distant office.

The test man may operate key TEL(12) to connect his telephone, shown in Fig. 20, with the trunk through the hybrid coil HY(12) and may make any desired tests in cooperation with the operator. No ringing and supervisory tests are performed by the test circuit since the circuit of relay A(4), which initiates these tests, is open at contact 6 of relay MAN(13), but the test man may ring by means of key R(20). When the test man wishes to release the trunk he will operate key MA(13) closing a circuit for relay STF(18) which operates relay V(9). When key MA(13) is released, relay DTC(18) is operated for disconnect. For operator trunks in class OP2, the disconnect test takes place in the manner previously described and the test circuit advances to the next trunk. For operator trunks in class OP1, a circuit is closed from ground over contact 7 of relay OP1(16), conductor 1606 to battery through the winding of relay CDT(18) operating the latter relay. With relay CDT(18) operated, relay FDC(18) cannot operate and when relay BTG(18) releases, a circuit is closed from ground over contact 1 of relay BTG(18), contact 1 of relay IR(18), contact 2 of relay CDT(18), contact 5 of relay SDC(18) to conductor 1809 and thence as previously traced to the winding of register CT(7) to initiate the advance of the trunk connector to the next trunk.

For trunks extending to offices having automatic equipment but no test line and in which the test desk may be reached by a three-digit code, the switches of Fig. 15 may be set according to the required code and key MAN-A(13) operated. The trunk class relay will operate either relay MFP(12) or relay SXD(14) according to the type of pulsing required to prepare the test circuit for transmitting the code to the distant office. The test circuit continues to function automatically until the distant test desk is reached. Lamp SV(13) informs the test man when the trunk is ready for test.

If a different number of digits is required, key MAN-M(13) will be operated. In this case a circuit will be closed from ground over contact 3 of key MAN-M(13), conductor 1319 to battery through the winding of relay MOP(14). The test of the busy condition of the trunk and the connection of the test circuit with the trunk take place as previously described. For an office requiring multifrequency pulsing, relay MFP(12) is operated and the test of the SL relay in the trunk is made. The preliminary or key pulse signal is transmitted automatically in the manner previously described after which relay KPP(14) is released. With relay MOP(14) operated, the circuit of relay HU(14) is opened and the release of relay KPP(14) closes a circuit from battery through lamp S(14), contact 11 of relay KPP(14), conductor 1423, contact 10 of relay KP(12) to ground at contact 3 of relay SLA(12), lighting lamp S(14) as a signal that the test man may transmit the desired code.

With relay MOP(14) operated, the operation of relay PG1(22) closes a circuit from ground on the operating circuit of relay KPP(14) over contact 6 of relay KPP(14), conductor 1407, contact 1 of relay PG1(22), conductor 2216, contact 4 of relay KPP(14), contact 10 of relay MOP(14) to battery through the winding of relay STP(14). Relay STP(14) locks over its contact 5 and contact 3 of relay PF(14) to ground on conductor 1303. Relay STP(14) opens the operating circuit of relay KPP(14) but that relay is held operated over contact 1 of relay PG1(22) and the locking circuit of relay STP(14) until relay PG1(22) releases. When relay PG1(22) releases, relay KPP(14) releases, in turn releasing relay CPG(22) to stop the pulsing.

The keys of key-set 1530 will be operated in accordance with the required code, connecting the corresponding frequencies from source 1500 over the key contacts to conductors 1209 and 1210, contacts 2 and 6 of relay MFP(12) to the input winding of the hybrid coil HY(12). After the last digit has been transmitted, the test man will operate key ST(13) completing a circuit over contact 1 of relay MAN(13), conductor 2212 to battery through the winding of relay PG1(22). Relay PG1(22) operates to transmit the start pulse under the control of relay STP(14) and operates relay PF(14) as previously described. When key ST(13) is released, relay PG1(22) releases to terminate the start pulse and release relay STP(14).

If the trunk under test requires simplex dial pulsing, the trunk class relay will cause the operation of relay SXD(14) as previously described, in turn operating relay DCC(15). With relay SXD(14) operated, lamp S(14) is lighted when relay GTF(18) operates, following a successful non-operate test of the SL relay of the trunk. As soon as relay DE1(21) releases following the operation of relay GTF(18), the operation of the pulsing circuit is stopped. The circuit for lamp S(14) may be traced from battery through that lamp, contact 11 of relay KPP(14), contact 6 of relay SXD(14), conductor 1401, contact 1 of relay GTF(18), conductor 1803, contact 1 of relay PFL(14), conductor 1402, contact 4 of relay PSL(13), contact 5 of relay SLC(13) to ground on conductor 213. With relay SXD(14) operated, a circuit is closed from battery through the winding of relay STP(14), contact 10 of relay MOP(14), contact 8 of relay SXD(14), contacts 5 of relay HU(14) and TN(14), contact 7 of relay U(14), contact 4 of relay STP(14), contact 3 of relay PF(14), conductor 1303 to ground at contact 2 of relay ST1(13). Relay SLA(12) is held operated under the control of relay SLC(13) and the pulsing conductors of the trunk, which are extended to conductors 234 and 235 are connected over contacts 10 and 12 of relay SLA(12), conductor 1206, windings of relays OFH(20) and ONH(20), contact 4 of relay BD(20) to the voltage divider including resistances ZN(20) and ZM(20).

When relay GTF(18) operates, a circuit is also closed from battery through the winding of relay DTR(20), conductor 2008, contact 7 of relay MOP(14), contact 2 of relay PF(14), conductor 1810, contact 7 of relay GTF(18), conductor 1501 to ground at contact 4 of relay DCC(15).

Relay DTR(20) closes a biasing circuit for relay MDP(20) which may be traced from battery over contact 4 of relay MOP(14), conductor 1424, upper winding of relay MDP(20) to ground at contact 10 of relay DTR(20). Relay DTR(20), at its contacts 2 and 4, disconnects the pulsing contact of dial 2007 from the telephone circuit and at its contact 1 closes a substitute link in that circuit. Relay DTR(20) also closes a circuit from battery through the lower winding of relay MDP(20), conductor 2009, contact 6 of relay MOP(14), resistance ZH(14), conductor 1425, contact 3 of relay DTR(20), pulsing contact of dial 2007, contact 5 of relay DTR(20) to ground. Relay MDP(20) is energized in this circuit in a direction to hold its contact open. At its contact 6, relay DTR(20) opens a shunt around the contact of relay MDP(20).

When now the test man operates the dial off-normal to send the first digit, a circuit is closed from ground over contact 11 of relay DTR(20), off-normal contact of dial 2007, contact 8 of relay DTR(20), conductor 1418, contact 8 of relay PFL(14), contact 2 of relay SXD(14), conductor 1811, contact 2 of relay GTF(18), conductor 2003 to battery through the winding of relay BD(20). Relay BD(20) disconnects the windings of relays ONH(20) and OFH(20) from battery and connects the pulsing conductor 1206 over its contact 6 through resistance ZP(20) to the armature of relay MDP(20). As the dial 2007 returns to normal, the pulsing contact interrupts the circuit through the lower winding of relay MDP(20) causing that relay to release and close its contact to extend the pulsing conductor to conductor 2005, contact 1 of relay SXD(14), conductor 1420 to ground at contact 1 of relay MOP(14). During the interval between digits, relay BD(20) releases and recloses the connection of battery through the windings of relays ONH(20) and OFH(20) to the pulsing circuit.

After the last digit has been dialed, key ST(13) is operated operating relay PG1(22) which, with relay STP(14) operated, operates relay PF(14). When key ST(13) is released, relay STP(14) releases and relays SXD(14) and DCC(15) are released to permit the operate test of the SL relay of the trunk to be made, after which relay SLA(12) releases to connect the trunk connectors to the hybrid coil.

*No-ring trunks*

If there are trunks to be tested which are not arranged to accept a rering signal at the far end, the ringing and supervision tests must be omitted. When the test line is reached, the test circuit times for two seconds to insure that the steady off-hook signal is being received and then advances to the disconnect test. Provision for testing such trunks is made by assigning the trunk block and test connector terminals so as to provide an unused terminal immediately preceding and immediately following the group of "no-ring" trunks.

The trunk class contacts of the cross-points of such unused terminals are cross-connected to terminal 616. When the test connector advances to such a terminal, ground over the associated G relay is extended over the operated cross-point to terminal 616 and over conductor 617, contact 3 of relay NR(16), winding of relay NR(16), resistance N(16) to battery. Relay NR(16) operates and locks over its contact 4 and conductor 1607 to ground at contact 5 of relay RN(1). Relay NR(16) closes a circuit from battery through resistance N1(16), winding of relay NR1(16), contact 4 of relay NR(16) to ground on conductor 1607, but relay NR1(16) cannot operate being shunted by ground on conductor 617 over its contact 6. With relay NR(16) operated, a circuit is closed from ground over contact 3 of relay NR1(16), contact 2 of relay NR(16), conductor 613 to battery through the winding of relay VT(16). With relay VT(16) operated, the test connector is advanced to the next cross-point as previously described. When the test connector cross-point opens, ground is removed from conductor 617 and relay NR1(16) operates, releasing relay VT(16).

In testing a "no-ring" trunk, the test proceeds in the same manner as a normal test up to the point where the first off-hook signal arrives and the multivibrator tube V1(10) starts its initial two-second timing operation. When relay MV(5) operates at the end of this two-second period, a circuit is closed from ground at contact 4 of relay MV(5), contact 3 of relay AL1(5), contact 9 of relay M4(5), contact 11 of relay TT(5), conductor 511, contact 2 of relay NR1(16), conductor 922 to battery through the winding of relay STF(18). Relay STF(18) operates relay V(9) which opens the circuit of relay STV(10) causing that relay to release again blocking the multivibrator and releasing relay MV(5). With relay MV(5) released, relay STF(18) releases and operates relay DTC(18) to start the disconnect test.

When the last "no-ring" trunk has been tested, the test connector is advanced to the second vacant terminal where the trunk class terminal is connected to terminal 616 and conductor 617 is grounded. Ground on conductor 617 now extends over contact 5 of relay NR1(16) to battery through resistance N(16) in shunt of the winding of relay NR(16) causing that relay to release. Relay NR1(16) is held operated over contact 3 of relay NR(16) and conductor 617. Relay VT(16) is operated over contact 1 of relay NR(16) and contact 4 of relay NR1(16) to cause the test connector to advance to the next cross-point, where ground is removed from conductor 617 and relay NR1(16) also releases.

*Pass idle*

The trunk test circuit is provided with a pair of keys either of which may be operated to cause the test circuit to pass idle trunks and time out on busy trunks. This provides a rapid test which may be run during light load periods to detect trunks which may be falsely busy. Key PIO(7) permits passing only idle trunks while key PSI(7) permits passing spare terminals as well.

This test is started in the usual manner by operating start key STT(1). Relay ST(1) operates, in turn operating relay G(6), relay GP(6), relay S0(1), relay H0(1), cross-point XPO0(6) and relay BT(2) as previously described. A trunk class relay of Fig. 16 is operated in the usual manner, connecting ground to conductor 1600 to operate relay ON(2). Relay ON(2) operates relay BT1(2). With cross-point XPO0(6) closed, the busy test conductor of the first trunk, conductor 1700, is extended as previously traced over contact 5 of cross-point XPO0(6), contact 3 of relay G(6), contact 5 of relay GP(6), conductor 607, contact 6 of relay CA1(2), conductor 204, contact 2 of relay SL0(13), contact 2 of relay SLC(13), conductor 1301, contact 2 of relay BT1(2) to the upper armature of relay BT(2). Relay BT1(2) opens the operating circuit of relay BT(2) so that if the trunk is busy, relay BT(2) will remain locked to the busy test conductor and if the trunk is idle, relay BT(2) will release. If relay BT(2) remains operated, the busy timing circuit will function to bring in an alarm. If the trunk is idle and relay BT(2) releases, the busy test conductor is normally given a continuity test, but with either key PI0(7) or PSI(7) operated, the continuity test circuit is opened at the contact of the operated key and therefore relay CTA(2) does not operate. When relay BT(2) releases, a circuit is closed from ground at contact 14 of relay ST(1), conductor 102, contact 4 of relay BT1(2), contact 4 of relay BT(2), contact 4 of relay CTA(2), conductor 208 to battery through the winding of relay CS(8). Relay CS(8) operates and locks over its contact 6 to ground on conductor 212. With relay CS(8) operated, relay MC(2) is normally operated to call in a marker, but with either key PI0(7) or key PSI(7) operated, the circuit of relay MC(2) is opened and a circuit is closed from ground on conductor 215, contact 1 of relay TR(3), contact 4 of relay RL(3), conductor 807, contact 4 of relay CS(8), conductor 702, either over contact 6 of key PSI(7) or over contact 5 of key PSI(7) and contact 7 of key PI0(7) to battery through the winding of register PBI(7). Register PBI(7) connects ground to conductor 703 to operate relay CA(1) and advance the connector to the next trunk.

When the connector engages trunks normally passed on an automatic test, such as operator trunks, ground connected to conductor 1604 by the trunk class relay, which normally operates relay CA1(2) is now extended over contact 8 of relay MAN(13), conductor 1318 either over contact 1 of key PI0(7) or over contact 2 of key PI0(7) and contact 1 of key PSI(7) to conductor 1600 to operate relay ON(2) and permit a busy test of these trunks.

If key PI0(7) is operated, the circuit of register PS(7) is opened and the circuit times out on spare terminals. This may give an indication of trunks which are unintentionally plugged busy. With key PSI(7) operated, the circuit of register PS(7) is not opened and the circuit will also pass spare terminals as previously described.

What is claimed is:

1. In a telephone system, trunk circuits each having a plurality of talking conductors and an individual test conductor, said test conductor connected to battery when said trunk circuit is idle and connected to ground when said trunk circuit is busy, routine testing equipment for testing said trunk circuits, means in said testing equipment to connect with said test conductors one at a time, means in said testing equipment to test the connected one of said test conductors for ground, means controlled by said ground testing means responsive to the absence of ground on said one test conductor to test said one test conductor for battery, switch means to connect said test equipment with the talking conductors of said trunk circuits, and means operated responsive to the operation of said battery testing means to operate said switch means to connect said testing equipment with the talking conductors of the trunk circuit to which said test conductor is individual.

2. In a telephone system, trunk circuits each having a plurality of talking conductors and an individual test conductor, said test conductor connected to battery when said trunk circuit is idle and connected to ground when said trunk circuit is busy, routine testing equipment, a preoperated ground test relay in said routine testing equipment, means in said testing equipment to connect said test conductors one at a time to said ground test relay, said ground test relay releasing responsive to the absence of ground on said test conductor, a battery test relay, means responsive to the release of said ground test relay to connect said battery test relay to said busy test conductor, said battery test relay operating responsive to the presence of battery on said test conductor, switch means to connect said test circuit with the talking conductors of said trunk circuits, and means responsive to the operation of said battery test relay to operate said switch means to connect said testing equipment with the talking conductors of the trunk circuit to which said test conductor is individual.

3. In a telephone system, trunk circuits each having a plurality of talking conductors and an individual test conductor, said test conductor connected to battery when said trunk circuit is idle and connected to ground when said trunk circuit is busy, routine testing equipment, a progressively operable test connector for connecting said testing equipment with said test conductors one at a time, ground test means in said testing equipment to test the connected one of said test conductors for ground, means normally controlled by said ground testing means in response to the absence of ground to test said test conductor for battery, and manually controlled means for rendering said ground testing means effective to disconnect said testing equipment from said one test conductor and advance said test connector to the test conductor of another trunk circuit.

4. In a telephone system, trunk circuits each having a plurality of talking conductors and an individual test conductor, said test conductor connected to battery when said trunk circuit is idle and connected to ground when said trunk circuit is busy, routine testing equipment, a progressively operable test connector for connecting said testing equipment with said test conductors one at a time, a preoperated ground test relay in said routine testing equipment, means in said testing equipment to connect the connected one of said test conductors with said ground test relay, said ground test relay releasing responsive to the absence of ground on said test conductor, a battery test relay, means normally controlled by the release of said ground test relay to connect said battery test relay to said test conductor, and manually controlled means for causing the release of said ground test relay to disconnect said testing equipment from said one test conductor and advance said test connector to the test conductor of another trunk circuit.

5. In a telephone system, trunk circuits, a routine testing circuit, means in said testing circuit to seize said trunk circuits one at a time, a test line, means to connect a seized trunk circuit with said test line, means in said test line to transmit a plurality of supervisory signals to said seized trunk circuit, means in said seized trunk circuit to retransmit said supervisory signals to said testing circuit, means in said testing circuit to receive said supervisory signals, means to time said supervisory signals, and means under the joint control of said receiving means and said timing means to release said seized trunk circuit.

6. In a telephone system, trunk circuits, a routine testing circuit, means in said testing circuit to seize said trunk circuits one at a time, a test line, means to connect a seized trunk circuit with said test line, means in said test circuit to transmit a plurality of ringing signals to said trunk circuit, means in said trunk circuit to retransmit said ringing signals to said test line, means in said test line responsive to said ringing signals to transmit a plurality of supervisory signals to said seized trunk circuit, means in said seized trunk circuit to retransmit said supervisory signals to said testing circuit, means in said testing circuit to receive said supervisory signals, means to time said supervisory signals, and means under the joint control of said receiving means and said timing means to release said seized trunk circuit.

7. In a telephone system, trunk circuits, a routine testing circuit, means in said testing circuit to seize said trunk circuits one at a time, a test line, means to connect a seized trunk circuit with said test line, means in said test circuit to transmit a plurality of ringing signals to said trunk circuit, first timing means to time said ringing signals, means in said trunk circuit to retransmit said ringing signals to said test line, means in said test line responsive to said ringing signals to transmit a plurality of supervisory signals to said seized trunk circuit, means in said seized trunk circuit to retransmit said supervisory signals to said testing circuit, means in said testing circuit to receive said supervisory signals, second timing means to time said supervisory signals, and means under the joint control of said receiving means and said first and second timing means to release said seized trunk circuit.

8. In a telephone system, trunk circuits, a routine testing circuit, means in said testing circuit to seize said trunk circuits one at a time, a test line, means to connect a seized trunk circuit with said test line, means in said test circuit to transmit a plurality of ringing signals to said trunk circuit, first timing means to set up time limits for said ringing signals, means in said trunk circuit to retransmit said ringing signals to said test line, means in said test line responsive to said ringing signals to transmit a plurality of supervisory signals to said seized trunk circuit, means in said seized trunk circuit to retransmit said supervisory signals to said testing circuit, means in said testing circuit to receive said supervisory signals, second timing means to set up time limits for said supervisory signals, means to release said seized trunk circuit, an alarm, means responsive to the operation of said receiving means within the time limits set up by said first and second timing means to operate said release means, and means responsive to the operation of said receiving means outside the time limits set up by said first and second timing means to operate said alarm.

9. In a telephone system, trunk circuits, a routine testing circuit, means in said testing circuit to seize said trunk circuits one at a time, a test line, means to connect a seized trunk circuit with said test line, means in said test circuit to transmit a plurality of ringing signals to said trunk circuit, first timing means to set up time limits for said ringing signals, means in said trunk circuit to retransmit said ringing signals to said test line, means in said test line responsive to said ringing signals to transmit a plurality of steady supervisory signals followed by a plurality of intermittent supervisory signals to said seized trunk circuit, means in said seized trunk circuit to retransmit said supervisory signals to said testing circuit, means in said testing circuit to receive said supervisory signals, means under the control of sad first timing means to time the operation of said receiving means in response to said steady supervisory signals, second timing means to set up time limits for the operation of said receiving means in response to said intermittent supervisory signals, means to release said seizing trunk circuit, an alarm, means responsive to the operation of said receiving means within the time limits set up by said first and second timing means to operate said release means, and means responsive to the operation of said receiving means outside the time limits set up by said first and second timing means to operate said alarm.

References Cited in the file of this patent
UNITED STATES PATENTS 2,632,817  Kessler _____ Mar. 24, 1953